LINE CONCENTRATOR SIGNALING SYSTEM

Filed Oct. 26, 1959

INVENTOR
W. C. JONES
BY
ATTORNEY

May 8, 1962 W. C. JONES 3,033,937

LINE CONCENTRATOR SIGNALING SYSTEM

Filed Oct. 26, 1959 29 Sheets-Sheet 2

INVENTOR
W. C. JONES
BY
[signature]
ATTORNEY

LINE CONCENTRATOR SIGNALING SYSTEM

Filed Oct. 26, 1959 29 Sheets-Sheet 3

INVENTOR
W. C. JONES
BY [signature]
ATTORNEY

INVENTOR
W. C. JONES
BY
ATTORNEY

May 8, 1962 W. C. JONES 3,033,937

LINE CONCENTRATOR SIGNALING SYSTEM

Filed Oct. 26, 1959 29 Sheets-Sheet 5

INVENTOR
W. C. JONES
BY
[signature]
ATTORNEY

LINE CONCENTRATOR SIGNALING SYSTEM

Filed Oct. 26, 1959 29 Sheets-Sheet 6

INVENTOR
W. C. JONES
BY
James W. Falk
ATTORNEY

May 8, 1962 W. C. JONES 3,033,937

LINE CONCENTRATOR SIGNALING SYSTEM

Filed Oct. 26, 1959 29 Sheets-Sheet 7

INVENTOR
W. C. JONES
BY
[signature]
ATTORNEY

INVENTOR
W. C. JONES
BY [signature]
ATTORNEY

May 8, 1962 W. C. JONES 3,033,937

LINE CONCENTRATOR SIGNALING SYSTEM

Filed Oct. 26, 1959 29 Sheets-Sheet 9

INVENTOR
W. C. JONES
BY James W. Falk
ATTORNEY

May 8, 1962 W. C. JONES 3,033,937

LINE CONCENTRATOR SIGNALING SYSTEM

Filed Oct. 26, 1959 29 Sheets-Sheet 10

INVENTOR
W. C. JONES
BY
[signature]
ATTORNEY

INVENTOR
W. C. JONES
BY
ATTORNEY

INVENTOR
W. C. JONES
BY [signature]
ATTORNEY

INVENTOR
W. C. JONES
BY
ATTORNEY

LINE CONCENTRATOR SIGNALING SYSTEM

INVENTOR
W. C. JONES
BY
[signature]
ATTORNEY

May 8, 1962 W. C. JONES 3,033,937

LINE CONCENTRATOR SIGNALING SYSTEM

Filed Oct. 26, 1959 29 Sheets-Sheet 15

INVENTOR
W. C. JONES

BY [signature]

ATTORNEY

May 8, 1962 W. C. JONES 3,033,937

LINE CONCENTRATOR SIGNALING SYSTEM

Filed Oct. 26, 1959 29 Sheets-Sheet 16

INVENTOR
W. C. JONES
BY
James Falk
ATTORNEY

May 8, 1962 W. C. JONES 3,033,937

LINE CONCENTRATOR SIGNALING SYSTEM

Filed Oct. 26, 1959 29 Sheets-Sheet 17

INVENTOR
W. C. JONES
BY
James ? Falk
ATTORNEY

LINE CONCENTRATOR SIGNALING SYSTEM

Filed Oct. 26, 1959 29 Sheets-Sheet 18

INVENTOR
W. C. JONES
BY [signature]
ATTORNEY

LINE CONCENTRATOR SIGNALING SYSTEM

Filed Oct. 26, 1959 29 Sheets-Sheet 19

INVENTOR
W. C. JONES
BY
ATTORNEY

INVENTOR
W. C. JONES
BY
[signature]
ATTORNEY

INVENTOR
W. C. JONES
BY
[signature]
ATTORNEY

INVENTOR
W. C. JONES
BY
[signature]
ATTORNEY

INVENTOR
W. C. JONES
BY
[signature]
ATTORNEY

LINE CONCENTRATOR SIGNALING SYSTEM

INVENTOR
W. C. JONES
BY
ATTORNEY

| $S_0$ | $S_1$ | CONDITION |
|---|---|---|
| 0 | 0 | IDLE |
| 0 | 1 | "IN C.C." |
| 1 | 0 | TALKING |
| 1 | 1 | "IN O.R." |

INVENTOR
W. C. JONES
BY [signature]
ATTORNEY

INVENTOR
W. C. JONES
BY James S. Falk
ATTORNEY

INVENTOR
W. C. JONES
BY James W Falk
ATTORNEY

GATE AMPLIFIER

FLIP-FLOP TO GATE DELAY AMP.

INVERTER AMPLIFIER

FLIP-FLOP

INVENTOR
W. C. JONES
BY
ATTORNEY

May 8, 1962 W. C. JONES 3,033,937

LINE CONCENTRATOR SIGNALING SYSTEM

Filed Oct. 26, 1959 29 Sheets-Sheet 29

INVENTOR
W. C. JONES
BY
[signature]
ATTORNEY 3,033,937

LINE CONCENTRATOR SIGNALING SYSTEM

William C. Jones, Florham Park, N.J., assignor to Bell Telephone Laboratories, Incorporated, New York, N.Y., a corporation of New York Filed Oct. 26, 1959, Ser. No. 848,842
31 Claims. (Cl. 179—18)

This invention relates to telephone systems and more particularly to control circuits for two-stage subscriber line concentrator systems.

The concentration of lines and the connection of a relatively larger number of substation lines to a relatively smaller number of switching paths has marked telephone switching since its earliest development.

In automatic telephone offices the first switching equipment through which the subscriber lines are connected "concentrates" the traffic to the remaining equipment in the central office. The latter equipment is not provided on a per substation line basis and instead, for economic reasons, is designed to handle the expected peak load at the required grade of service. This so-called first stage of concentration varies in different automatic switching systems and in the step-by-step system is embodied in the line finder while in the crossbar system it takes form in the connections and junctors between the line link frames and the trunk link frames from which connections extend to switching paths and common equipment in the central office.

Recent developments in the telephone switching art have demonstrated that decisive advantages flow from arrangements in which substation lines are concentrated at a point which is remote from the central office. In remote concentrator arrangements a lesser number of channels or trunks than the number of substation lines is utilized from the point of concentration to the central office. The economic benefits alone that derive from reduction of cable costs and other outside plant expenditures are so significant when remote line concentration is employed as to give rise to a pronounced heightening of interest in this field.

These recent advances in remote concentrator developments have been in large measure made possible by overcoming formidable obstacles in control and supervision of the remote switching equipment.

Prior art arrangements in the remote concentrator field, although wholly operative, are disadvantageous in a number of important considerations. For example, in areas of high population density or in areas where subscriber lines originate at a substantial distance from the central office a singe stage of concentration (as employed by most prior art concentrators) may be inadequate since the trunks from the central office to the remote point of concentration, although less in number than the number of lines, may still be of considerable number. At all events, the length of the trunks to the central office where subscribers are grouped at a point considerably distant from the central office may be excessive since the point of concentration should obviously be as close to the center of density of the subscribers as is feasible. Under these circumstances a two-stage concentrator is highly advantageous.

Moreover, in certain other prior art arrangements, direct-current connections are made from the subscriber lines through the concentrator to the central office for supervisory and signaling purposes. In a two-stage concentrator arrangement, which impliedly includes substantial distances between a particular subscriber and the central office, direct-current connections give rise to a number of serious difficulties. For example, the switching network in the concentrators, i.e., the apparatus for connecting the lower level lines from the subscribers to the higher level links or trunks to the central office may be subjected to longitudinal currents induced from power lines and other sources of interference. Additional related disorders may result from the effects of cable leakage and differing direct-current earth potentials at the subscriber station and the central office. All of these factors militate against the quality and accuracy of signal transmission.

Perhaps the most difficult problem arising from the use of remote line concentrators is the necessity for conveying information from the subscribers and remote concentrators to the central office. Since no direct path exists from the subscriber to the central office over which an examination may be made of the subscriber's line, it is of critical importance to provide other facilities or channels for informing the central office as to the state condition of the subscriber's line. While this has proved to be a burdensome problem in the case of single stage remote primary concentrators (and is probably a significant reason for delaying the development of remote concentrators until quite recently), the additional obstacles in the transmission of control information which inhere in the use of a two-stage concentrator are literally compounded.

These difficulties are still further aggravated by the fact that in lieu of any direct current or metallic path between the remote locales of concentration and the central office all control information must be passed on an alternating-current basis.

One of the most incongruous aspects of certain prior art remote concentrators is the fact that the concentrated lines are carried over a lesser number of trunks to the central office but are re-expanded at the central office to reflect a unique termination for each subscriber line. While the fact of re-expansion at the central office would appear to be a sufficient anomaly in light of the expense and difficulty of concentrating lines at the remote location, the incongruity is intensified when it is appreciated that the individual subscriber terminations at the central office are again "concentrated" before access is had to switching paths at the central office as described in the early part of this introduction.

In the type of remote concentrator system suitable for use with the instant invention, arrangements are made to avoid this apparently self-defeative succession of switching facilities. Thus, the trunks which enter the central office are not re-expanded to reflect a unique termination for each subscriber line but instead are connected directly to the distribution network in the central office which would correspond in a conventional telephone office to the channels or outgoing trunks.

However, in failing to provide a unique termination for each subscriber line (and in fact failing to provide any unique equipment in the central office applicable to a particular line), it becomes essential to observe and remember in the central office and at the remote location the state condition of lines requesting service and to communicate this information to and from the remote concentrators. This poses a massive control traffic load.

From the discussion above, it will be apparent that prior art concentrators have been characterized by the necessity of control paths over which the control information is transmitted to and from the remote concentrators. Often, however, it has been the rule to transmit all control information over separate control trunks. This includes information which is frequently repetitive such as scanning or advance signals for remote counters, and information which is of a much rarer occurrence, for example, requests for service by individual substation lines.

By channeling all of the information into the control conductors, it has been found that the control paths are heavily taxed, or in an effort to reduce the load on individual control paths, additional control paths must be provided.

It is therefore an object of this invention to provide for remote concentrator control signaling by a division of the control signals into categories of relative speed.

It is a further object of this invention to transmit high speed control information over direct or metallic paths.

A further object of this invention is to transmit control information of a less frequent occurrence over phantom channels on speech or communication paths.

In this regard, it is interesting to observe that a number of discrete advantages obtain in the use of separate channels for control transmission on a relative speed basis. Thus if high speed information were attempted to be placed on a phantom composed of speech communication channels, undesirable and probably insuperable crosstalk difficulties would be manifested.

By relegating the relatively slower elements of control information to phantoms on the speech communication paths, the infrequency of their occurrence obviates crosstalk difficulties while at the same time easing the control traffic burden on the control trunks and simplifying the central office receiving equipment by overcoming the need for discriminating between different types of control signals.

In fact, by analyzing the types of control signals and categorizing them on the basis of repetition frequency, it has been found feasible to establish still another type of control signaling and to provide a third chanel for its exclusive use. For example, transmission of the identification of the number of the primary stage to the secondary stage in a two-stage concentrator may necessitate a signaling speed which is incompatible with the utilization of phantoms on speech or communication trunks. However, these signals may be transmitted over a phantom path on the metallic control paths or trunks. Since no speech or communication takes place over the control trunks, crosstalk is not a significant problem.

It is therefore an object of this invention to transmit signals which are of relatively intermediate speed over phantom channels on metallic control trunks.

In previous concentrator systems the main thrust of the advance resided in the concentration of speech paths. However, a system which is capable of concentrating control paths as well as speech paths is uniquely advantageous, particularly in view of the extensive control traffic in a large concentrator. Since, in general, it would not be economical to provide switching facilities between higher and lower level control paths (an arrangement which would require still more control channels), information delivered to a control trunk is extended in broadcast form over all links connected thereto.

It is therefore an object of this invention to provide for concentration of control paths.

Another object is to transmit the same information in broadcast form over a plurality of links connected to different primaries.

Still another object of this invention is to exclude all primaries but a selected one from responding to the information.

These and other objects of the invention are realized in one illustrative embodiment including a remote network comprising two stages of line concentration. The primary stage, which is connected to the subscriber's lines, includes a full access switch for connecting a maximum of 58 subscribers to ten links which join the remote primary concentrator to the remote secondary concentrator. The secondary remote concentration stage provides for a maximum of 200 links which are connectable through a partial access switch to a maximum of 100 trunks that join the remote secondary concentrator to the central office. Such a two-stage line concentrator is disclosed in Harr et al., application Serial No. 848,595, filed on even date herewith.

Both primary and secondary networks are intercoupled through transformers which provide an alternating-current coupling path. In the present embodiment, talking battery is supplied in the primary concentrator as well as crosspoint holding power. The transformer alternating-current coupling facilities, of course, isolate the switching networks from the adverse effects referred to above that inhere in the use of continuous metallic transmission paths.

A connection through a remote network is established by selecting an idle path through both stages of concentration. Identifying numbers for the selected link and trunk are then transmitted to the remote concentrators with a "mark" order. Since the line number counter requesting service is available from the master line counter in the central office both ends of each end marked stage of the remote primary and secondary switching networks are uniquely identified.

The remote network is released from the link side of the primary remote concentrator. The secondary concentrator is released at the trunk side. Complete records of each connection are stored in a temporary route memory (barrier grid store) and thus the identification of a link and trunk to be disconnected is readily available.

Closures and releases in the remote primary and secondary concentrator networks as well as failures are systematically recorded at the central office.

In one aspect of the present invention, the lines and links are scanned on a periodic basis. The scanning includes facilities for detecting service requests, answers and disconnects. When any one of these conditions obtains, an appropriate control signal is delivered to the central office. A line number counter in each remote primary concentrator is stepped in discrete fashion in conjunction with the line scanner in response to control pulses.

It will be appreciated from the foregoing discussion that one of the major tasks in efficient operation of the concentrator system is the rapid and accurate dispatch of control signals.

It has been found advantageous in transmitting control signals to categorize them with regard to relative speed required for transmission and to select the appropriate channels therefor in accordance with that speed.

For example, the high rate information to be transmitted to the remote concentrators from the central office such as a continuing series of interrogation or advance pulses may be transmitted on metallic trunks exclusively reserved for control signals. Since the information is of a fairly high repetition frequency the assignment thereof exclusively to control channels minimizes crosstalk considerations.

In a similar manner the relatively low rate signals are isolated prior to transmission and are successfully delivered on phantom circuits over trunks which are primarily adapted to handle speech or voice communications. In view of the very low repetition frequency of these signals such as service request indications, answer signals, hangup indications, etc., the signals do not appreciably disturb voice communications taking place on the speech trunks even though they are delivered in phantom form thereover.

Intermediate speed signals which may, for example, include transmission of primary identification numbers from the central office may be placed in phantom form on the trunks exclusively reserved for control signaling. Since no speech communication takes place on these trunks, the problem of crosstalk is obviated.

Thus, by differentiating between control signals in relation to relative speed, a highly efficient arrangement for transmitting the necessarily heavy control signaling load is afforded. However, the present illustrative embodiment contemplates still further efficiencies in the distribution of control channels. In lieu of providing a separate control pair to each of the remote primary concentrators individually, all of the metallic control links between a secondary and its associated primaries are concentrated in the secondary and extended in a single metallic control pair from the secondary to the central office.

The savings attendant in concentration of the control pairs is of the same relative order as the concentration of speech conductors or subscriber lines.

In transmitting information from the central office concerning a particular primary concentrator the information is delivered over the metallic control trunks or phantoms on the metallic control trunks from the central office to the secondary concentrator. Thereafter the information is delivered in broadcast form to all of the primary concentrators associated with the particular secondary concentrator. However, the information is to be acted upon or responded to by only a single primary concentrator. To effectuate this end a single execute signal is delivered over a phantom circuit on a speech trunk and link individual to the selected primary concentrator. Here again optimal efficiency of signaling traffic distribution is achieved.

It will be appreciated that, if the bulk of the order to be acted upon was delivered over the phantom circuit on the speech trunk and link individual to the selected primary concentrator, objectionable interference might be experienced on the speech conductors themselves in view of the fairly rapid repetition frequency of the control signals. To avoid this the bulk of the signals are delivered over metallic control paths or phantom circuits on metallic control paths to minimize interference problems. An important advantage in this respect, as explained above, is that the phantom and metallic control trunks do not establish individual paths to the primary concentrators but deliver the information in broadcast form over a single metallic control trunk or phantom path on a pair of metallic control trunks to a plurality of control links extending to the primary concentrators individually. Moreover the transmission of the single execute signal over a phantom path on the speech or communication channels in view of its relatively low repetition frequency is found unobjectionable.

In the following illustrative embodiment of the invention, information from the central office to the primary concentrator representing a selected link is delivered in phantom form on a pair of metallic control trunks to the secondary concentrator and thereafter over metallic control links to all primary concentrators associated with the particular secondary concentrator. The single pulse selecting the particular primary concentrator to execute the order which has been delivered in broadcast form to a plurality of primary concentrators is delivered over a phantom circuit on speech trunks and speech links.

Additional control information from the central office relating to the selected primary concentrator is delivered to the appropriate secondary concentrator over a metallic control trunk as is information regarding the selection of a particular speech trunk. Control signals representing an order to a selected secondary concentrator to execute previous information are delivered in phantom form over speech trunks individual to the secondary concentrators as is information inbound from the secondary concentrator to the central office representing successful execution of the order.

Signals relating to the selection of a particular link number are delivered in phantom form over the metallic control trunks and are thereafter delivered in broadcast form over metallic control links to all of the primaries.

A feature of this invention includes means for categorizing control signals to be transmitted on the basis of relative repetition frequency and, in particular, high, intermediate and low repetition frequencies.

Another feature of this invention is an arrangement for transmitting relatively high speed control information over metallic control paths.

A further feature of this invention includes means for transmitting relatively intermediate speed control signals on phantom channels of metallic control paths.

Still another feature of this invention includes facilities for transmitting relatively low speed control signals over channels which are phantomed on speech communication paths.

A further feature of this invention includes arrangements for transmitting bipolar information over metallic paths and phantom paths.

Still another feature of this invention includes signaling paths over concentrated control channels as well as concentrated speech channels.

A further feature of this invention includes facilities for signaling over a plurality of links connected to the same trunks.

These and other objects and features of the invention may be more readily comprehended from an examination of the following description and attached drawings, in which.

Figure 15:
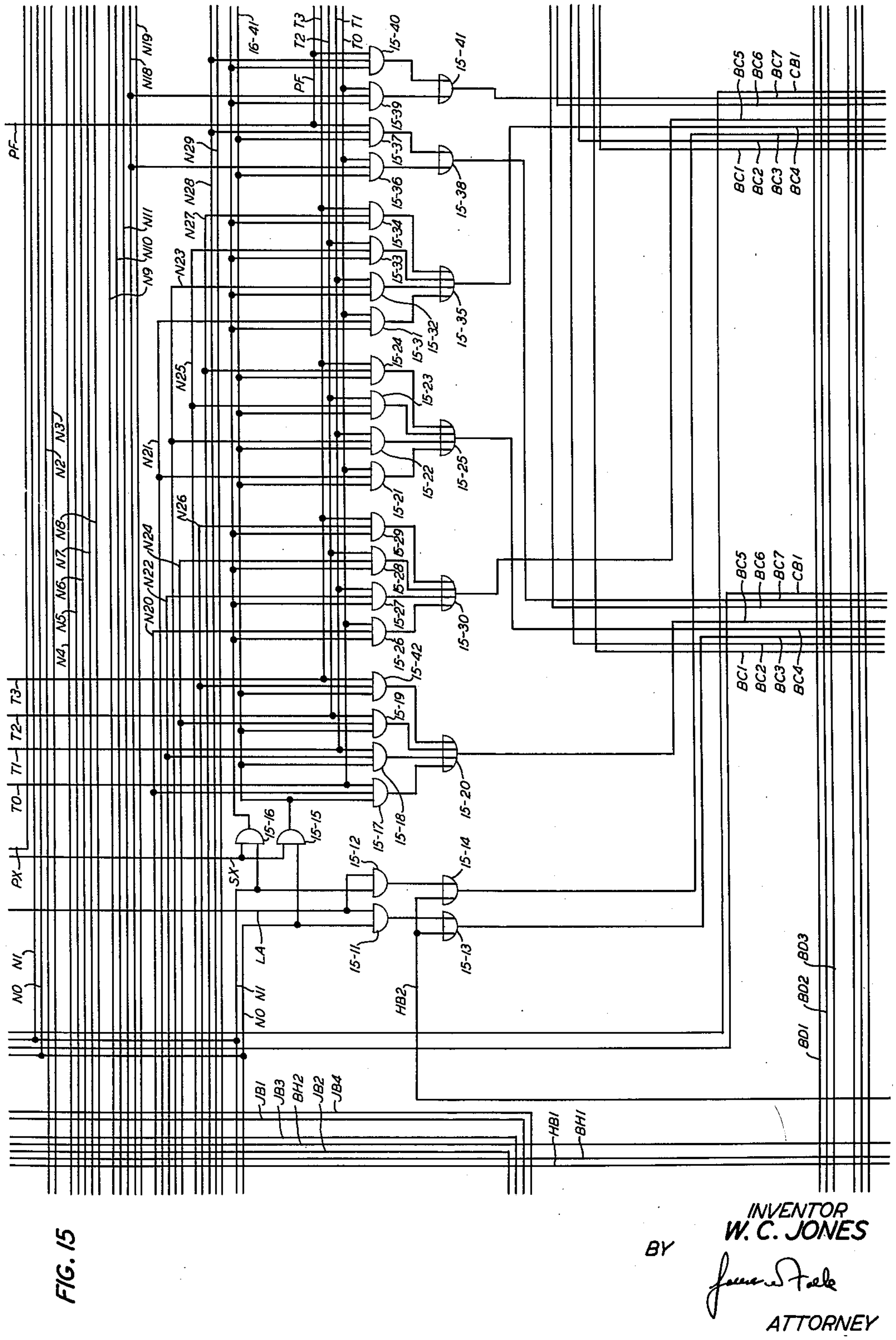
Figure 16:
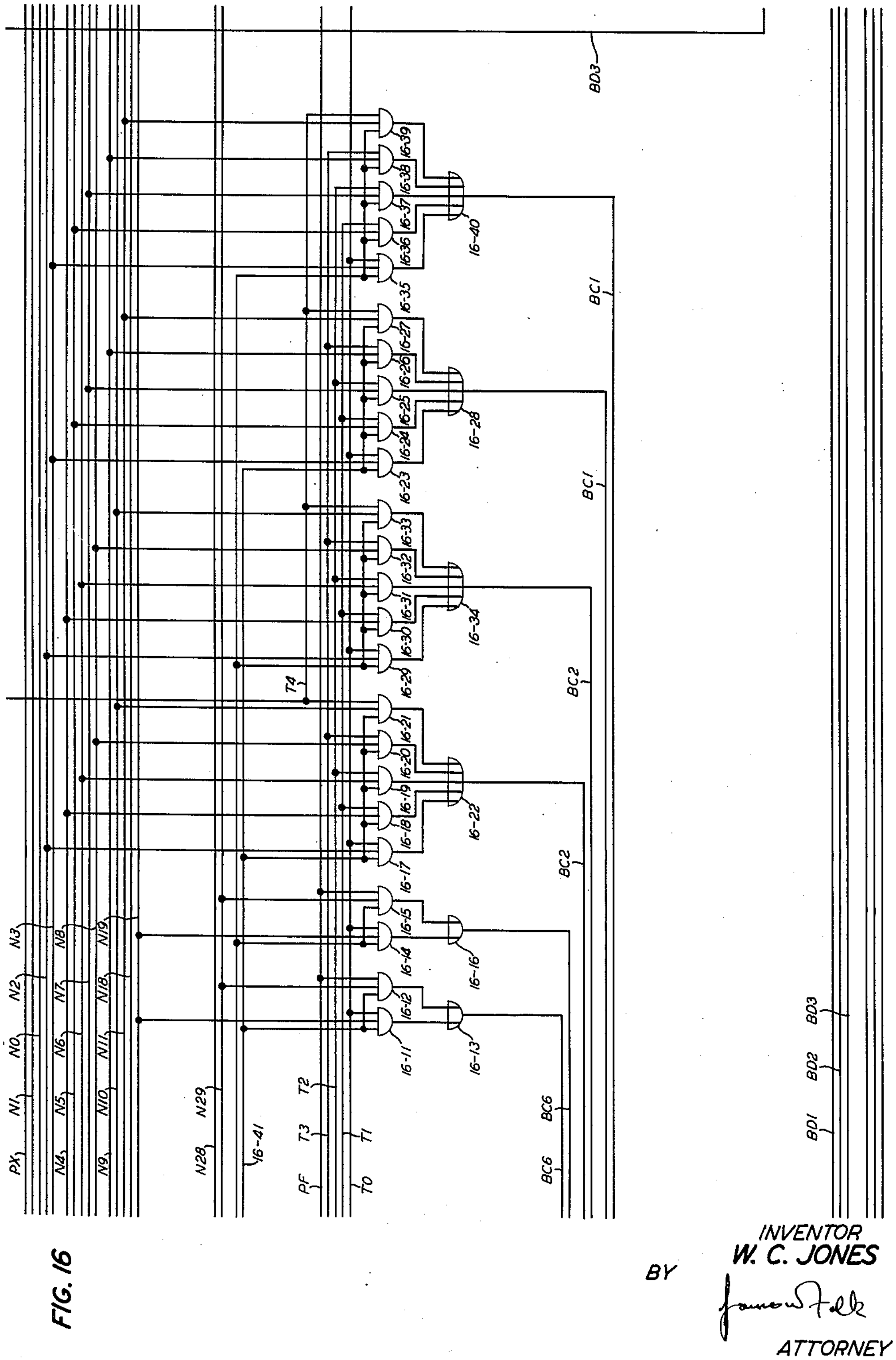
Figure 17:
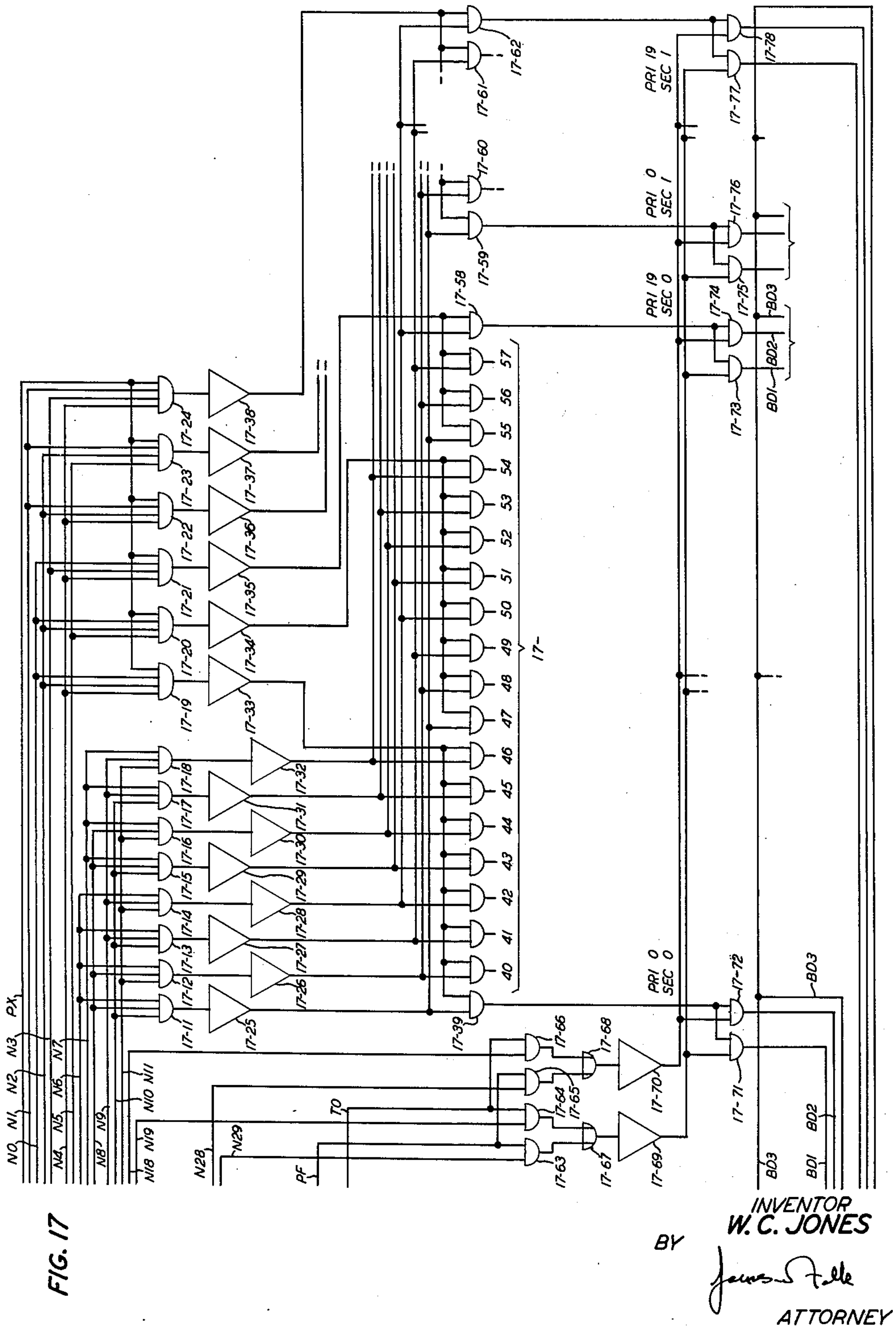
Figure 18:
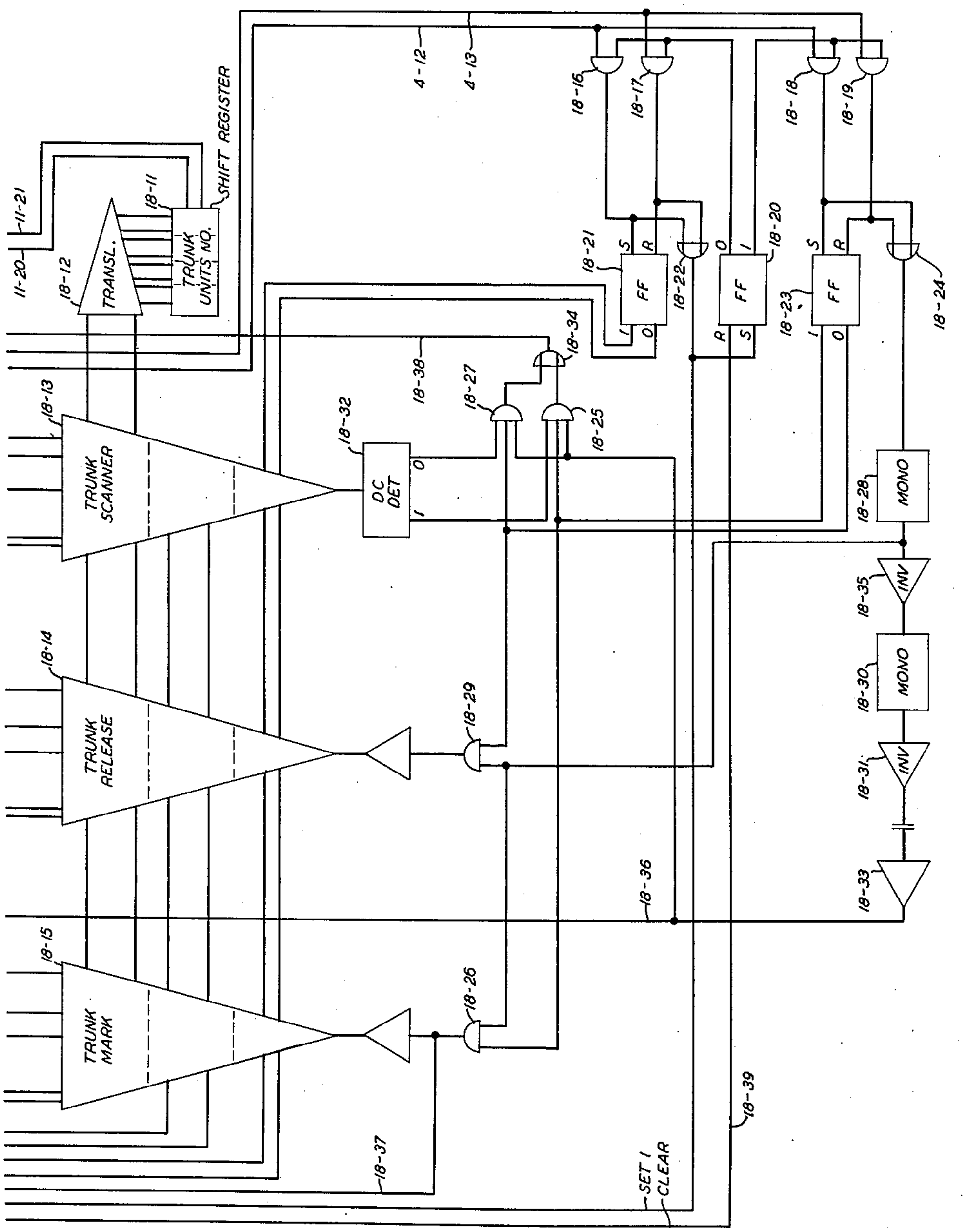
Figure 19:
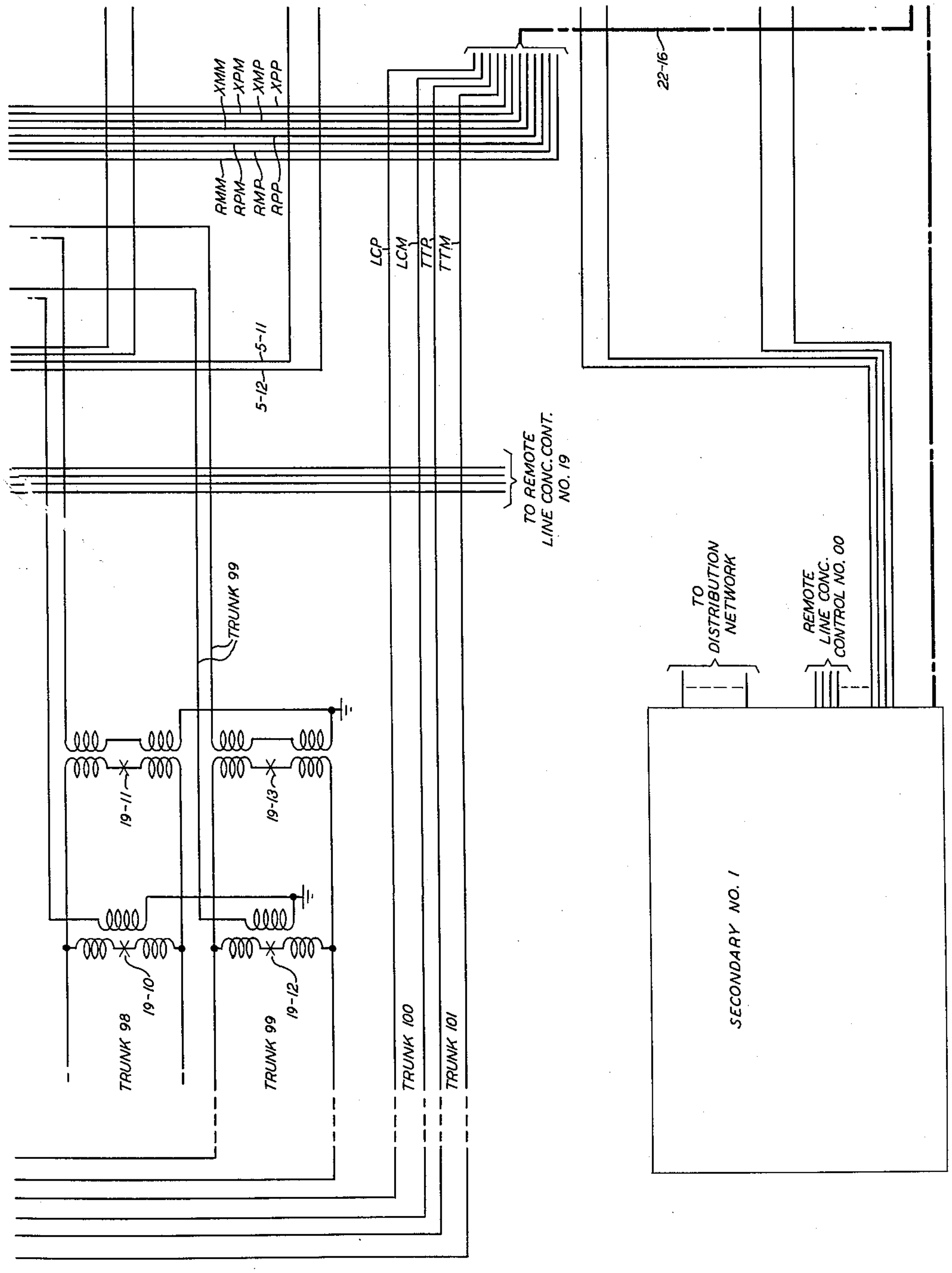
Figure 20:
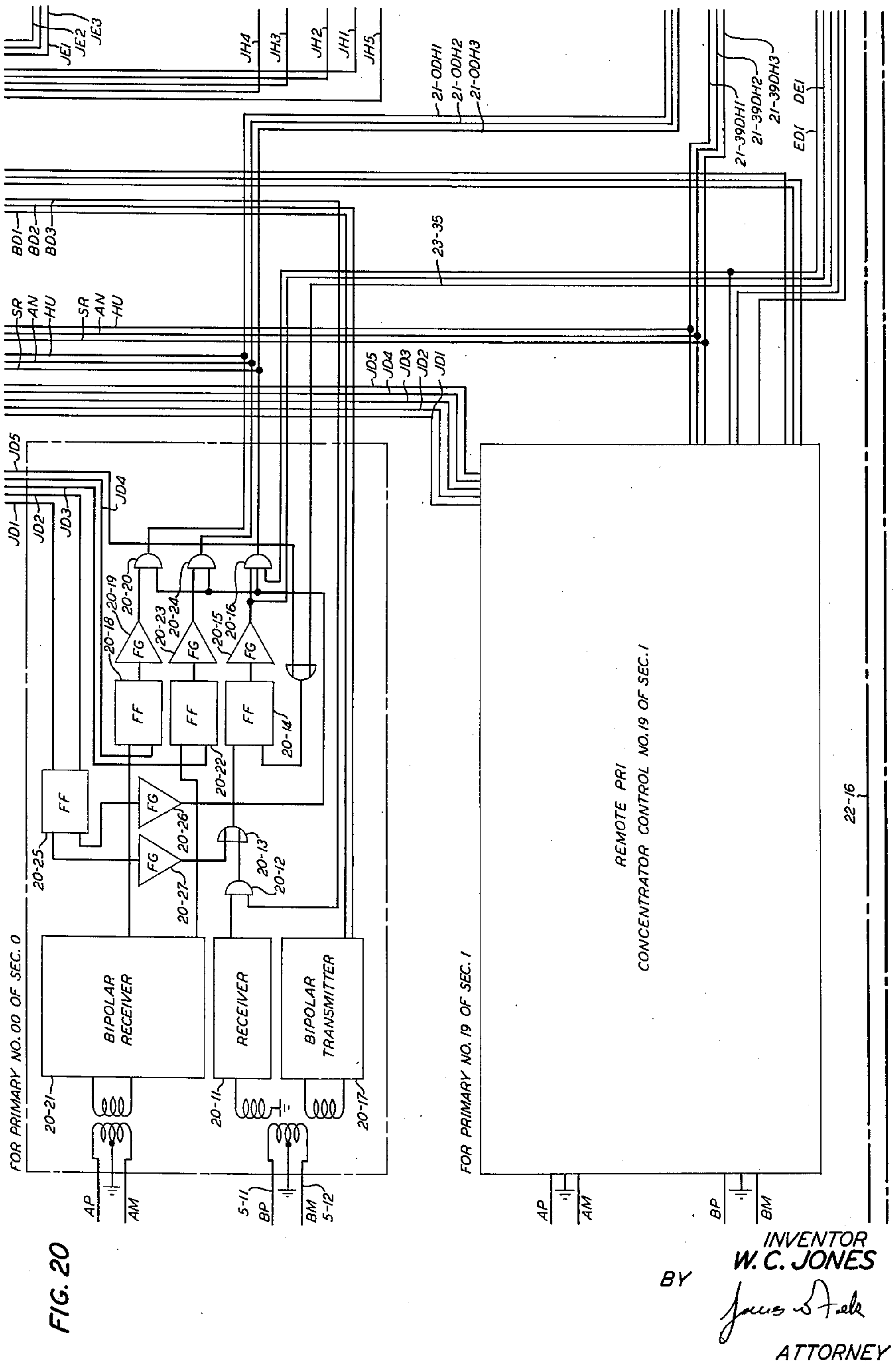
Figure 21:
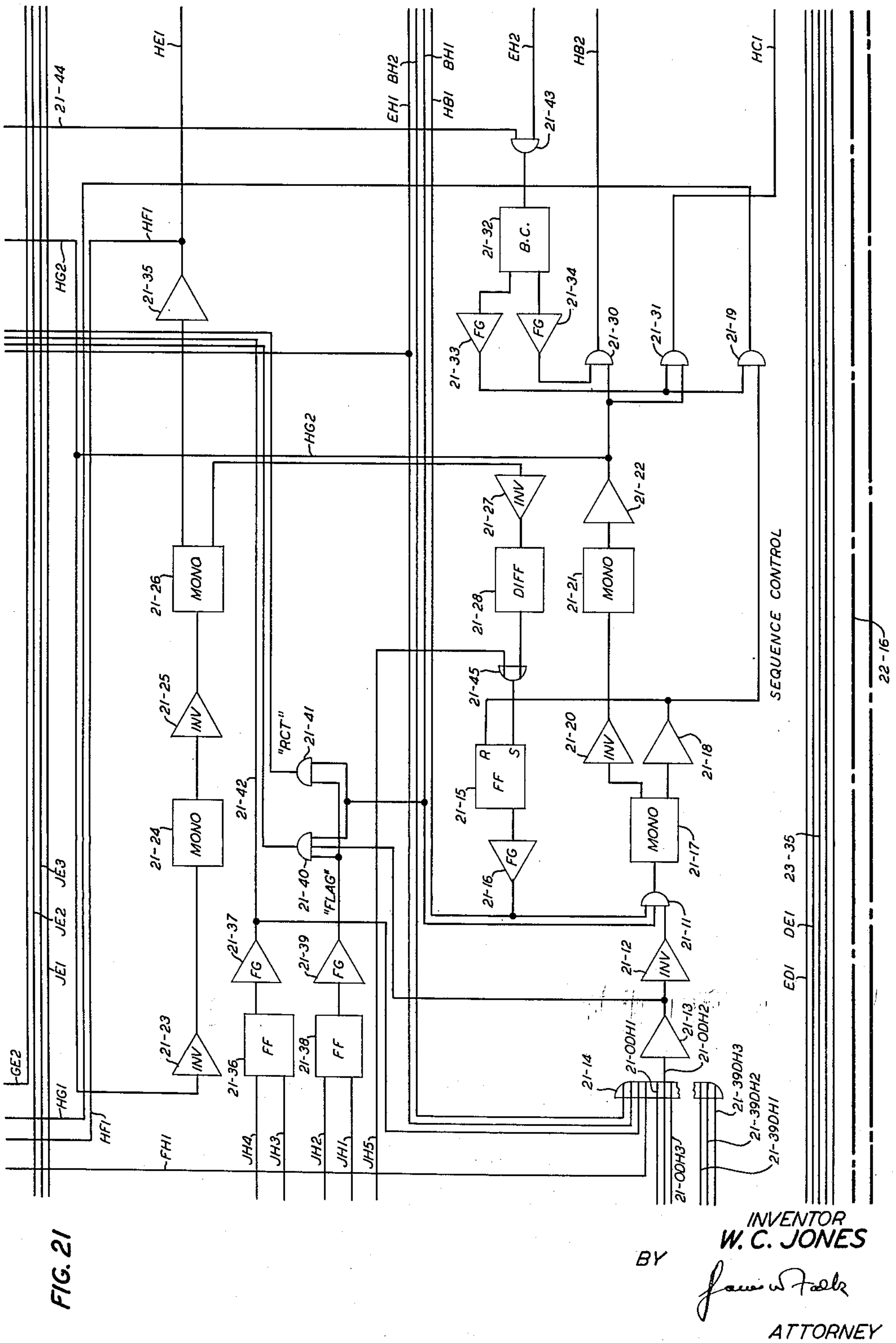
Figure 22:
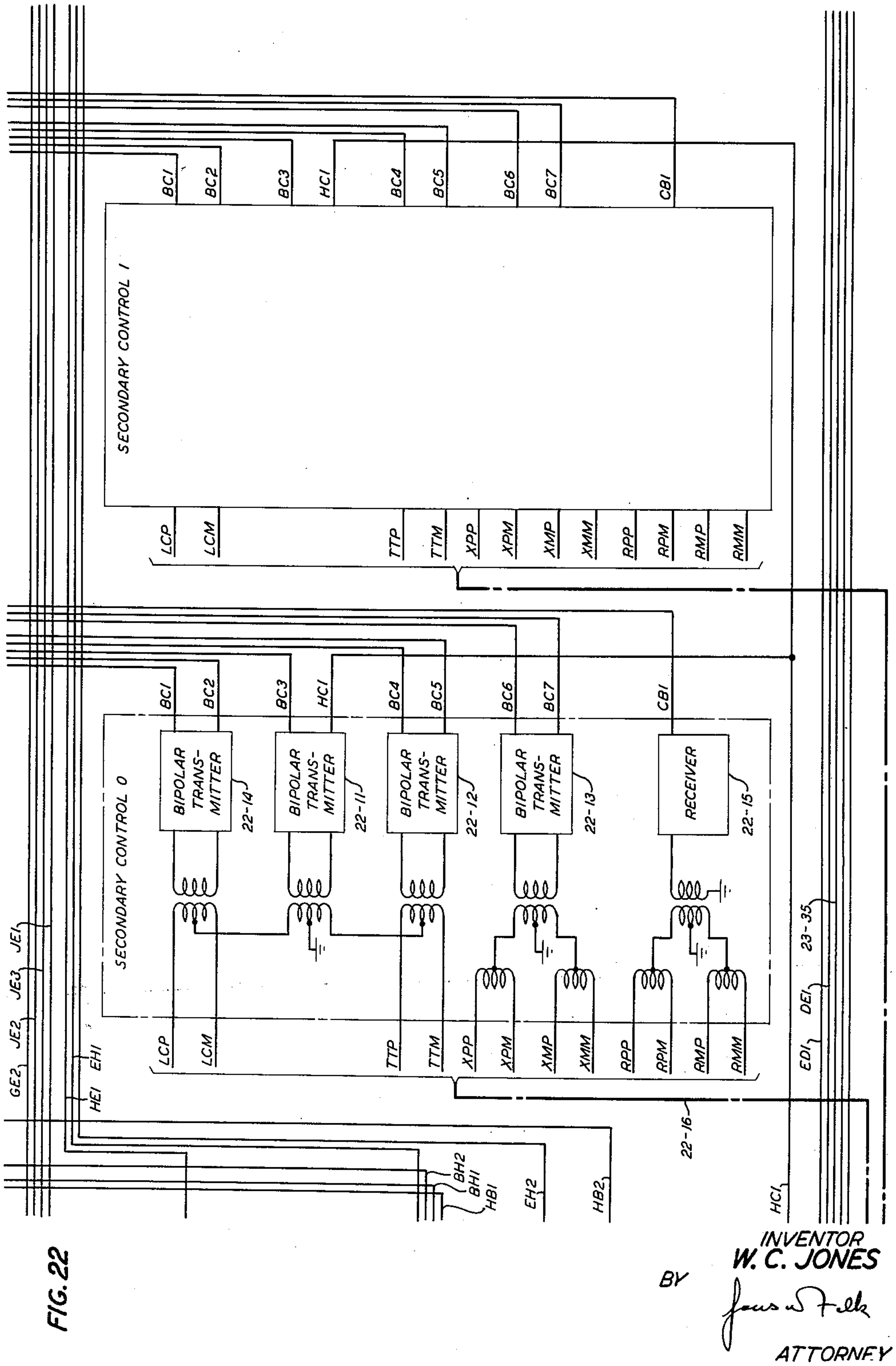
Figures 23, 24:
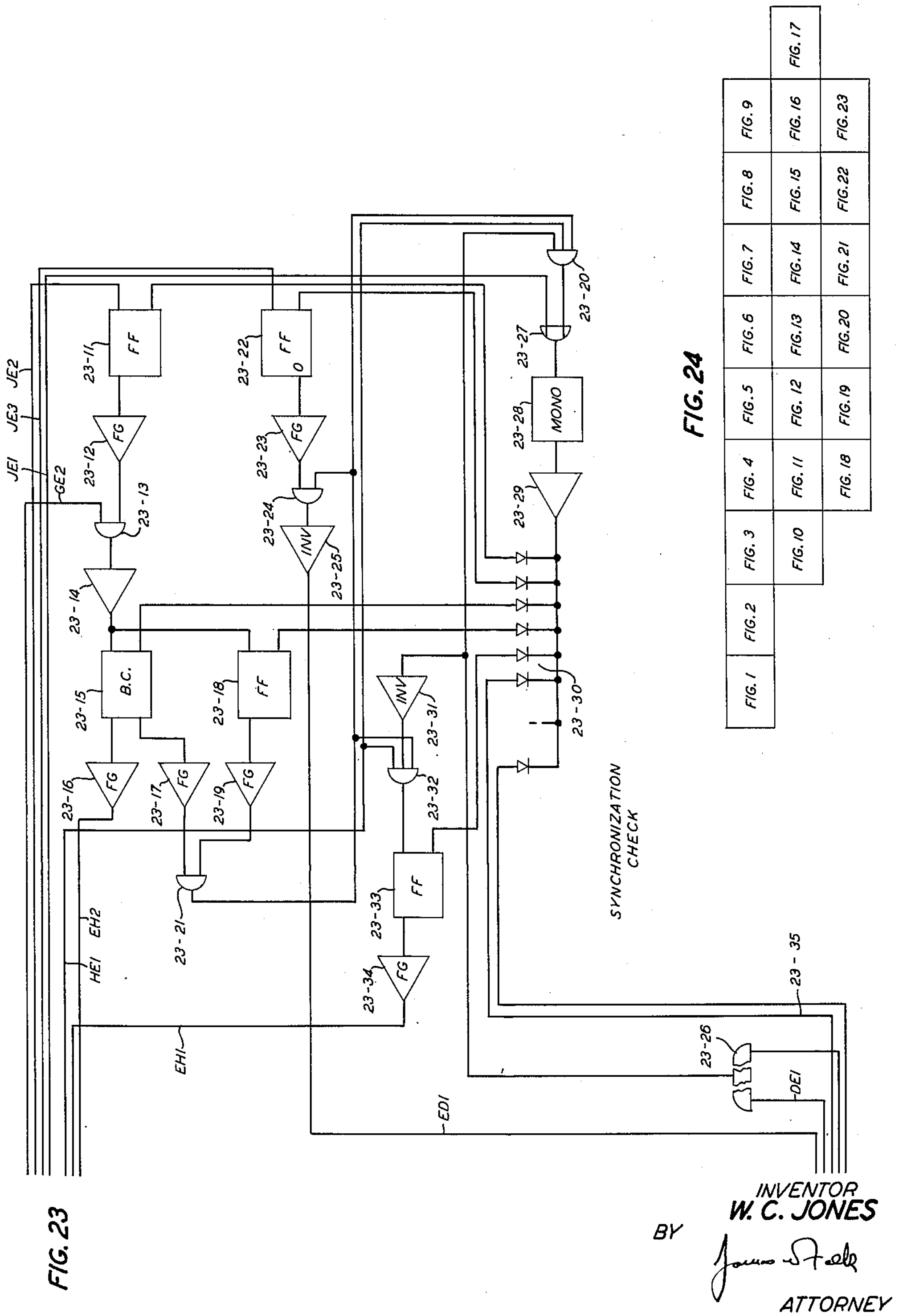
Figure 25:
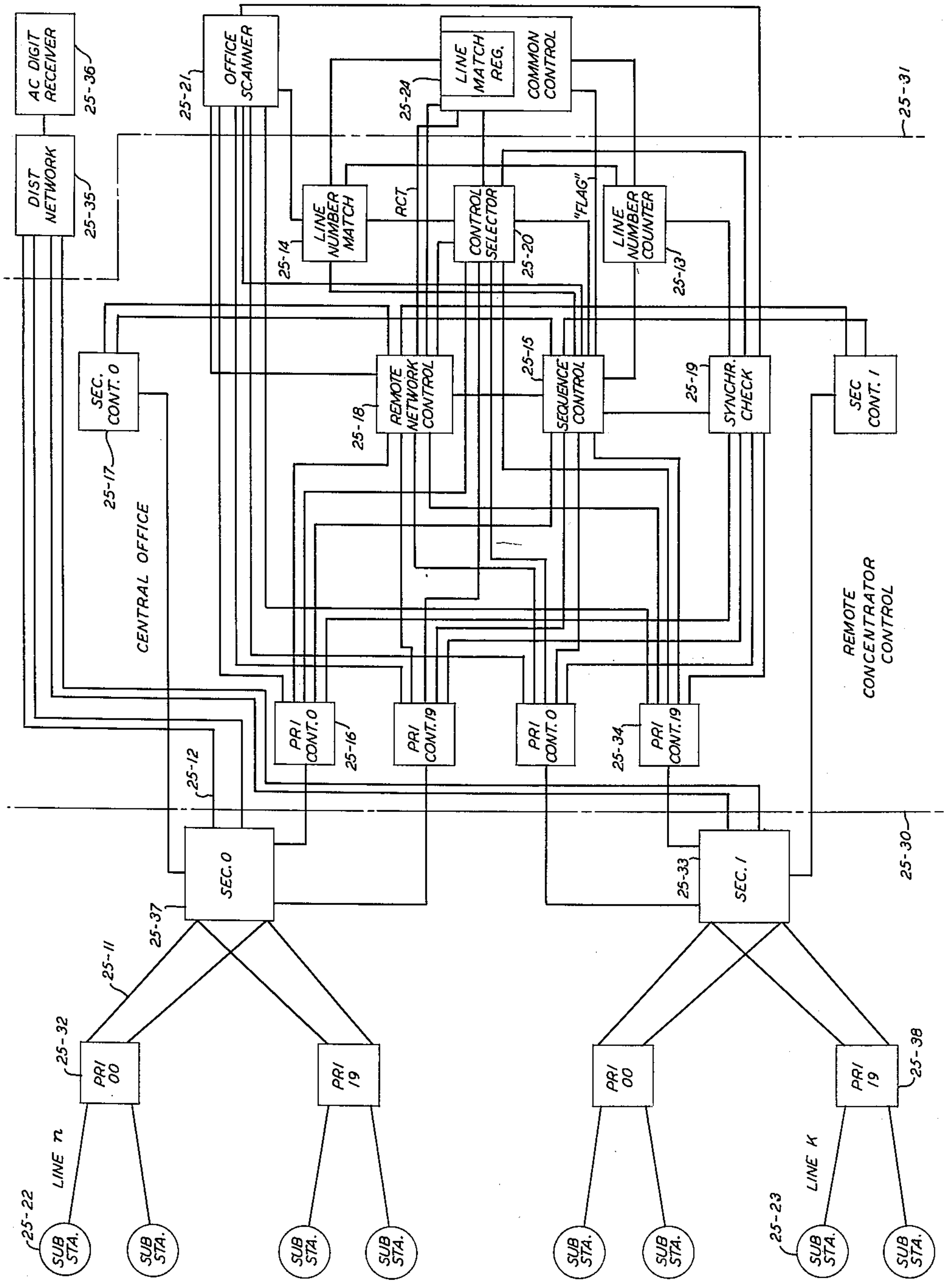
Figure 26:
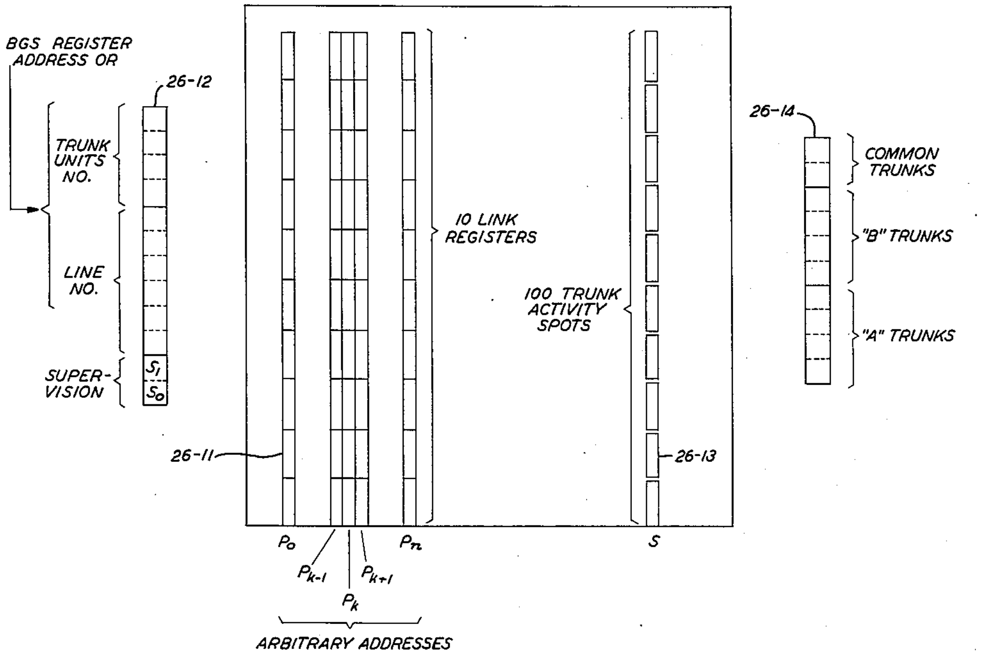
Figure 27A:
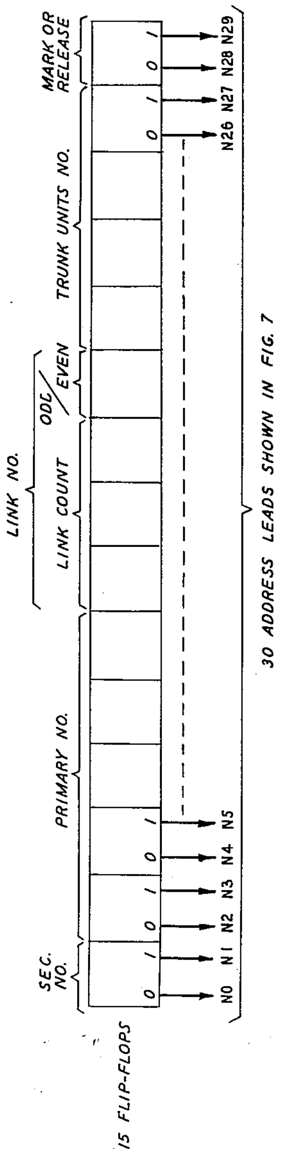
Figure 27B:
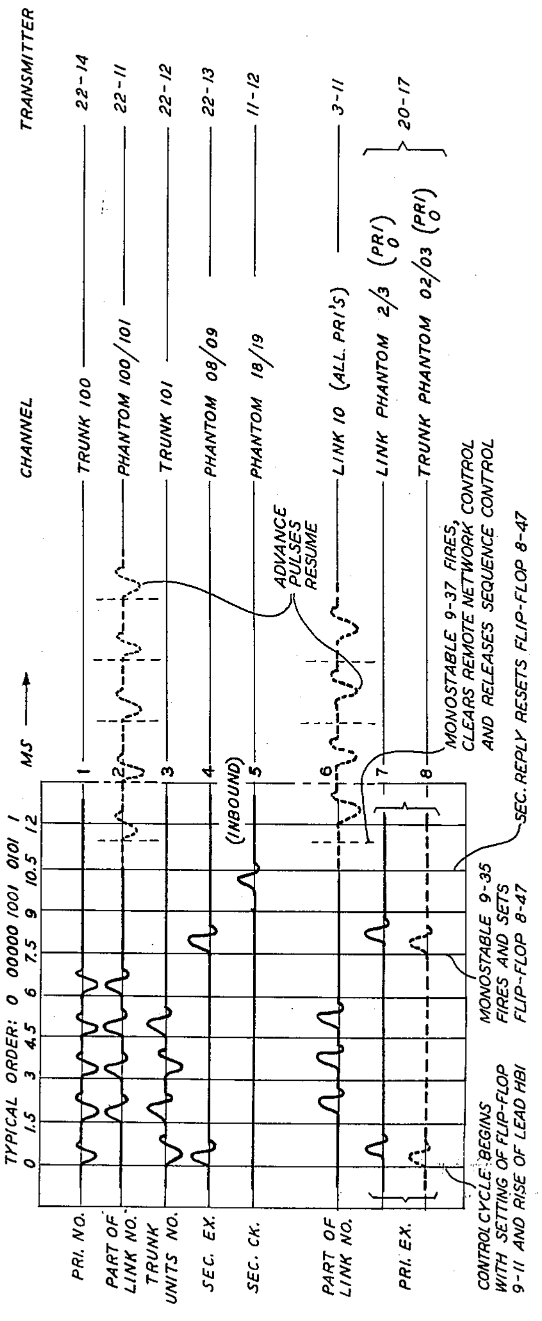
Figures 28, 28A, 29, 29A, 30, 30A, 31, 31A:
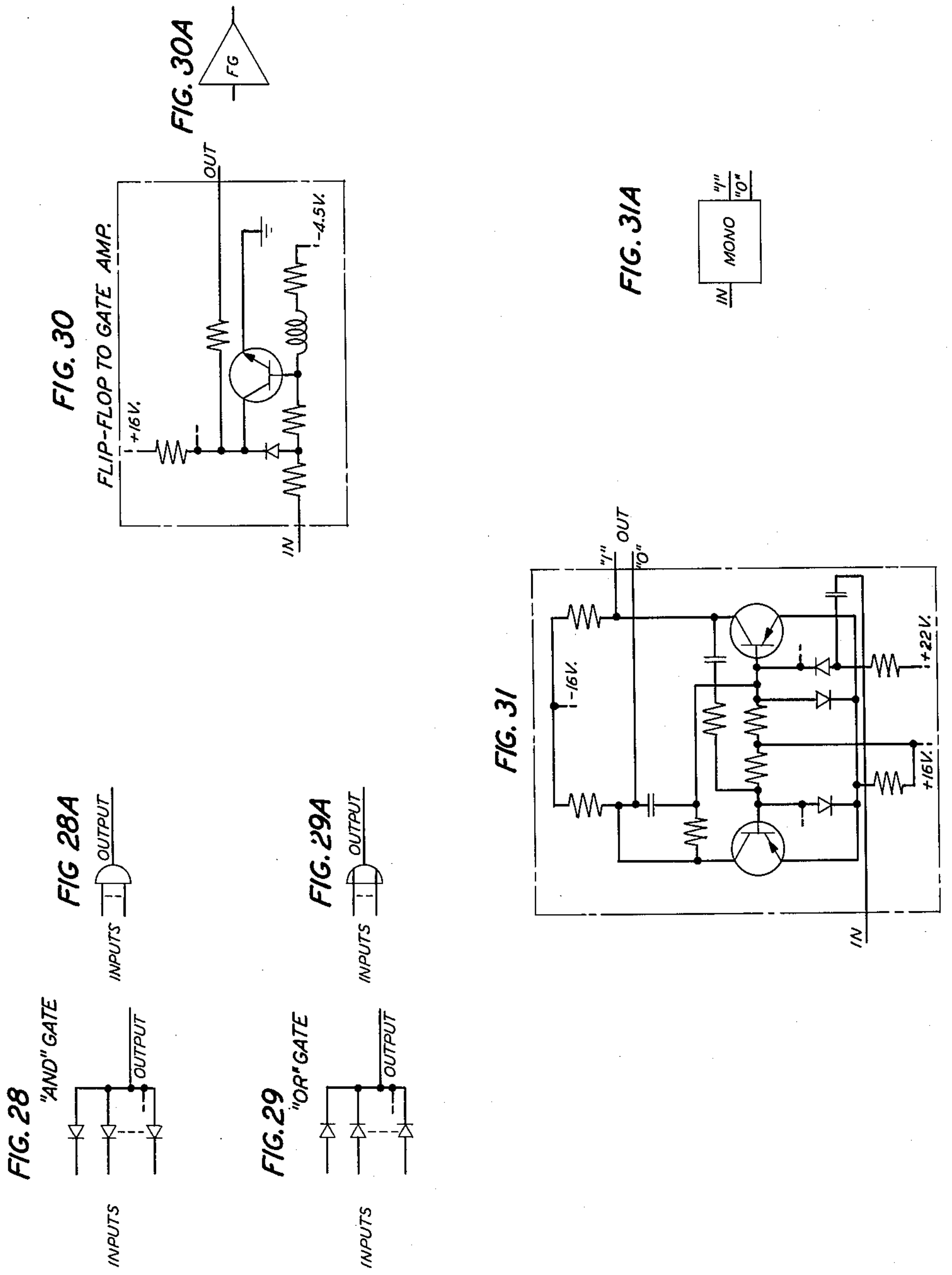
Figure 33A:
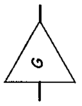
Figure 33:
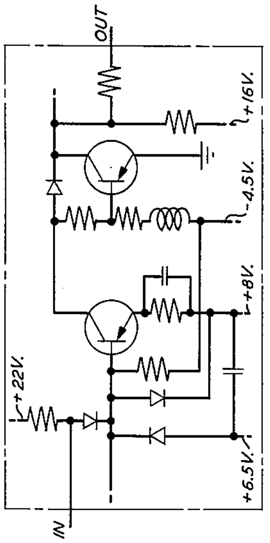
Figure 35A:
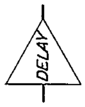
Figure 35:
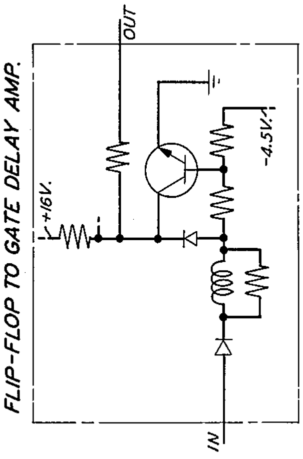
Figure 32A:
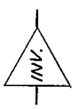
Figure 32:
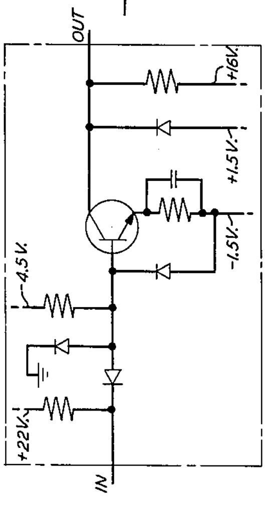
Figure 34A:
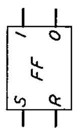
Figure 34:
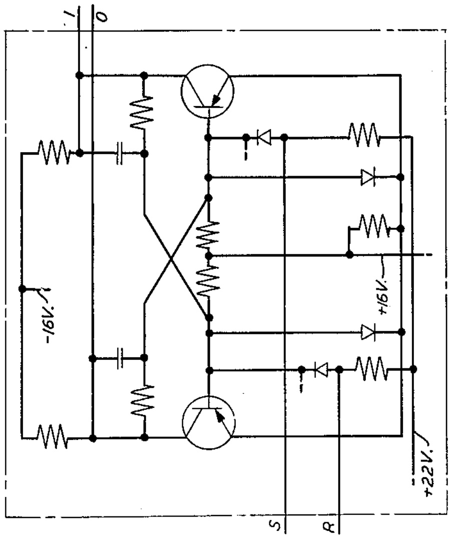
Figure 36:
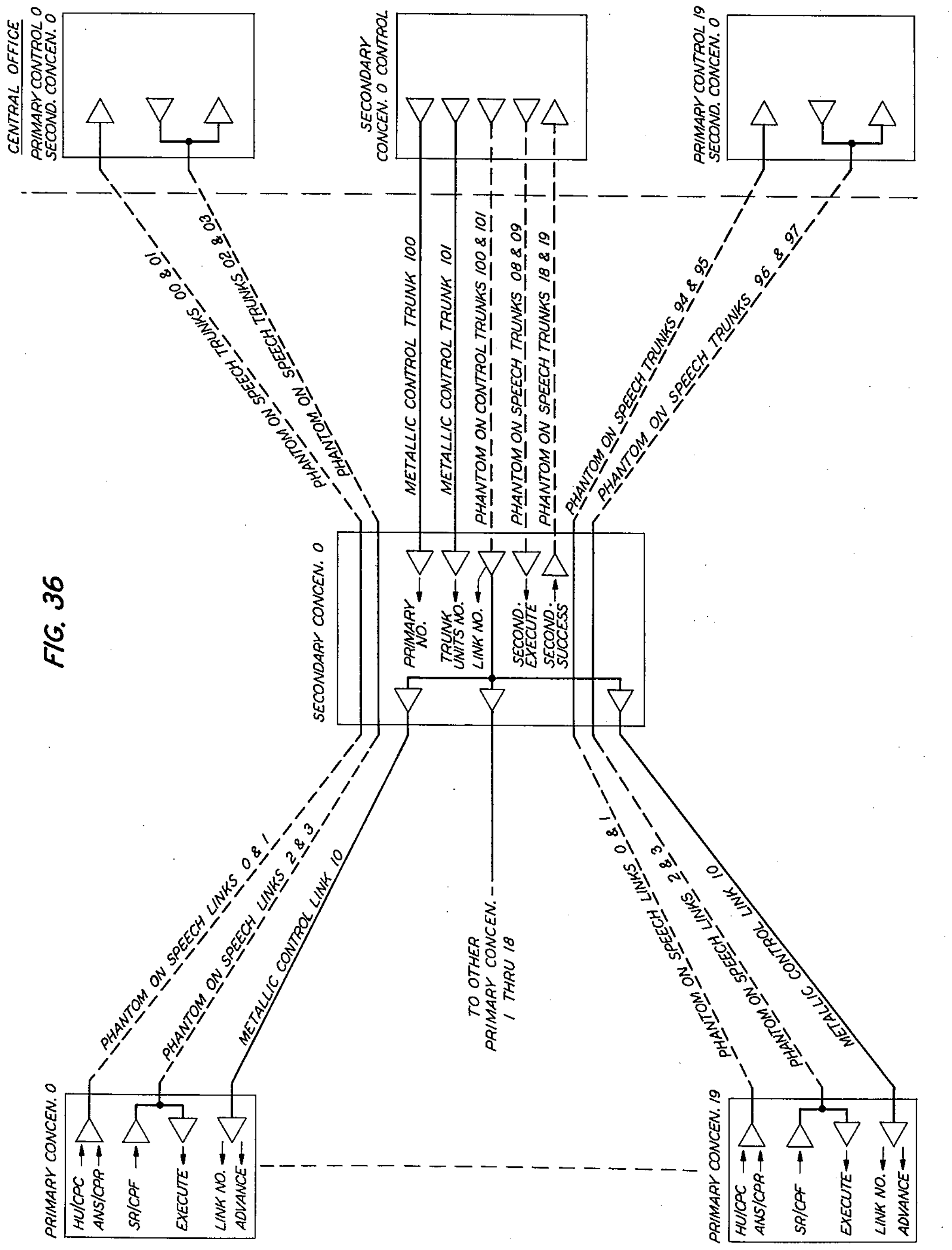

FIGS. 15, 16 and 17 indicate the parallel to serial translation equipment for the remote network control circuit;

FIG. 19 indicates additional trunk termination in the central office and also the two physical trunks used exclusively for signaling;

FIG. 20 shows the primary concentrator control circuits;

FIG. 21 shows the seqeunce control circuits;

FIG. 22 shows the secondary concentrator control circuits in the central office;

FIG. 23 shows the synchronization check circuit;

FIG. 24 indicates the disposition of FIGS. 1–23 to dis close the invention;

FIG. 25 is a block diagram of the major equipment components in the present invention;

FIG. 26 indicates the disposition of registers in the barrier grid store;

FIG. 27A is a symbolic disclosure of the flipflops in common control representing the network order register;

FIG. 27B shows graphically the pulses which are transmitted to and from the remote concentrators in conjunction with a specific order. The channels over which they are carried and the transmitters from which they originate;

FIGS. 28–35 show equipment which may illustratively be employed in the equipment shown in outline form in FIGS 28A–35A, which later appear in FIGS. 1–23; and FIG. 36 is a schematic representation of the disposition of the control signaling channels.

In describing the instant invention it is believed that the ends of clarity will be served by a description which is divisible into two separate and self-contained parts, i.e., a general description of the invention including a general description of the major components therein and a general description of a typical call followed by a detailed description of the invention including a detailed description of the major components and a detailed description of a typical call. The two-stage concentrator system described herein and in which this specific embodiment of my invention may be utilized is described and claimed in Harr et al. application Serial No. 848,595, filed on even date herewith.

The format which has been followed in explaining the invention follows these general lines of division and is indexed as follows:

I. General Description
A. Introduction
B. General Description of Major Components
1. Sequence Control
2. Line Number Match
3. "Flag"
4. Primary Control
5. Secondary Control
6. Remote Network Control
7. Synchronism Check
8. Control Selector
9. Office Scanner
C. General Description of Typical Call
1. Quiescent Condition
2. Off-hook Condition Precipitates Service Request
3. Common Control Through Office Scanner Recognizes Service Request
4. Originating Connection to Calling Customer
5. Terminating Connection to Called Customer
6. Verification of Connection
7. Answer
8. Hangup
9. Release of Connections
II. Detailed Description
A. Detailed Description of Major Components
1. Timing Functions of the Sequence Control Circuit
2. Line Number Counter in RCC
3. Path of Advance Pulses Generated in Sequence Control
4. Synchronization Check Circuit
5. SR Block and P1/P2 Check Circuits
(a) Service Request Block Circuit
(b) P1/P2 Checking Circuit
(c) Interaction Between Synchronism Check, SR Block and P1/P2 Check Circuits
6. Remote Network Control
(a) Network Order Register
(b) Primary and Secondary "Exclude" Orders
(c) Typical Order Word—0 00000 1001 0101 1 (Fig. 27B)
(d) Timing Functions
(e) Transmission of Link Count Pulses
(f) Minimum Count Circuit
(g) Composition of Order to be Transmitted
(1) Translation of Secondary Number and Primary Number
(2) Translation of Trunk Units Number
(3) Formulation of "Odd-Even" and "Mark-Release" Signals
(4) Signal Transmission to Specific Primary
(h) Secondary Crosspoint Failure
(i) Secondary "Success" Signal
B. Detailed Description of a Typical Call-Originating Connection
1. Customer Goes Off-hook
2. Service Request Flip-flop is Set
3. Route Memory in Barrier Grid Stare
4. Separate Transmission of High and Low Rate Information to Close Crosspoint in Remote Primary
5. Closure of Crosspoint in Remote Secondary Concentrator
6. Verification of Closure of Secondary Crosspoint
7. Completion of Dial-Tone Connection
8. Transmission of Called Number Information
C. Detailed Description of a Typical Call-Terminating Connection
1. Addressing Line Mark Selector
(a) Address Instruction for Line Match Register
(b) Address Instruction for Control Selector
2. Busy Test
3. Transmission of Network Order
4. Closure of Crosspoint in Remote Primary and Secondary Networks
5. Answer
6. Conversation Path Completed
7. Hangup
8. Disconnect
9. Release In the following descriptions appropriate and continued reference to FIG. 36 will be of material assistance in appreciating the disposition and functioning of the control signaling channels in relation to the two-stage concentrator in which they are incorporated. FIG. 36 also clearly illustrates the multiplicity of control signaling channels and the separation of control signaling on the basis of repetition frequency.

I. GENERAL DESCRIPTION

A. *Introduction*

Referring now to FIG. 25 it may be observed that a number of substations 25—22, 25—23, etc., are connected over lines to the primary concentrators 25—32, 25—38, etc. and in turn the primaries are connected over links 25—11 to the secondary concentrators generally referred to as 25—37 and 25—33. From the secondaries a number of trunks 25—12 extend to the distributive portions of the switching network in the central office explained in greater detail herein.

In FIG. 25 the remote equipment is indicated to the left of line 25—30 and the equipment within the central office to the right of line 25—30. The equipment between lines 25—30 and 25—31 constitutes the remote concentrator control, sometimes hereinafter referred to as RCC.

The over-all arrangement of the two-stage concentrator is based on a synchronous control system. Each of the lines is examined sequentially under control of a counter (not shown) at the remote primary. A master counter 25—13 at the central office is stepped in synchronism with the counters in the primaries. The line number counter 25—13 at the central office serves all of the counters in the remote primaries within a single group of concentrators. It is understood, however, that in a large central office several groups of concentrators may be required. In this event an individual line number counter (25—13) is provided for each group. Although synchronism obtains between each line number counter 25—13 and the remote counters which it serves, there is no necessity for intergroup synchronism.

The advantages which inhere in the use of a synchronous control system include the facile manner of identifying a customer making a service request. In a synchronous or other arrangements when a customer initiates a service request, it is necessary for the remote primary concentrator to forward information indicating the identity of the customer. By contrast, in the present arrangement it is essential only for the remote primary concentrator to forward control information to the central office indicating a service request. At the central office control equipment will examine the line number counter to identify the number of the line at the remote primary requesting service.

Since the over-all arrangement is sequential in nature, i.e., the remote counters are stepped one position at a time, the stepping speed is partially fixed by the transmission characteristics of the telephone cable extending the lines to the central office. Practice dictates that when an advance pulse is transmitted over the cable to a primary concentrator, time must be allowed for the pulse to propagate to the primary concentrator and additional time for control pulses thereby generated at the remote primary (e.g., a service request) to be propagated back to the central office. Illustratively, a nominal time of 2 milliseconds has been allowed to transmit the advance pulse and wait for a reply control signal. Thus 500 pulses per second is the basic stepping rate.

As will be indicated herein the concentrator control system in the central office has been provided with sufficient intelligence to properly administer and evaluate control pulses transmitted to and from the remote points without burdening the central office common control system with any but the most critical situations.

In this respect it may be observed that the basic repetition rate of the common control system for a switching system suitable for use in conjunction with the present invention (such as that shown in an application of W. A. Budlong et al., Serial No. 688,386, filed October 7, 1957) may illustratively be 2.5 microseconds and in consequence the stepping rate of the concentrator, which is 2 milliseconds, represents merely an occasional occurrence rather than a frequent one for common control. To some extent the two-stage concentrator system is autonomous in the central office and makes independent decisions calling in common control only when higher priority decisions are required.

B. *General Description of Major Components*

(1) Sequence Control: The sequence control 25—15 generally designates equipment which decides when it is necessary to send advance pulses to step the counters at the remote primaries.

Thus a typical decision by the sequence control circuit 25—15 is that no control pulses have been received from the primary concentrators indicating service requests, etc., and it is feasible to continue stepping and generating advance pulses. The sequence control circuit includes a timing circuit adapted to measure an elapsed 2-millisecond interval and to observe whether any reply control signals have been received. If no service requests or other supervisory signals are received, the sequence control on its own initiative continues to step all of the counters in the remote primaries sequentially without assistance from the common control.

(2) Line Number Match: The line number match circuit 25—14 has the general function of permitting the line number counter 25—13 to be stopped at a number requested by common control. If common control requires the line number counter to stop at a particular number, it stores the wanted number in the line match register 25—24. The match logic circuit 25—14 includes comparator arrangements adapted to compare a number stored in the common control line match register 25—24 with the number appearing in the line number counter 25—13. At each step that the counter 25—13 takes, the sequence control circuit 25—15 is informed as to whether a match condition has been requested and exists.

Thus if the line number counter is at line 10 and the line number match is looking for a match at 15, until the counter arrives at number 15, the line number match 25—14 will not provide a signal to the sequence control 25—15 which therefore continues to send out advance pulses to step all the counters. When line number 15 is reached, the match circuit 25—14 observes that the counter 25—13 is at the number that the common control is seeking and will produce an indication in the sequence control 25—15 which causes the sequence control to stop transmitting advance pulses and thereby to bring the counters in all the remote primaries to a halt.

(3) "Flag": At this time the sequence control 25—15 provides an indication to the common control over a "flag" lead. The flag lead is a vital link between the concentrator control and common control since all information proceeding from the concentrator to common control is introduced by the flag lead. Common control examines the flag lead at periodic intervals as explained herein to observe if a flag indication is made.

When the sequence control 25—15 sets the flag no further independent action by the concentrator can proceed and all concentrator operations stop. Physically, as will be indicated herein, the "flag" is a flip-flop in the common control circuit.

(4) Primary Control: The primary controls designated generally as 25—16 and 25—34 are control circuits in the central office which are individually connected to each of the remote primary concentrators and, in effect, are terminals of signaling circuits which extend to the remote primary. The function of the control circuits is to receive and transmit information to and from the remote primaries using control pulses appropriate to the purpose. For example, when primary 00 (25—32) sends a control signal pulse representing a service request to the central office this signal will be received, over link 25—11 and additional signaling channels, in primary control 25—16 where it will be stored in a flip-flop. The primary control 25—16 also serves to provide control signals in an outgoing sense from the central office to a specific remote primary. Primary control 25—16 is in effect, therefore, a signaling terminal for two-way transmission.

The common control equipment in the central office comprehends, by reference to the particular primary control circuit indicating a service request, which of the forty remote primaries has initiated the request.

Thus, if the line number counter is at a count corresponding to line 35, and if at this time a service request corresponding to one of these lines in one of the primaries is made, it is insuffcent for identification purposes to observe merely that line 35 is energized since that line may appear in any one of the forty primaries indicated in FIG. 25. However, common control by reference to the particular primary control 25—16, etc., in which the service request has been registered, can deduce which of the primaries contains the line requesting service.

(5) Secondary Control: The secondary control 25—17, etc., is related to the remote secondary concentrators in a manner which is analogous to the relationship between the remote primaries and the primary controls 25—16, etc. Secondary control 25—17 is thus, in effect, a signaling terminal. It contains equipment for transmitting control signals to the remote secondaries. This equipment includes facilities for shaping the control pulses transmitted to the secondaries and additional apparatus for receiving control pulses from the secondaries.

(6) Remote Network Control: Remote network control 25—18 is utilized by the common control as an intermediary in transmitting information to the remote primary and secondary concentrators.

In view of the high repetition rate in common control in relation to that of the remote concentrator control (RCC) adverted to above information delivered from the common control to RCC is delivered in parallel rather than in series. The function of remote network control 25—18 is to take information transmitted in parallel binary form from common control and convert it to control signals suitable for the remote primaries and secondaries. In addition, the remote network control 25—18 discerns which pulses must be transmitted at high speed over direct paths and which control information can be transmitted at slow rates over phantom channels as explained herein.

Control 25—18 is utilized only when a specific order is to be executed by the remote switching networks and has no direct bearing on supervision of line circuits. When no supervisory changes are taking place in the lines the remote network control 25—18 is quiescent.

(7) Synchronism Check: The synchronism check circuit 25—19 is charged with the responsibility of insuring synchronism between the line number counter 25—13 at the central office and the counters in the remote primaries.

Check circuit 25—19, to perform its assigned function, must be extended to the remote line counters over the primary controls 25—16, etc. A synchronism check is only provided when common control orders it. For example, at intervals of about 5 seconds a program in the common control may order a synchronism check by synchronism check circuit 25—19. The check circuit 25—19 sends pulses to all remote primary concentrators signifying a preparation for check of synchronization. At a prescribed interval thereafter the primaries send a reply in the form of a service request to the central office. If all replies from each of the primaries are delivered back to synchronism check circuit 25—19, no further action is taken. However, if any of the primaries fail to reply the synchronism check 25—19 delivers a signal to the sequence control 25—15 which in turn energizes the flag (Section IB3 supra) to the common control signifying a failure. Thus the synchronism check 25—19 consults common control only when a failure has occurred. If a favorable check is made no further action is necessary.

The synchronism check circuit 25—19 makes possible an observation that the line number counter or other common equipment may be at fault at which time the remote counters in the primaries will all differ from counter 25—13. Thus, in a situation where the check circuit 25—19 determines that each of the primary counters are out of step with counter 25—13 it inferentially signifies that the counter circuit 25—13 or other common equipment is at fault since it is highly unlikely that all of the remote primary counters will coincidentally malfunction.

(8) Control Selector: The control selector 25—20 performs the local control functions necessary to control the RCC. It is used to set and reset flip-flops at specified locations within the remote concentrator control circuits under the supervision of common control. For example, when common control elects to inform the RCC equipment that a service request has been fulfilled and theerfore the flip-flop representing the service request must be reset, it does this by energizing the control selector 25—20 which in turn resets the specific flip-flop.

By contrast, the remote network control 25—18 can not affect local control equipment but only that equipment which is remote. In essence the control selector performs a local function in governing the action of control equipment in the central office which is not sufficiently critical to justify a direct bus connection to the common control.

As a further illustration, when common control elects to send instructions to remote network control 25—18 it prepares a parallel binary number which is gated into control 25—18. This information is sufficient to perform the necessary switching functions. However, due to logical circuit design considerations it is inappropriate for remote network control 25—18 to immediately perform functions based on the receipt of a parallel binary number from common control since the parallel digits may not arrive at precisely the same time. Instead, the information is gated into remote network control 25—18 in parallel and time is permitted to elapse to insure full registration of all of the binary information. Subsequently, a gating signal will be supplied to remote network control 25—18 to start transmitting the information stored therein. The latter gating signal is supplied by common control through control selector 25—20 to remote network control 25—18.

It is therefore unnecessary to establish an inflexible time relationship between the RCC and common control.

(9) Office Scanner: The office scanner 25—21 is a scanner which examines directly connected (unconcentrated) substation lines and is not related to the scanning equipment at the remote primaries. The function of that portion of the office scanner 25—21 which is associated with remote concentrators is to examine the primary controls 25—16, etc., and certain other flip-flops within the RCC to observe the particular signal information stored therein.

The points examined by office scanner 25—21 include such terminals as the supervisory registers or flip-flops in primary control 25—16 which indicate service request, hangup or answer conditions. Similar flip-flops which indicate the motivation for a specific flag condition may be scanned by scanner 25—21. In this sense, office scanner 25—21 is treated as a part of common control for the purpose of advising common control as to the causes for flag signals delivered to common control. It is significant to observe that although office scanner 25—21 may scan direct lines, as explained herein and in the application of Budlong et al. supra, it cannot perceive information about a specific remotely concentrated line. Its reach extends only as far as the RCC.

Thus the office scanner may see an indication of a service request in primary controls 25—16 but cannot uniquely identify it with a particular subscriber's line. In short, the office scanner supplies information to the common control about the concentrator system generally but not in relation to a particular remotely concentrated line. All of the individual line scanning is done in the remote primaries as will be explained infra.

C. *General Description of Typical Call*

(1) Quiescent Condition: For purposes of illustration a typical call will be traced from substation 25—22 to substation 25—23. Initially substations 25—22 and 25—23 are "on-hook." Common control is periodically examining for a flag as explained above and observes none. The sequence control 25—15 continues to send advance pulses since it receives no control signals or service requests which would cause it to stop. Thus it generates a train of advance pulses at 2 millisecond intervals which step office line counter 25—13 and are further transmitted by way of the remote secondaries to the individual counters (not shown) in the primaries. The remote line counters are all being stepped in unison and in synchronism with line counter 25—13 at 2-millisecond intervals. No information is being supplied to the central office since no changes are taking place in the system. The only equipment within the RCC which is active includes sequence control 25—15, the office line number counter 25—13 (both in continuous operation) and synchronism check circuit 25—19 which operates approximately every 5 seconds as explained above.

(2) Off-hook Condition Precipitates Service Request: When subscriber 25—22 (connected to line *n*) goes off-hook the scanner (not shown) in the remote primary will observe the service request when the counter advances to line number *n*. A pulse signifying a service request is sent by the remote primary 25—32 over phantom channels which go directly to primary control 25—16 at the central office. Although these phantom channels are geographically routed through the remote secondary 25—37, the remote secondary performs no useful function with regard thereto. When the service request pulse arrives in primary control 25—16 it sets a flip-flop signifying this condition. This in turn produces a flag indication to common control via sequence control 25—15 and at the same time governs sequence control 25—15 to discontinue the train of advance pulses. Accordingly, all local activity in the RCC is halted.

The service request pulse at the primary was initiated in view of the scanner having arrived at a terminal (connected to line *n*) signifying a service request and the subsequent arrival of an advance pulse at the remote primary.

It is understood, of course, that service requests or other supervisory indications may be present in other lines and registered in the corresponding primary controls. The result is the same, i.e., producing a flag indication for common control.

(3) Common Control Through Office Scanner Recognizes Service Request: A delay now obtains of about 2 to 3 milliseconds before common control returns to the RCC and observes the flag. When common control observes the flag, it cannot as yet perceive what sequence of events caused the flag and therefore enters a part of its program which relates to the concentrator system and advises common control what general procedure to follow in response to any flag.

Accordingly, common control is governed by its program to direct the office scanner 25—21 to determine which condition caused the flag. The order which the scanner 25—21 follows in making its observations is predicated on the relative criticality of the condition which might have caused the flag. This will be illustrated in further detail herein. Thus certain points may indicate equipment failures and would receive a high priority in examination by the office scanner, since this type of information is vital to common control. In essence, the office scanner 25—21 proceeds first through the high priority examination points and if it finds no signals proceeds further to the supervisory indication points related to primary controls 25—16, etc.

In examining supervisory conditions, the office scanner 25—21 first looks for hangups, then answers and finally service requests. If the office scanner 25—21 detected a hangup before it reached the service request manifested by substation 25—22, common control would have proceeded to the routine involved in the handling of a hangup.

Having done this common control divorces itself from the RCC and proceeds to its other activities (as explained in Budlong et al. supra) and will not have another opportunity to learn of the service request by substation 25—22 until it returns to the RCC in accordance with its usual pattern in about 5 milliseconds.

However, if no condition had obtained other than the illustrative service request on line *n* when office scanner 25—21 performed its function, it will read a service request on primary 00 (25—32) in consequence of a flip-flop (not shown) energized in primary control 0 (25—16). Knowing the number of the primary control inferentially provides the number of the secondary in view of the direct connections therebetween. Thus the only additional information lacking to completely identify the substation is the line number. To get this information common control examines the number registered in the line number counter 25—13.

At this time, common control has all the information necessary to expedite the service request. It has information pertaining to the line number, the remote primary number, the remote secondary number and the type of control function required, i.e., service request.

Common control now refers to a barrier grid memory described herein to examine the records for remote primary 00 (25—32) to ascertain whether the service request is a new and genuine request or merely a malfunctioning of the equipment.

It may be noted that each of the control signals from the remote primary is two-valued, for example, the control signal indicating a service request is a two-valued function indicated sometimes hereinafter as SR/CPF, the SR indicating service request and CPF, crosspoint failure. By reference to the memory in the barrier grid store common control can verify that there was no previous service request by this subscriber and that this is therefore a genuine service request. These two-valued signals will be explained in further detail herein.

(4) Originating Connection to Calling Customer: After determining that it is a genuine service request the first major function of common control is to provide a connection between the central office and the calling substation in order that the subscriber may key the digits of the called number. Common control by reference to a memory selects an appropriate route to effect the connection which may illustratively include link 25—11 and trunk 25—12 and delivers this information to remote network control 25—18 after recording it in the memory. The instructions from common control to remote network control 25—18 dictate that link 25—11 and trunk 25—12 be utilized to effect the connection. Having given this information to remote network control 25—18, common control dictates to the control selector 25—20 that it energize network control 25—18 to start sending the necessary control impulses to effect the connection. Once energized, network control 25—18 proceeds under its own initiative for approximately 15 milliseconds to transmit the information. It operates on the information conveyed from common control to deliver the appropriate control intelligence to both the remote primary 25—32 and the remote secondary 25—37 through the terminals of primary control 25—16 and secondary control 25—17.

It may be observed at this time that it is unnecessary to transmit through network control 25—18 the line number of the calling line since when the counter arrived at the line having a service request it conditioned a line selector (not shown) in remote primary 25—32 to provide a connection to that line as explained herein. The counter thus addresses the line scanner and the line network control selector simultaneously.

The only path information that need be transmitted by network control 25—18 is a one-out-of-ten indication for the links and one-out-of-ten indication for the trunks. This follows since the numbers of the links and trunks bear a predetermined relationship, e.g., if the link 9 were the selected link for the remote primary concentrator then trunks 90 to 99 would be available in the remote secondary concentrator.

After the control selector 25—20 has been actuated by common control to initiate operation of the remote network control 25—18, the control selector prepares a path to reset the flip-flop (not shown) indicating the service request condition in primary control 25—16 originated by sequence control 25—15.

It may be observed that remote network control 25—18 is connected to sequence control 25—15 to insure that when network control 25—18 is transmitting the information stored therein by common control, the operation of sequence control 25—15 is arrested to prevent any further advance pulses. Thus, when the flip-flop (not shown) indicating the service request was reset in primary control 25—16, the advance inhibit is not released since sequence control 25—15 is now inhibited by remote network control 25—18 from transmitting further advance pulses until network control 25—18 completes its transmission function.

However, when common control actuated control selector 25—20 to energize network control 25—18, the flag in sequence control 25—15 is removed since it would be inefficient for common control to observe a flag and not be able to seize remote network control 25—18 for the purpose of effecting the necessary connections. Therefore, whenever remote network control 25—18 is operative the flag indication to common control is inhibited.

Since the flag was removed when remote network control 25—18 was energized and the service request flip-flop in primary control 25—16 was reset by control selector 25—20, sequence control 25—15 can return to its primary function of generating advance pulses as soon as remote network control 25—18 has completed transmission of the order information stored therein. In the interim, the entire concentrator system remains motionless for approximately 15 milliseconds until network control 25—18 completes its function.

The customer at substation 25—22 is now provided with a path through the remote primary and secondary concentrators to the central office. These crosspoints (as shown herein) are much faster in operation than the control pulses which energize them. In consequence, when network control 25—18 has completed its function the circuit is already established. Common control now actuates the central office distribution network 25—35 to effect a connection between trunk 25—12 and a digit detector 25—36 which can receive alternating-current dial pulses.

A connection is now established between the customer at substation 25—22 and the digit detector 25—36 which latter transmits dial tone to the calling subscriber. The subscriber keys the desired called directory number into the digit detector 25—36 which transfers it to common control.

The sequence control 25—15 is automatically reenergized if no other flag-producing conditions exist and resumes transmission of advance pulses. Common control through its own program makes the necessary translation from the received directory number digits to establish the terminating station equipment number. In the assumed illustration the common control will arrive at a translation representing the equipment number of called substation 25—23. Preparations are now made to establish a terminating call to that station.

(5) Terminating Connection to Called Customer: As a result of the translation, information pertaining to the concentrator group number, secondary number, primary number and line number of the called station will be obtained. Common control now selects the line number and gates that number into a register within common control referred to as the line match register. This number is a six-bit binary number corresponding to line number *k*. Common control arranges for the line number counter 25—13 to stop at a number equivalent to line number *k*. This is necessary since the network selector (not shown) in the primary is controlled by the line number counter in the primary.

Having stored the six-bit number in the line match register 25—24, common control now directs control selector 25—20 to regulate line number match 25—14 to effect a match between the number stored in the line match register 25—24 and that stored in line number counter 25—13.

A match is effected between the number stored in the flip-flops of the line match register, as explained in detail herein, and the number stored in the line number counter 25—13. The necessity for advising control selector 25—20 to initiate a specific match is that line number match 25—14 will constantly be producing match conditions between the last number which has not been erased from the line match register 25—24, as explained further below, and the number stored in the line number counter 25—13.

When the counter arrives at the number representing line number *k* after an average waiting time of approximately 60 milliseconds, an output is produced in line number match 25—14 and delivered to sequence control 25—15 which will send a flag indication to common control. Again the entire concentrator system remains static until common control observes the flag indication. In this respect it may be noted that each time common control observes the flag, it must determine how the flag indication was created and whether this particular flag indication is related to a previous indication or represents an entirely new situation.

To identify the origin of the flag indication, common control directs the office scanner 25—21 to proceed through its scheduled scanned cycle described above. The office scanner 25—21 informs common control that a match has been effected. In this case office scanner 25—21 is physically observing a flip-flop in line number match 25—14 signifying a match condition as described in detail herein.

Common control refers to its memory wherein there was previously stored the translated number signifying the equipment designation of substation 25—23. In addition, common control determines from the switching memory whether the called station is recorded as a working number for any other connection. This is, in effect, a busy test. If the busy test indication is positive, calling substation 25—22 is given a busy tone, the match condition is cleared and the concentrator system disregards the call entirely and proceeds on its regular cycle.

If substation 25—23 is not listed in the switching memory as being active, it is presumed to be idle. There is still a possibility, however, that substation 25—23 might have gone off-hook during the last cycle of the line scanner. Information to this effect must be acquired by common control to prevent ringing while the customer has the subset to his ear. Just before the connection is established for the terminating portion of the call the office scanner 25—21 is advised to make a directed scan, i.e., not to proceed through all of the usual supervisory points but to proceed directly to the service request output of the primary control for the subscriber being called. If a service request is detected the call is nevertheless completed but no ringing takes place.

If the line 25—23 is still on-hook, however, common control examines its switching memory to select an appropriate link and trunk for the connection. Once the decision is arrived at it records the allocated link and trunk in the switching memory and sends corresponding information to remote network control 25—18. A further signal is delivered to control selector 25—20 to initiate transmission of signaling by remote network control 25—18.

Common control now resets the flip-flops in line number match 25—14 which created the flag condition. When remote network control 25—18 completes transmission of the information stored therein, sequence control 25—15 is permitted to resume transmission of advance pulses and the RCC returns to its usual cycle. In the interim, common control has instructed the distribution network 25—35 to establish a ringing connection to the called substation 25—23 in the manner explained in the application of W. A. Budlong et al. supra.

(6) Verification of Connection: It is now necessary to verify that a connection has been established to the called station. At the time that a connection is established to a customer who is on-hook, a signal will be detected by means of the link scanner as explained herein and the local link memory inside the remote concentrator will generate a signal identified as HU/CPC. This is a two-valued signal designating either hangup or crosspoint closure. This signal is transmitted over one of the phantom channels from remote primary 39 (25—38) to primary control 39 (25—34) and sets a flip-flop similar to the service request flip-flop. This flip-flop produces a flag indication and halts the sequence control 25—15. Common control directs the office scanner 25—21 to make the usual examination to detect the reasons for the flag. The office scanner detects the HU/CPC signal and advises common control which then consults its memory to examine the past history of this particular remote primary. Common control will observe that a terminating call had just been completed to substation 25—23, and can therefore establish that this indication is not a hangup since subscriber 23 has not been off-hook. Inferentially, therefore, it must be a CPC or crosspoint closure which verifies that the correct switching operations were completed at the remote primary concentrator.

A separate timing program inside common control is waiting for this signal and if it had not arrived within a predetermined time an alarm indication would have been forthcoming as explained herein. When the returned HU/CPC signal arrives, the sequence control 25—15 is inhibited and a flag is generated until common control takes the necessary action and resets the flag. Common control now records in its memory the fact of return of the HU/CPC signal.

It may be noted that the SR/CPF signal indicates, in the CPF portion, failure to make an originating connection or failure of an established connection. If in establishing the originating connection through the remote primary 25—32, a crosspoint had failed, a control signal would have been generated on the next revolution of the scanner, simulating a service request. Thus, the sequence control 25—15 does not await return of the CPF control signal. This signal is derived inferentially by a second service request during the period in which common control through reference to its memory has established that this particular line has generated a previous service request which is still being processed.

In general, four elements of equipment are involved in each call between lines connected to concentrators, namely, two remote primaries and two remote secondaries. The remote primaries are safeguarded by the CPF and CPC features. In checking the remote secondaries, remote network control 25—18 makes a verification when switching signals are issued to the remote secondary. The remote secondary performs its own checking function when orders are transmitted to it by remote network control 25—18 and at that time returns a signal to the network control 25—18. If the secondary network had malfunctioned, an indication would have been made to the sequence control to set a flag for the common control. This flag is a high priority scan point for the office scanner 25—21.

When the ringing connection is established, ringing signal is applied to the trunk leading to substation 25—23 and an audible ringing tone is applied to the trunk connected to substation 25—22.

(7) Answer: When substation 25—23 answers and the switchhook is lifted, this condition is observed at the link scanner in remote primary 25—38 and a control signal ANS/CPR is returned to sequence control 25—15. This signal arrived via primary control 25—34 where it sets a flip-flop. All advance pulses stop until common control observes the flag and calls in the office scanner 25—21. Common control learns from office scanner 25—21 that the signal creating the flag is an ANS/CPR signal on primary control 25—34. Common control refers to its memory and learns that ringing was in progress for line number $k$ over this particular link and therefore infers that the signal represents answer (ANS) rather than crosspoint release (CPR). In consequence, common control discontinues ringing and provides a path through the office distribution network between the calling and called trunks and conversation may ensue.

An "alert" signal is provided for flashing common control in a manner analogous to that in which the operator is now flashed. This type of arrangement is necessary in customer group services. The flash indication is provided on a direct-current basis. A resistance-capacitance delay keyed by the subscriber opens the line for a predetermined time shorter than the interval indicating a hangup signal. This period is approximately 100 milliseconds. The alert signal does not produce a service request since the loop scanner does not observe conditions on lines which are already active. However, the link scanner observes this signal which simulates to it a hangup followed by an answer. If the answer follows the hangup by approximately 60 to 200 milliseconds the signal is interpreted as an alert signal.

(8) Hangup: If either of the customers engaged in conversation hangs up, the link scanner observes this condition. A signal (HU/CPC) is transmitted and sets a flip-flop in primary control 25—16 (assuming subscriber 25—22 hangs up first) which inhibits the sequence control 25—15 and sets a flag for the common control. The common control resolves from its memory that talking was in progress and therefore that the signal must be a hangup (HU) rather than a crosspoint closure (CPC).

After the hangup the connection remains established between the calling subscribers but common control undertakes the necessary timing functions and allows the concentrator system to return to its usual scanning cycles.

Common control deduces from the hangup signal and the time elapsed since its recognition (more than 200 milliseconds) that the connection should be taken down. By reference to its memory, common control finds a description of the actual connection, composes an order word, stores it in network control 25—18, and advises control selector 25—20 to initiate transmission of the word.

It may be noted in this respect that although it is necessary to synchronize the remote system with the office equipment during a connection, the same is not required in the case of a release. Although it is necessary to specify both ends of a network in order to establish a connection only one side is required to take it down. With the use of a PNPN crosspoint it is merely necessary to disrupt the current flow to one terminal of the PNPN to permit the crosspoint to open. For a more comprehensive description of a PNPN crosspoint suitable for use in the remote primary and secondary concentrators reference may be made to an application of W. C. Jones et al., Serial No. 798,746, filed March 11, 1959.

When common control makes the decision to take down the existing connection it does so without any time correlation to the concentrator system or remote units. Therefore, when common control elects to store the order word for taking down the connection in remote network control 25—18, it must ascertain that this device is free and not engaged. A separate path from common control to network control 25—18 designated RCT is used to inform common control that network control 25—18 is free to receive additional information.

Since although remote network control 25—18 is free the sequence control may be in the middle of a cycle of advance pulses, it is provided that network control 25—18 may not begin transmission of an order word until sequence control 25—15 has completed a full cycle.

(9) Release of Connections: Network control 25—18 now transmits the order word to the remote primary and secondary to release the connection. The flag indication is barred during this period since network control 25—18 is engaged in transmission of an order word.

An indication of release of the crosspoint in the secondary must be verified immediately since there is no provision for entering the secondary at an arbitrary time to observe the condition of a crosspoint. The remote network control 25—18 has an added responsibility in this instance to determine the successful release of the crosspoint by a signal which is transmitted over the signaling channels by way of secondary control 25—17. If the signal is received network control 25—18 permits the sequence control 25—15 to resume normal operation.

It is to be noted that disconnection of an established path is a "break-in" function. This distinguishes it from the setting up of a connection wherein the remote equipment summons common control and discontinues all activity until a response from common control is made. In the present situation common control breaks into a running operation of the concentrator to perform its function.

Thus when the hangup indication was received in the central office and the flag was set in accordance therewith, common control recorded the hangup indication and reset the hangup flip-flop, thereby releasing the flag and permitting the sequence control 25—15 to resume operation. Common control recognizes that the hangup persists in view of the failure to receive any additional answer signals for the particular line involved during a timing cycle performed within common control. Common control thereupon "breaks into" the operation of the RCC (remote concentrator control) as a result of timing functions within common control, explained herein.

Thus far, the release operation has been checked in the secondary and scanning has been resumed. It still remains to check the release of the primary crosspoint. Within the next link scan of approximately 20 milliseconds, an additional signal will be generated in the primary indicating the release. This signal is designated ANS/CPR. This signal is transmitted via primary control 25—16 to the sequence control 25—15 which sets a flag and stops the operation. Common control is called in and examines its memory to resolve the ambiguous signal. Information in the memory of common control permits resolution of the newly arrived signal as CPR or crosspoint release. This operation is somewhat analogous to the timing cycle undertaken by common control in awaiting a CPC signal. At the time the remote network control 25—18 was ordered to begin transmission of the release order, common control set in process a timing cycle to await the arrival of a CPR signal. If it had not arrived within a predetermined interval an alarm would have been indicated.

At this time the path between subscriber 25—22 and the central office has been successfully disconnected and the network registers in the barrier grid store have been altered accordingly. It is now necessary to disconnect the path between subscriber 25—23 and the central office. This may be done by interrupting the path at the secondary 25—33 and posting the memory to this effect, but allowing the crosspoint to remain closed at the remote primary 25—38 until the subscriber returns to the on-hook condition, at which time a hangup indication is received and the primary crosspoint may be opened in a manner similar to that explained above for remote primary 25—32. The disconnection of the path to subscriber 25—23 may also be accomplished in other ways as explained herein.

II. DETAILED DESCRIPTION

For simplicity of illustration there will be initially described the system operation during a quiescent period when no traffic is in effect. It will be assumed that the operation is at that instant in time when an advance pulse is to be transmitted.

It is understood that the specific detailed structures of the flip-flop circuits, delay amplifiers and other equipment shown in outline form in FIGS. 1–24 are not essential to an understanding of the present invention. For convenience of reference, however, FIGS. 28–35 show illustrative arrangements of some of the more frequently used components. It is understood that other appropriate apparatus may function as well.

A. *Detailed Description of Major Components*

(1) Timing Functions of the Sequence Control Circuit: Referring now to FIG. 21, the structure therein depicted shows the details of sequence control 25—15. The cycle of timing may first be examined at AND gate 21—11. Three conditions at the input of this gate are necessary to produce an active output. One of the inputs to gate 21—11 comes from inverter 21—12 which in turn is fed by amplifier 21—13, the latter being operated by OR gate 21—14.

The inputs to OR gate 21—14 represent conditions which would interrupt the cycle of advance pulses. If any of the inputs to OR gate 21—14 is active it is an indication that advance pulses should be interrupted and that a flag should be set to summon common control. It will be assumed at this time that OR gate 21—14 is inactive and amplifier 21—13 is inactive whereupon inverter 21—12 will be active and one of the inputs to gate 21—11 is active. One of the remaining two inputs to gate 21—11 is an input from flip-flop 21—15 via amplifier 21—16.

Flip-flop 21—15 is used to indicate the termination of a 2-millisecond cycle and that the circuitry in FIG. 21 is in a condition to undertake a new advance cycle. The third input to gate 21—11 over conductor BH1 derives from the remote network control shown in block form in FIG. 25 and in detail in FIG. 9. The conductor BH1 is used to signify by its condition that the remote network control has completed any current function and is free to undertake further activity.

If all of the inputs to coincidence gate 21—11 are active, the gate is operated thereby energizing monostable amplifier 21—17 which produces an output at amplifier 21—18. This output serves two purposes. One output from amplifier 21—18 is used to reset flip-flop 21—15 over an obvious path.

The other output from amplifier 21—18 is connected to AND gate 21—19. The output from this gate over lead HG1 is used in FIG. 14 to step the office counters 14—12 through 14—17 (referred to in the general description as counter 25—13).

An output from inverter 21—20 energizes monostable circuit 21—21. It will be seen that the circuitry in FIG. 21 includes a timing chain technique whereby a monostable amplifier is followed by an inverter, followed by a monostable amplifier, etc. When the monostable circuit is energized the inverter provides the logical inverse of the monostable circuit output. When the monostable circuit completes its timing cycle the inverter rises and triggers the succeeding monostable circuit. The total time around the loop is, therefore, the sum of the "on-times" of all of the monostable circuits. The monostable circuits shown will, in general, be assumed to include differentiating circuits at the input thereof.

The output of monostable circuit 21—21 drives an inverter 21—23 via amplifier 21—22 and lead HG2 and ultimately operates monostable circuit 21—24. The latter operates inverter 21—25 which operates monostable 21—26 and inverter 21—27. Through a differentiating network 21—28, an OR gate 21—45 sets flip-flop circuit 21—15 to complete the cycle. If all inputs at gate 21—11 are still present, an additional cycle will be undertaken.

Illustrative "on-times" of the monostable circuits are, respectively, for monostable circuit 21—17, 10 microseconds; monostable circuit 21—21, 250 microseconds; monostable circuit 21—24, 1750 microseconds; and monostabe circuit 21—26, 10 microseconds.

If no external conditions change, i.e., no traffic is initiated, the pulse generator of FIG. 21 including the four monostable amplifiers continues to regenerate and recycle.

It is seen that amplifier 21—22 also provides an input to gates 21—30 and 21—31. The output of gate 21—31 is applied via conductor HC1 to bipolar transmitter 22—11 for transmission of the advance pulse to the remote primaries. The advance pulses are routed geographically through the remote secondary (where they have no effective purpose except to insure clearing of the link number counter) for distribution to the primary.

It will be noted that gate 21—31 is activated only when monostable circuit 21—21 and its associated amplifier 21—22 are activated and no synchronism check is being made, i.e., amplifier 21—33 is in the active state. This will be explained in further detail herein.

Bipolar transmitter 22—11 is designed to produce a carefully shaped pulse which will minimize interference with neighboring circuits. This shaping process requires a fixed pulse width for shock-exciting the shaping coils. For a detailed explanation of an arrangement suitable for use as the transmitter 22—11 (and receiver 22—15, etc.) reference may be made to an application of I. Dorros, Serial No. 824,433, filed July 1, 1959.

Amplifier 21—35 is driven by monostable circuit 21—26 to produce 10-microsecond pulses on leads HE1 and HF1. Conductor HE1 extends to FIG. 23, the synchronism check circuit explained herein.

Conductor HF1 extends to AND gate 14—25 where it determines whether a line number match condition should be presented to common control. This compares in FIG. 25 to the line number match circuit and also will be treated herein.

The monostable circuits shown in FIG. 21 govern the timing functions of the RCC (remote concentrator control). All remote supervisory functions are related to the operation of these four monostable circuits 21—17, 21—21, 21—24 and 21—26.

Monostable circuit 21—17 has a dual purpose, to drive the next monostable circuit 21—21 and to step the line number counter 14—12 through 14—17 and moreover to reset flip-flop 21—15 which indicates the end of a cycle.

Flip-flop 21—15, in addition to indicating the end of a timing sequence, is adapted to terminate the input signal delivered to monostable circuit 21—17. Thus the monostable circuit effectively terminates its own input signal by feedback through amplifier 21—18 and flip-flop 21—

15. For this reason monostable circuit 21—17 need not be equipped with a differentiating circuit at the input thereof, as are the other monostable circuits.

Monostable circuit 21—21 steps the next monostable circuit 21—24 and also provides output pulses which either become advance pulses or synchronism check pulses (explained herein). Monostable circuit 21—24 has only one useful output which steps the next monostable circuit. Finally, monostable 21—26 provides set information for flip-flop 21—15 and also provides output pulses on conductors HE1 and HF1 to coordinate other circuits with the timing function.

From the output of monostable 21—21 via amplifier 21—22, conductor HG2 extends to AND gate 14—11. The purpose of conductor HG2 is to control a reset circuit with the six-stage binary counter 14—12 to 14—17. This is an operation within the counter to prevent an output from the counter until a predetermined time after an input over conductor HG1. There is a finite propagation time through the six-stage counter which prevents utilization of the output states of the counter until all transient conditions have subsided. Gate 14—11 provides no output from the counter until the equilibrium state is achieved.

The inputs to flip-flops 21—36 and 21—38 extend from the control selector shown in block form at 25—20. These appear on leads JH1—JH4. Flip-flops 21—36 and 21—38 are wholly controlled by the common control. These flip-flops have two separate functions. One of the outputs of flip-flop 21—36 extends through amplifier 21—37 to OR gate 21—14. When common control elects to stop the generation of advance pulses arbitrarily it sets flip-flop 21—36 and through amplifier 21—37 sends a hold condition via lead 21—42 to the office scanner 6—13 and energizes OR gate 21—14 to stop the progression of advance pulses.

For example, if a checking routine is to be undertaken, energizing flip-flop 21—36 will activate OR gate 21—14 to produce a flag indication through amplifier 21—13 and AND gate 21—40 and at the same time provide a "hold" scan point at the beginning of the sequential scan undertaken by the office scanner. The purpose of energizing the "hold" flip-flop 21—36 is to initiate a special stop condition. This constitutes a self-imposed hold condition initiated by common control.

Flip-flop 21—38 is used to govern the two major inputs from the RCC to common control. These two are AND gates 21—40 and 21—41.

A flag produced by gate 21—40 results from the energization of amplifier 21—13 driven by OR gate 21—14 plus the energization of amplifier 21—39 and the energization of lead BH1 which indicates that remote network control (25—18) is not in use.

AND gate 21—41 is used to indicate that the remote network control 25—18 is available.

The purpose of flip-flop 21—38 and its associated amplifier is to permit common control to disengage itself from the RCC. The basis for utilization of flip-flop 21—38 is that periods will occur when common control will elect not to service the concentrator system. An example is when the RCC is in operational difficulty. Since at this time no useful information can be delivered by RCC to common control, gates 21—40 and 21—41 are disabled to prevent common control from being summoned by RCC. A type of failure that would require the setting of flip-flop 21—38 would be, for example, the disability of a timing monostable circuit in FIG. 21.

Referring again to OR gate 21—14 it will be seen that the input leads to the gate appear in groups of three, i.e. 21-0DH1 to 21-0DH3 through 21-39DH1 to 21-39DH3. These groups of leads extend from the respective primary controls in the central office and each group of three includes leads respectively designating hangup, answer and service request.

The inputs at the top of gate 21—14 include the hold function previously discussed, observation of a line number match and failure of the remote network control to receive verification from a secondary and also failure of the synchronism checking circuit to receive verification from all primaries.

Figure 14:
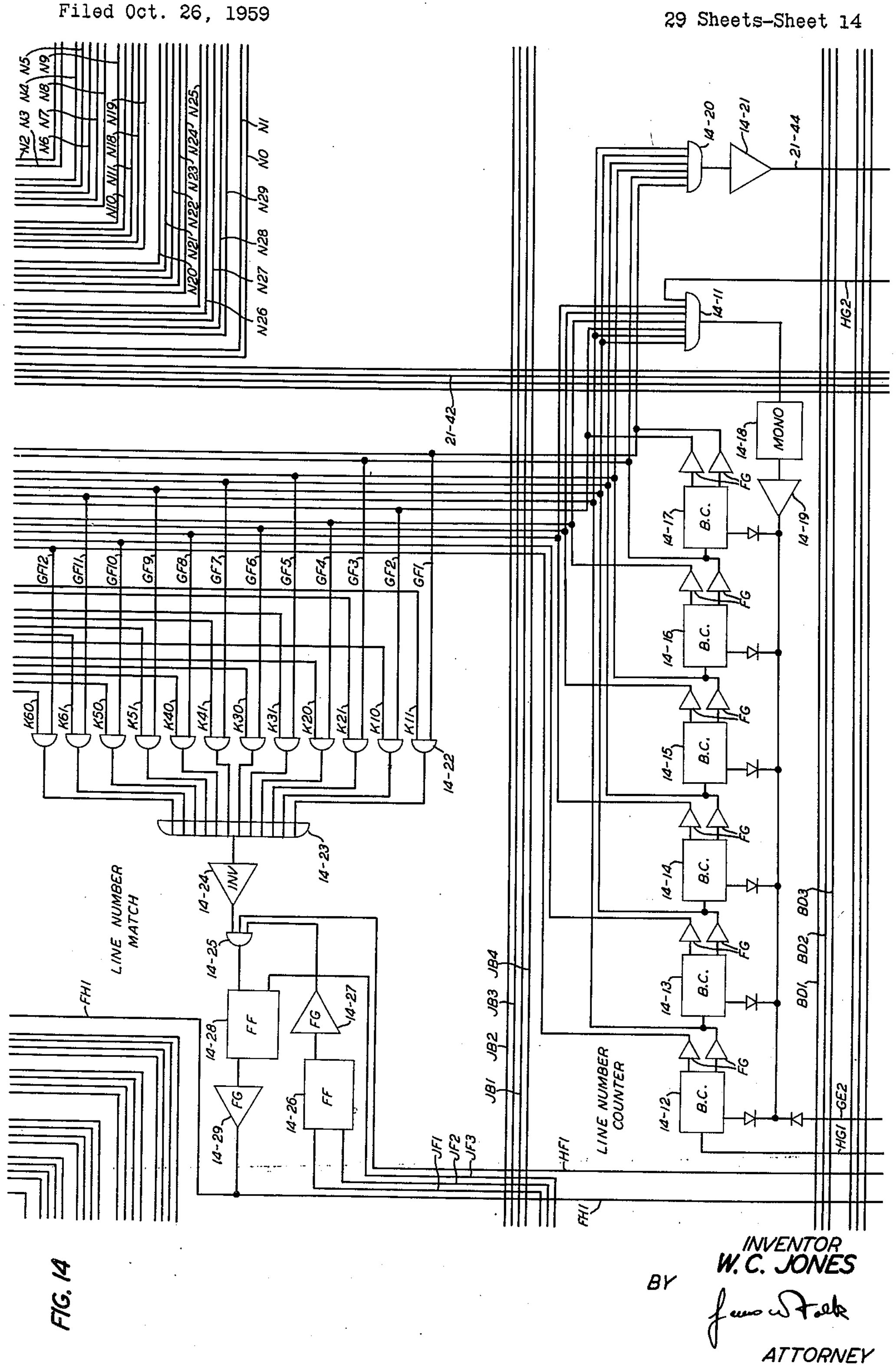
FIG. 14 shows the office counter and the line number match circuit.

The only additional equipment to that of FIG. 21 which is engaged during the quiescent condition includes the counter of FIG. 14 and the synchronization check circuit of FIG. 23.

(2) Line Number Counter in RCC: Referring now to FIG. 14, binary counters 14—12 through 14—17 comprise a counting chain having a capacity of 64. This apparatus records the number of advance pulses generated in a particular cycle. The line number counter is the master reference for the concentrator system and indicates the line currently being scanned.

Since only a count of 60 is required, gate 14—11, monostable 14—18 and amplifier 14—19 are used when the number 60 is recognized, to recycle the counter. Lead HG2 must also be activated at this time.

Each time the counter is stepped, an input appears at lead HG1 from monostable circuit 21—17. This process continues until the number 59 is reached. The count of 60 is momentarily produced but when lead HG2 becomes active as a result of the energization of monostable circuit 21—21, gate 14—11 causes monostable circuit 14—18 to be activated providing a reset indication for the entire counter via amplifier 14—19. The binary count in each stage of the counter is delivered over parallel conductors GF1—GF12 to common control at each cyclical advance.

The output from amplifier 14—19 extends over lead GE2 to the synchronization on check circuit in FIG. 23 to provide a pulse at the initiation of each counting cycle, i.e., number 00. An output also appears at amplifier 14—21 for the duration of the number 00. This output is also used in the synchronization check circuit as explained herein.

Only one further circuit is active on a no-traffic basis. This is the synchronism check circuit which corresponds to block 25—19 and will be explained in detail herein (at section IIA4).

(3) Path of Advance Pulses Generated in Sequence Control: The advance pulses originating at lead HC1, as explained above, from AND gate 21—31 are delivered to bipolar transmitter 22—11. In the bipolar transmitter, the advance pulse is converted from an illustrative 250-microsecond square wave to a pulse suitable for transmission to the remote primary with minimum interference.

For illustrative purposes, the path of the advance pulse will be traced from secondary control 0 (FIG. 22) of secondary number 0. Thus, the advance pulse may be traced from transmitter 22—11 in phantom form over conductors LCP and LCM, TTP and TTM, cable 22—16 to FIG. 19, trunks 100 and 101. These trunks 100 and 101 are in addition to the one hundred trunks used for conversation. Trunks 100 and 101 are reserved for master signaling functions and are not specifically associated with any particular line or trunk. In addition to carrying the longitudinal advance current signals, trunks 100 and 101 may also be carrying metallic current signals. These trunks are reserved for high speed control signals which may not safely be passed in phantom circuits on the speech pairs.

One of the reasons for using longitudinal signals for transmission of the advance pulses is that their speed of propagation remains unaffected by loading on the cable.

Figure 11:
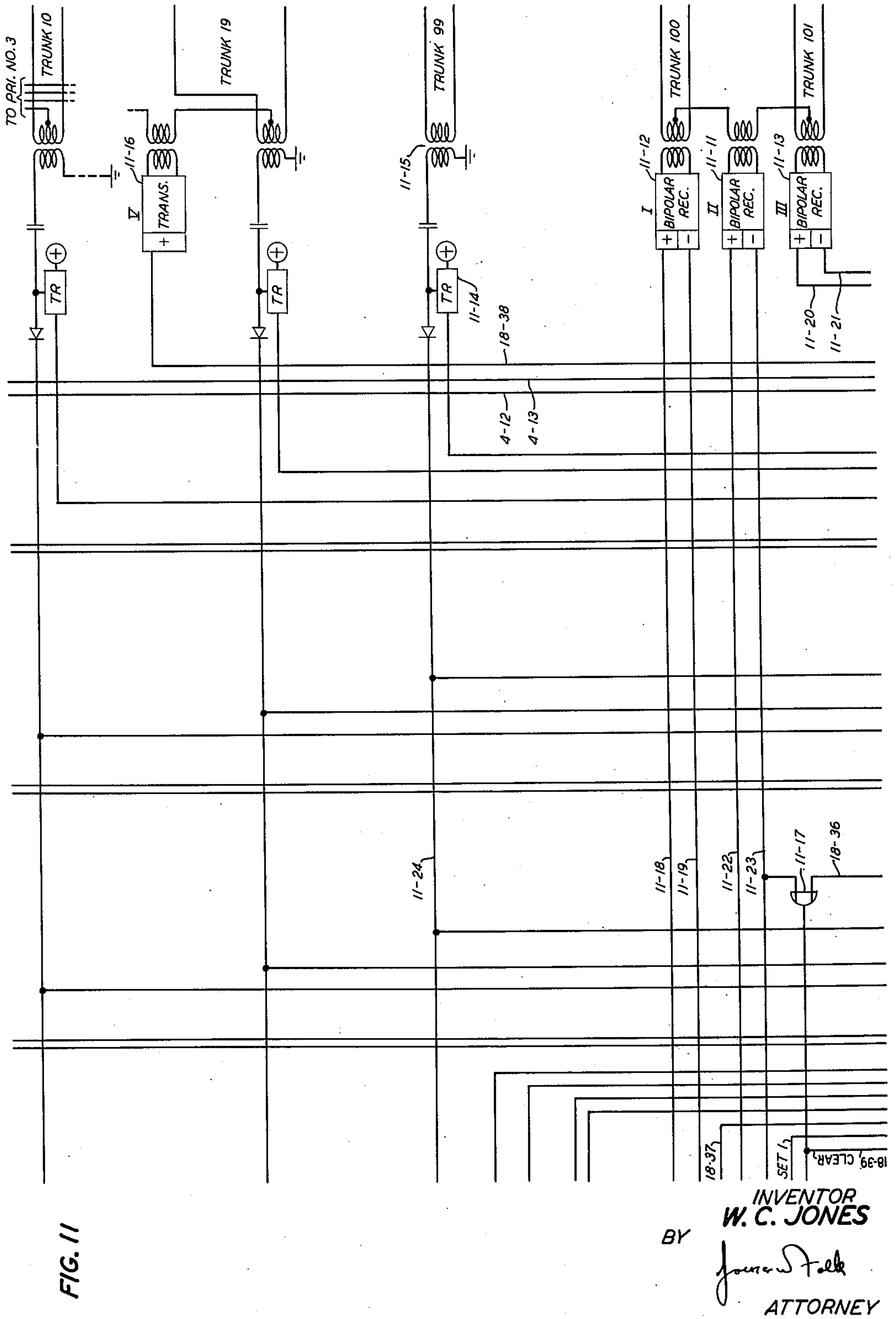
FIGS. 11 and 18 show additional equipment in the remote secondary concentrator including the trunk scanning and control equipment.
Figure 12:
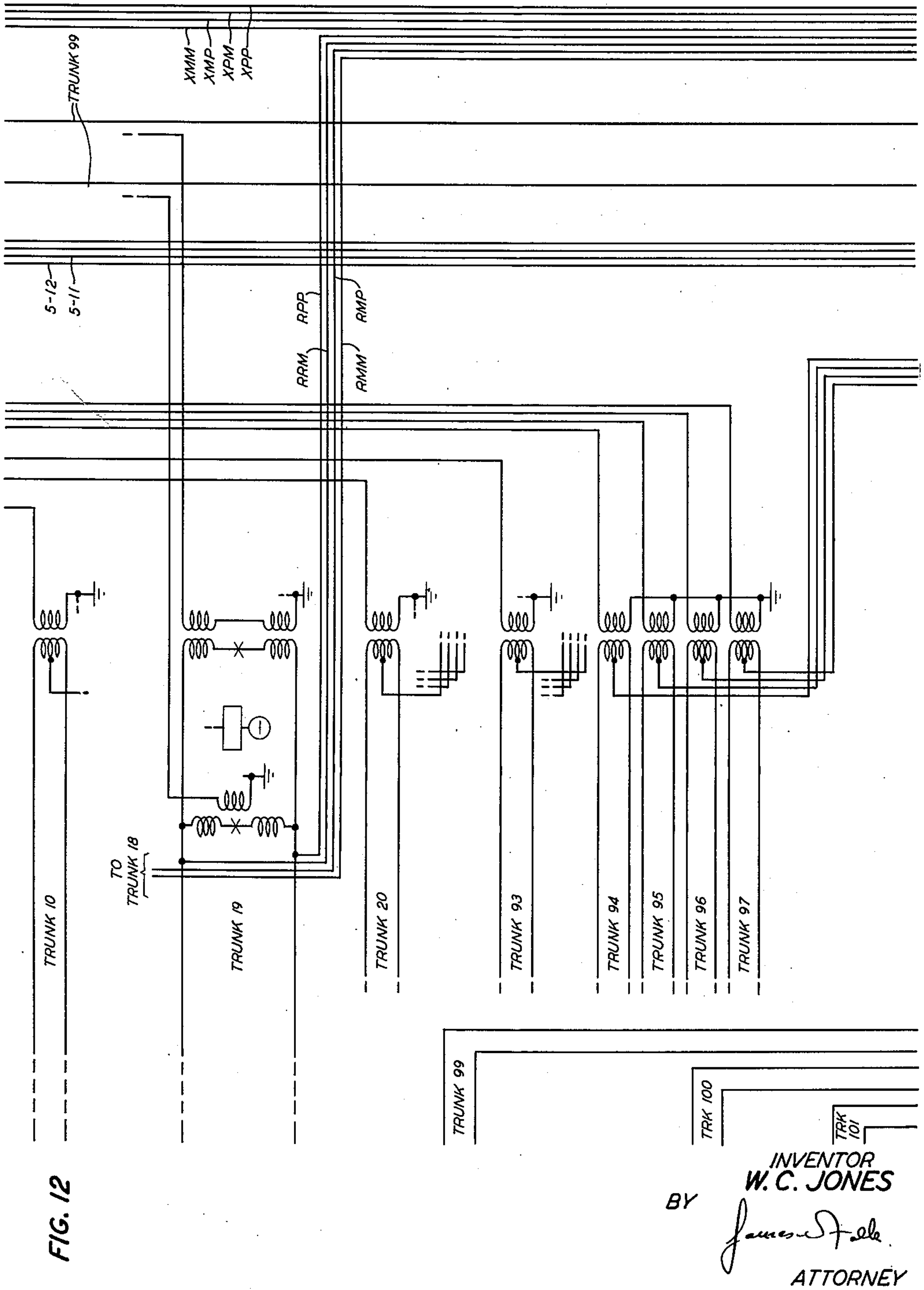
FIG. 12 shows additional trunk terminations in the central office.

Trunk circuits 100 and 101 terminate in FIG. 11 at bipolar receiver 11—11. This receiver restores the negative pulse to its original square wave shape. The output from receiver 11—11 passes to FIGS. 10 and 3 over conductors 11—22 and 11—23 where it is connected in multiple to transmitters 10—11 and 3—11 for further transmission over links to the remote primaries.

From the output of transmitter 3—11, link 10 transmits a signal to receiver 2—11 in the remote primary. It will be noted that link 10 is reserved for control signaling and that the advance pulses thereon are not phantomed but instead travel over metallic paths. At receiver 2—11 an output is produced corresponding to a negative input signal and performs two functions. One output is used over conductor 2—12 where it appears at AND gates 1—11, 1—12 and 1—13. These gates are used to formulate the three types of supervisory signals sent back to the central office. These signals as indicated above are SR/CPF, ANS/CPR and HU/CPC. Thus the advance pulse which appears as a momentarily active logic signal serves as a read-out signal on gates 1—11 through 1—13. If any supervisory signals exist at these gates they will be gated out by the advance pulses from receiver 2—11 and transmitted over transmitters 2—14 and 2—13.

For example, if a service request condition exists at AND gate 1—11, the advance pulse will read out the signal and it will be transmitted on a phantom basis back to the central office over transmitter 2—13 via lead 2—38.

If either hangup or answer is present at the time and andvance pulse arrives, activation of either gate 1—13 or 1—12 will produce, via conductors 2—39 and 2—40 respectively, inputs to the bipolar transmitter 2—14 which result in positive or negative output pulses.

It will be noted that conductor 2—12 is also connected via amplifier delay 1—14 to counters 1—15 and 1—16. These counters are situated within the remote primary.

The Mod 10 counter 1—15 is the units counter of a 60-step counter driven directly by the advance pulses. Each time the Mod 10 counter passes through 0 a single pulse is delivered to the Mod 6 counter 1—16.

The line scanner 1—17 is a saturated transistor tree and is structurally similar to line mark 1—18, link scanner 2—15, link mark 2—16 and link release 2—17.

Scanner 1—17 is illustratively a two-stage tree. It may take any suitable form. For example, in the first stage of the tree six transistors may be provided and in the second stage of the tree sixty transistors arranged in multiple-controlled groups of six each may be provided. The ultimate purpose of scanner 1—17 is to provide a temporary connection between each of the 60 scanner inputs in turn and detector 1—19.

The line mark 1—18 functions to place marking or controlling voltage on the PNPN network 1—20. It will be noted that the line scanner is continuously examining the lines connected thereto. At the same time the line mark selector 1—18 is being brought into usable proximity with the corresponding terminals of the network representing the line being scanned. In this respect it will be noted that to address line mark selector 1—18, the entire system is driven to the number representing the line to be addressed.

The advance pulse has now performed its two major functions—sampling the supervisory gates 1—11 through 1—13 and stepping the counters 1—15 and 1—16. The cycle is completed when any supervisory signals which may have appeared are transmitted back over phantom channels to the central office.

It will be noted that although the line scanner 1—17 and the line mark selector 1—18 are addressed by all sixteen outputs from counters 1—15 and 1—16 the link scanner 2—15 is addressed only by the ten outputs from counter 1—15.

From the relationship of the link and line scanners it is apparent that the links are scanned six times more frequently than the lines.

A more detailed explanation of the operation of the equipment in the remote primary concentrator is given in an application of Cirone-Harr-Lowry-Ridinger, Serial No. 824,294, filed July 1, 1959.

Briefly it may be seen that the pulse sources P1 and P2 are adapted to generate a first and second series, respectively, of superaudible pulses which are directed to the line and link terminals of the switching network. The appearance of the first and second series of pulses which are out of phase with each other is related to the closure of a particular crosspoint and the state condition of a substation to which a communication connection has been provided through the crosspoint.

The first and second series of pulses P1 and P2 serve as monitoring signals and may be scanned at the line terminals and link terminals to direct the appropriate supervisory signal (SR/CPF, ANS/CPR, HU/CPC) in response to the presence or absence of the pulses thereat to the central office.

It is seen that the remote primary is a full access arrangement in that any line can be connected to any link. The secondary is a partial access network since only ten trunks are available to each link.

The scanning elements 1—21, 1—17 and 2—15 are one step ahead of the counters 1—15 and 1—16. Thus, when the advance pulse arrives it reads out information which was stored during the previous scan, reducing the over-all time required for a scanning cycle.

When the counters 1—15 and 1—16 are up to the count of 37, for example, the loop scanner is looking at line 38. Viewed at the instant of time before the advance pulse arrived at the primary, the counter in the office reads 38 but counters 1—15 and 1—16 still read 37 while the advance pulse is en route in the cable between the office and the remote primary. At this particular instant in time the line scanner is already examining loop 38 and the link scanner and memory selector 1—21 are examining link 8 and have been for 2 milliseconds.

Figure 1:
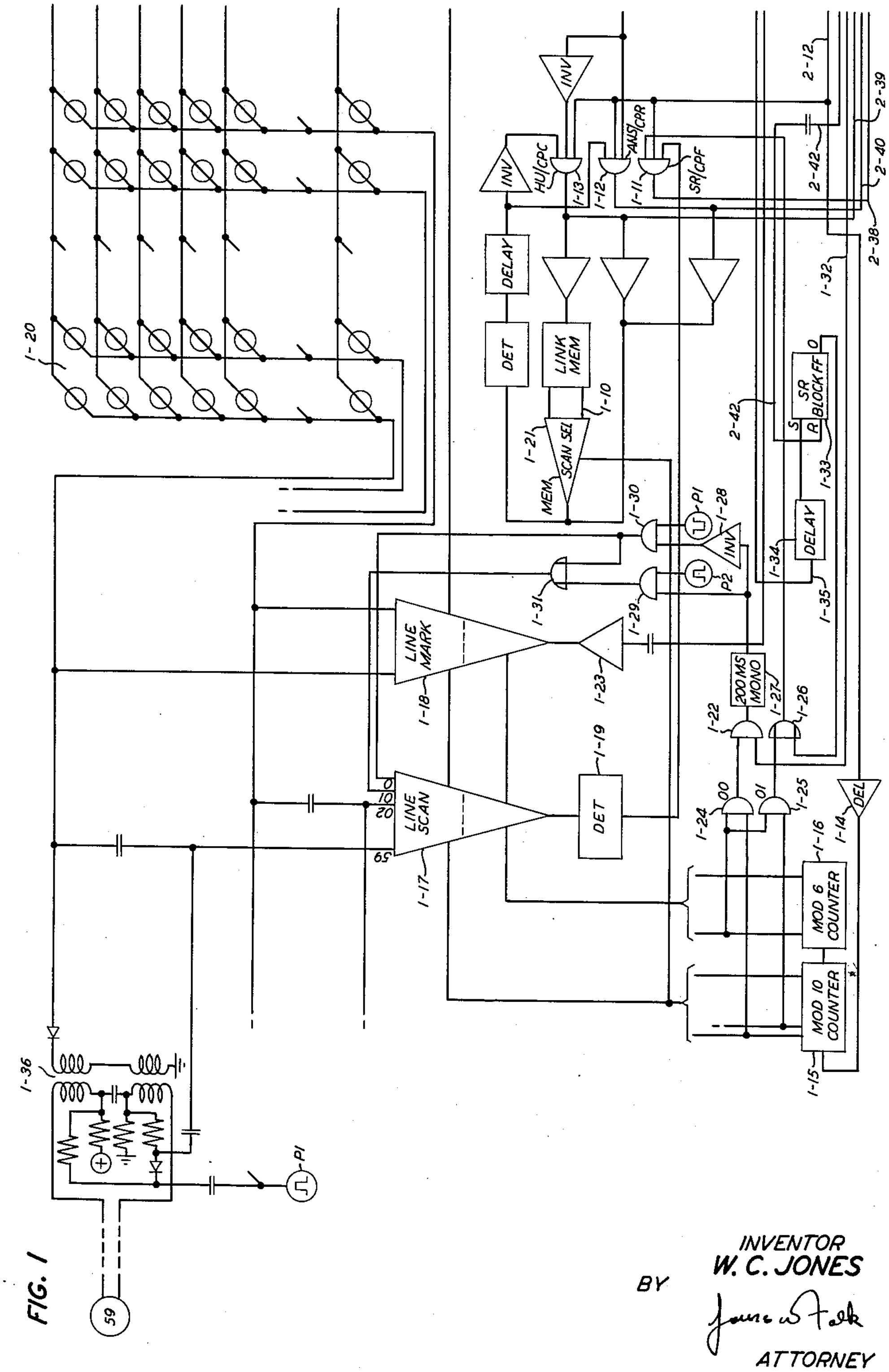
FIG. 1 shows a portion of the remote primary concentrator including the switching network thereat and a typical subscriber station.
Figure 2:
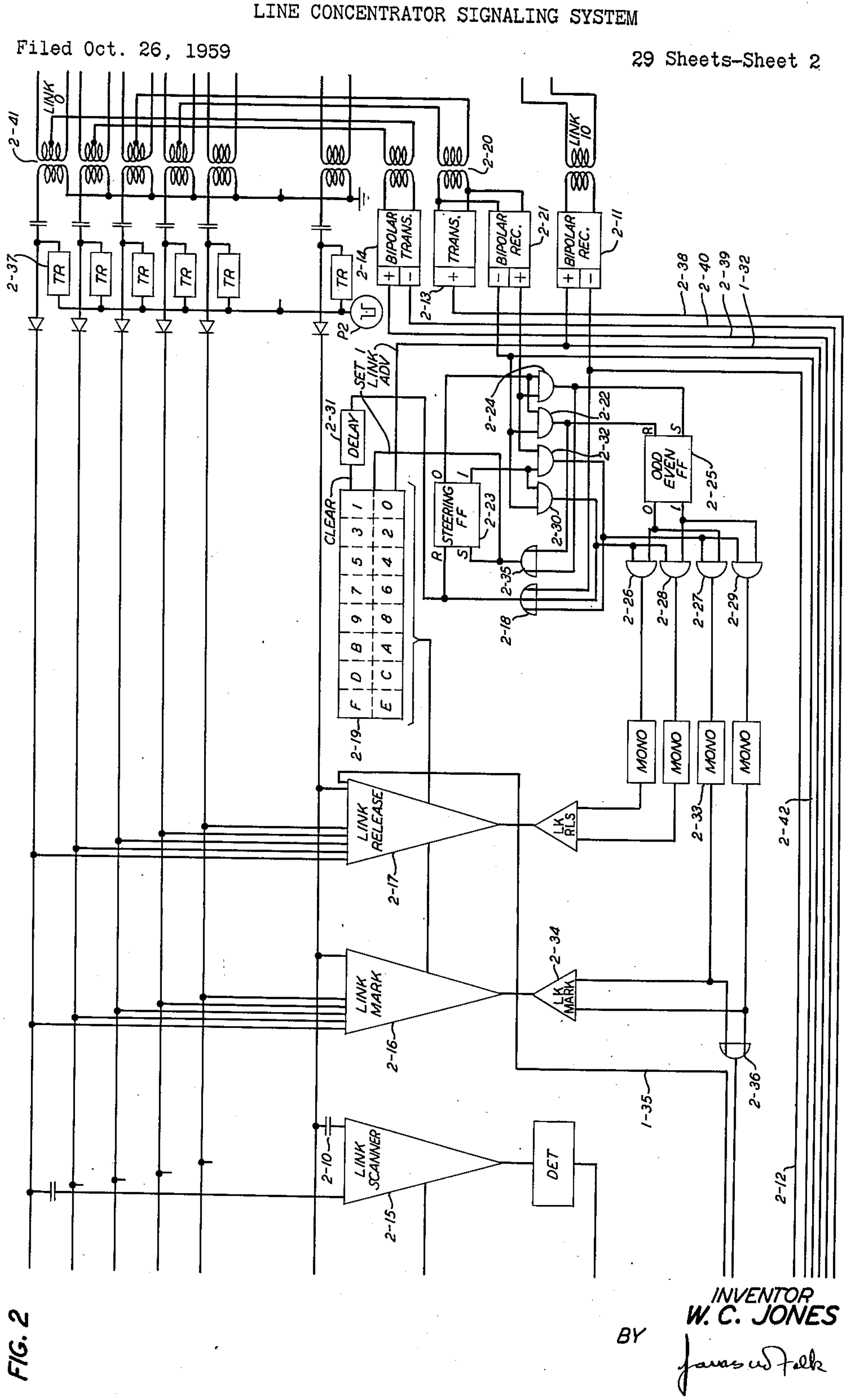
FIG. 2 shows an additional portion of the remote primary concentrator including the link supervisory and control equipment and the transmitters and receivers at the remote primary location.
Figure 3:
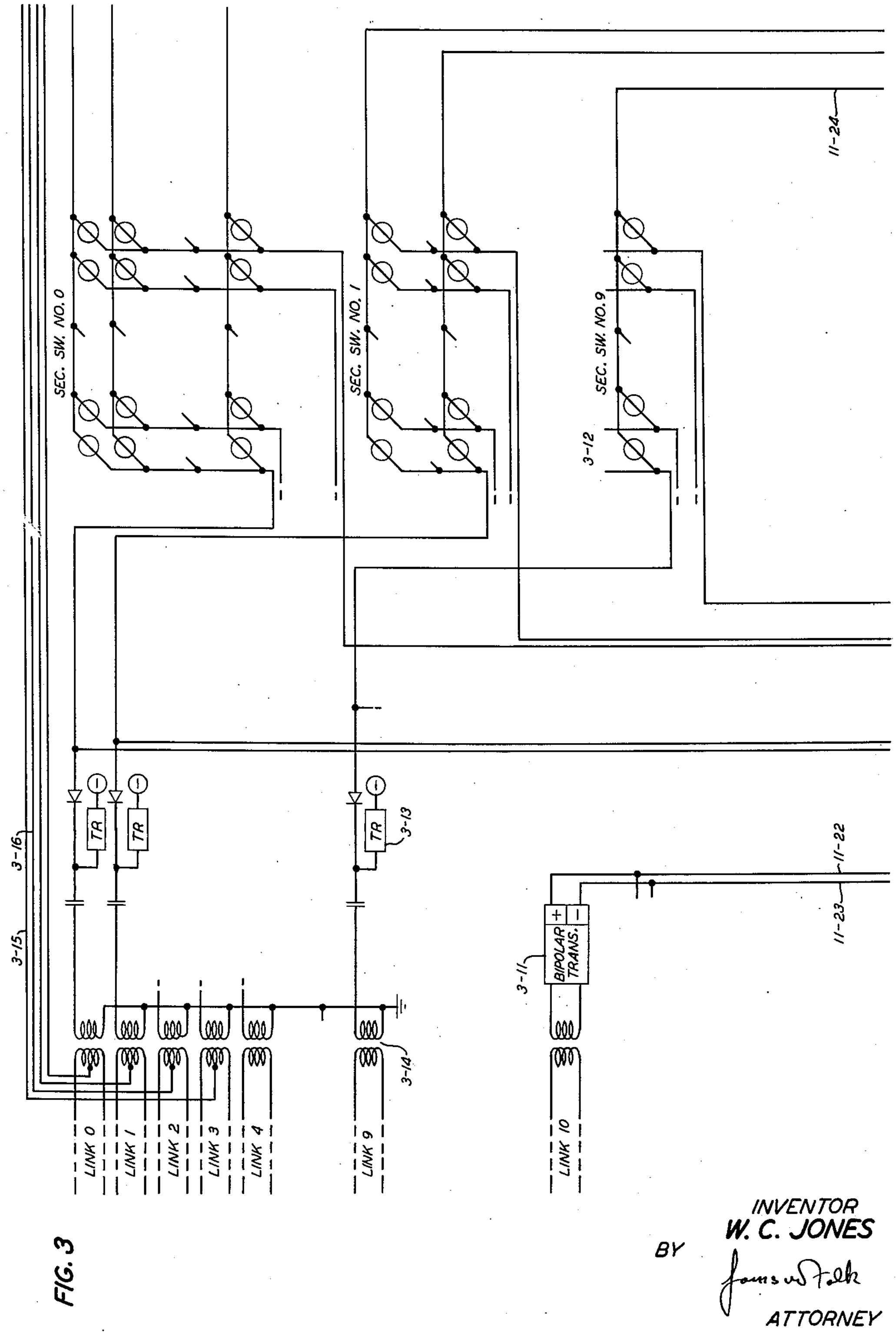
FIG. 3 shows the secondary concentrator including the secondary networks located thereat.

When the advance pulse arrives in FIG. 1 the information which it reads out from gates 1—11 through 1—13 was based on line 38. Since the office counter 14—12 through 14—17 now reads 38, the information is timely.

The delay interposed in the form of amplifier 1—14 prevents the advance pulse from stepping counters 1—15 and 1—16 until the supervisory gates have been read out, i.e., gates 1—11 through 1—13. Now the information is complete since the supervisory signals transmitted to the central office represent line 38, the office counter reads 38 and by this time the counters 1—15 and 1—16 read 38 thereby permitting any switching action to be taken with regard to line 38 by the line mark circuit 1—18 which also reads 38.

At the time the line mark selector 1—18 reads 38 the line scanner 1—17 has gone on to 39, and both memory scanner 1—21 and link scanner 2—15 have gone on to 9. Thus a mark instruction from the office directed to line 38 will permit switching of line 38 by the line mark selector. In short, the line mark selector 1—18 is one step behind the line scanner 1—17. It will also be noted that the link scanner 2—15 and scan selector 1—21 are also one step ahead of the units count in the Mod 10 counter 1—15. These factors are explained in detail in an application of Cirone-Harr-Lowry, Serial No. 848,594, filed on even date herewith.

If no supervisory signals are dispatched by gates 1—11 through 1—13, 2 milliseconds later a new advance pulse may be transmitted. Referring again to FIG. 21, monostable circuit 21—24 has the basic responsibility for timing the advance pulses and provides a delay of 1750 microseconds. This monostable circuit is made adjustable in order that where cable conditions require or distances are such that a basic cycle time of 2 milliseconds is too short it may be lengthened to suit the most distant concentrator in terms of time of reply. The entire concentrator system will then run on the new rate.

To summarize the quiescent condition, 2-millisecond rate advance pulses are being generated in the sequence control of FIG. 21, transmitted to the remote secondary and broadcast to the remote primary where they perform two functions, i.e., read out the supervisory signals and step the counter. Time is then permitted for any replies from the concentrators to return to the office over a path which will be traced herein in time to permit a flag to be raised and interruption of the scanning cycle. In addition synchronization checks between the remote counters and the office counter are being made as explained in detail herein. This continues so long as no calls are in progress.

(4) Synchronization Check Circuit: In the present arrangement, synchronism is checked only when common control dictates. The check makes use of the transmission of a service request signal at a time when a service request is not normally expected. The basic operation involves transmission to all concentrators in broadcast form of a signal to check the counter position in the remote primaries, and transmission back of a positive signal if agreement is indicated. A one point check of only one line number is inconclusive since a remote counter may be jammed at that number. In consequence a two-point check is used.

The two-point check involves a request at one instant in time and a reply at a separate instant in time. This reply will not occur at the correct time unless the counters are in synchronism.

This type of check is also useful as a "still alive" indication for a remote primary. Since it is possible that a remote primary may go for an extended length of time without generating any service requests or other traffic the periodic synchronism check is a useful expedient in determining continued satisfactory operation.

Figure 13:
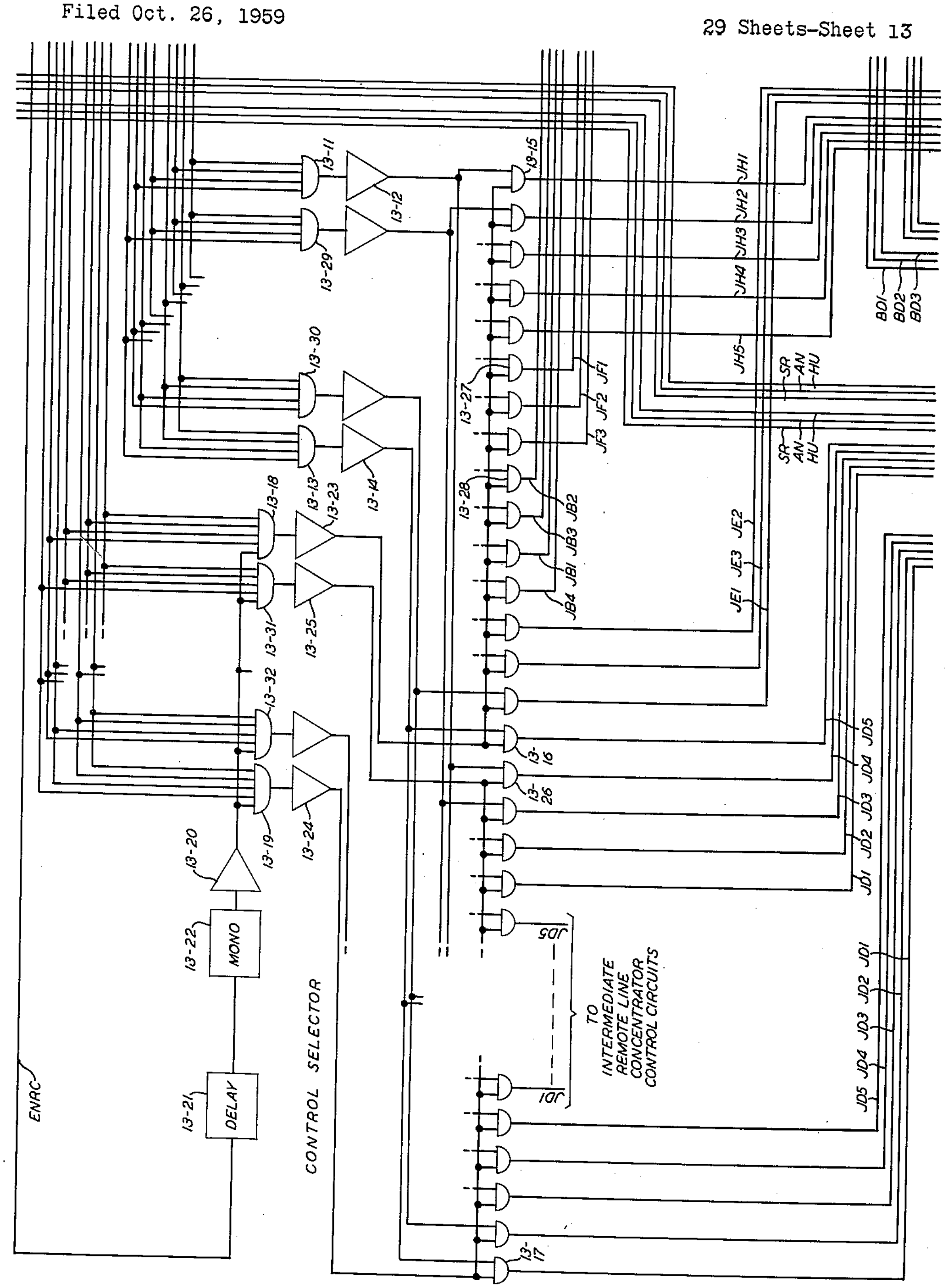
FIG. 13 shows a portion of the control selector circuit.

Referring now to FIG. 23 and FIG. 1, a synchronism check is initiated by a request from common control via the control selector FIG. 13 providing an output on lead JE2. This sets flip-flop 23—11 which in turn drives amplifier 23—12 to provide one of the two inputs to AND gate 23—13. An additional input is provided over lead GE2 which is connected to the line number counter (FIG. 14) at amplifier 14—19. This is the amplifier which was used to reset the counter. Thus lead GE2 carries a pulse signal at the end of each counting cycle. The output of AND gate 23—13 indicates that common control has requested a synchronism check. AND gate 23—13 via amplifier 23—14 provides inputs to binary cell 23—15 and flip-flop 23—18.

Setting of flip-flop 23—18 indicates that a synchronism check is now in progress. Binary cell 23—15 has two outputs at amplifiers 23—16 and 23—17 which signify "test phase 1" and "test phase 2" respectively.

Since the request flip-flop 23—11 is set, the next time the counter passes through 0 a pulse is delivered from AND gate 23—13. At this time binary cell 23—15 is driven to the opposite phase.

The output from amplifier 23—16 is a lead designated EH2. This lead appears in FIG. 21 as an input to gate 21—43 which is connected to binary cell 21—32. Lead EH2 permits interleaving a positive synchronism check pulse among the usual negative advance pulses. AND gate 21—43 is further qualified by amplifier 14—21 over lead 21—44 which insures that the pulse is delivered at the proper time period. This in effect provides an arrangement for advising the sequence control to transmit a positive pulse for synchronism checking on entry into test phase 1. It will be seen herein that the positive pulse is not registered by the line number counter.

The positive synchronism pulse is transmitted over lead HB2 (from AND gate 21—30) which extends to OR gates 15—13 and 15—14. From there, the signal is transferred via lead BC3 through bipolar transmitter 22—11 from which it is broadcast to all secondaries and all primaries in the manner explained for the advance pulse in Section IIA3, supra.

Taking the case of primary 0, secondary 0, the signal appears in receiver 2—11 and extends to AND gate 1—22 over lead 1—32.

AND gates 1—24 and 1—25 are utilized to produce a specific output at a particular number on the counter and at no other time. Thus AND gate 1—24 produces an output for the duration of time slot 00 and AND gate 1—25 produces an output for the duration of time slot 01.

If the positive pulse which arrives over the signaling channel coincides with the output from the gate 1—24, gate 1—22 will be enabled.

This indicates that if the synchronism check pulse arrives at the remote concentrator and the concentrator is at that time at slot 00, the first check point has been verified. In this instance the two inputs to AND gate 1—22 from AND gate 1—24 and lead 1—32 are activated and monostable 1—27 circuit is energized.

After the first calibration point has been validated and monostable circuit 1—27 has been energized, inverter 1—28 inhibits AND gate 1—30. In this respect the output of AND gate 1—30 will ordinarily be a train of P1 pulses which extend to line scanner 1—17, line circuit 0 as explained in the above-referred-to application of Cirone-Harr-Lowry-Ridinger. When inverter 1—28 is energized, however, AND gate 1—30 is disabled and the P1 pulses cannot traverse the AND gate. Thus for a space of 200 milliseconds no P1 inputs appear at the 0th input to line scanner 1—17. For this duration of time when the scanner examines line 0 it will in effect read a service request condition as explained in the last-referred-to application.

In the preceding explanation (Section IIA3) it was pointed out that the counter and scanner are out of synchronism by one step. In this sense the scanning of the 0th line and count of 0 do not coincide.

When the counter reaches 0, scanner 1—17 is reading line 1. Thus although monostable amplifier 1—27 is energized during the 0th time slot a service request is not produced since the scanner has stepped beyond position 0. The service request is detected at the end of the scanning cycle. (In this explanation it is understood that numbers 0 and 1 are reserved for checking purposes and cannot be assigned to customers.)

Referring again to FIG. 23, when the line number counter reaches the reset condition and monostable amplifier 14—18 is energized to produce an input on lead GE2, the binary cell 23—15 is reset to indicate the second phase of operation. Outputs are now provided at amplifiers 23—17 and 23—19 and are combined in gate 23—21. The output from AND gate 23—21 extends to AND gate 23—20.

AND gate 23—26 has inputs which extend from the service request flip-flops of all the primary concentrators in the RCC. Thus, for example, an output from service request flip-flop 20—14 extends over lead DE1 to AND gate 23—26.

When the synchronism check circuit enters the second phase, service requests from all of the remote primaries are expected. It will be remembered that the 0th input at scanner 1—17 is ready to indicate a service request when the pulse which corresponds to a service request is read out by the advance pulse which steps the scanner to 0. But the 0th position was actually scanned when the counter 1—15 and 1—16 was reading position 59. At that time (when the counter was reading 59) the service request pulse was prepared in detector 1—19 and is read out by the advance pulse over gate 1—11 and transmitter 2—13. The service request arrives in the office in the usual manner to set flip-flop 20—14 in the 0th time slot. Thus, the output from flip-flop 20—14 appears as one input over lead DE1 to AND gate 23—26. Similar signals are received over corresponding channels for the other primaries. The output of AND gate 23—26 indicates, if a "1," that all primaries are operating satisfactorily and, if a "0," that at least one primary has failed to transmit its service request.

Assuming that the output of AND gate 23—26 is a "1" it may be traced as one input to AND gate 23—20. The other inputs to AND gate 23—20 extend from AND gate 23—21 which indicates the second phase and an additional input extends over lead HE1 from amplifier 21—35 which corresponds to the "final phase" or end of the advance sequence. An output from AND gate 23—20 indicates a successful check. The inputs to AND gate 23—20 indicate over lead HE1 that sufficient time has elapsed for all service requests to be transmitted; the second input from AND gate 23—21 indicates test phase 2, and the final input from AND gate 23—26 indicates that all primaries have transmitted service requests. The output from AND gate 23—20 extends through OR gate 23—27 to energize monostable circuit 23—28 and amplifier 23—29.

This output through a group of decoupling diodes 23—30 resets all of the flip-flops used in the synchronism check circuit. In addition to resetting all of the flip-flops, additional outputs are delivered to all of the primary controls to reset the service request flip-flops. For example, flip-flop 20—14 is reset over lead 23—35.

It may be observed that in ordinary operation common control is summoned through a flag generated by the operation of OR gate 21—14. In the synchronism check, however, it is undesirable to summon common control which would then respond to what is a spurious service request. It is necessary therefore to inhibit the usual outputs of the service request flip-flops. Flip-flop 23—22 is ordinarily in the "0" condition at which time amplifier 23—23 is active. The output of amplifier 23—23 together with the output from gate 23—21, which is present during test phase 2, enables AND gate 23—24. The output of AND gate 23—24 is inverted in amplifier 23—25 and a signal is applied to lead ED1 which is multipled in FIG. 20 to all of the service request AND gates. Thus, AND gate 20—16 and corresponding AND gates in the other primary controls are inhibited during test phase 2. In consequence, although the output of service request flip-flop 20—14 is permitted to extend to the synchronism check circuit in FIG. 23, the connection to common control is blocked.

When amplifier 23—29 resets all of the flip-flops it also terminates test phase 2 and the inhibiting potential at AND gate 20—16 is removed to permit forwarding service requests to the common control.

The purpose of monostable circuit 1—27 is to permit just one service request to be transmitted. Thus, the timing cycle of 200 milliseconds is designed to be longer than the longest anticipated scanning cycle but shorter than the shortest anticipated two cycles.

Assuming that one or more primary concentrators failed to transmit a service request, AND gate 23—26 will have a 0 input. In turn, AND gate 23—20 will not be energized. The output of AND gate 23—26 is inverted in amplifier 23—31 and presented to AND gate 23—32. AND gate 23—32 has additional inputs designating test phase 2 (lead from AND gate 23—21) and the final phase (lead HE1) of the advance sequence. In this respect AND gate 23—32 reflects the unsuccessful operation of a synchronism check, and AND gate 23—20 indicates successful operation thereof. Flip-flop 23—33 is set by AND gate 23—32 and through amplifier 23—34 applies a signal over lead HE1 which appears as an input to OR gate 21—14 and produces a flag. This flag has a high priority position in the scanning cycle of office scanner 25—21.

Thus far it has been indicated to common control that difficulty in the remote concentrators has been experienced. Six unused combinations in the link selection numbers are reserved for maintenance codes. The maintenance codes are transmitted over the same channels used for switching orders. One of these codes arbitrarily resets the counters in the primary concentrator to a designated number.

In summary, the technique for detecting counters which are out of synchronism includes the request for a synchronism check by common control as explained above. If the check is successful common control receives no information and in its usual program will return in about 5 seconds to request another check. If the check is unsuccessful, common control must identify the concentrator in difficulty. Flip-flop 23—22 is activated through the control selector over lead JE3, and the input to amplifier 23—23 is removed. In consequence lead ED1 is rendered active over AND gate 23—24 and inverter 23—25 to restore all of the service request output AND gates to the normal condition. Common control now scans all of the service request flip-flops and, when it finds a service request flip-flop which is not activated, it infers that the associated primary concentrator is malfunctioning.

Common control formulates an order in the network order register (FIG. 27A) including a maintenance code to reset the counter. This information is delivered to the remote network control and is transmitted to the primary in a manner explained hereinafter (Section IIA6) after including a notation to exclude the secondary from the order. When the primary concentrator counter is reset, lead JE1 is activated by the control selector and via OR gate 23—27 energizes monostable 23—28 and amplifier 23—29 to reset all service request and synchronism checking flip-flops in the manner explained above for a successful check.

A record is made in a special register in the barrier grid store (FIG. 7) of the primary counter which has been discovered to be "out of step." On the next synchronism check, common control refers to this register and if it is determined that another failure occurs for the same primary, flip-flop 20—25 is activated over lead JD1 to suppress signals from the primary concentrator concerned. Amplifier 20—26 inhibits AND gates 20—20, 20—24 and 20—16. This action effectively blocks any signals from the remote primary to the RCC. The output through amplifier 20—27 via OR gate 20—13 sets service request flip-flop 20—14 in order to force the service request flip-flop to the "set" state to generate an apparent synchronism agreement for later synchronism checks. If this were not done, subsequent tests would again indicate the failure.

If common control had observed a successful synchronism check on the second trial for a remote primary whose number is posted in the special register adverted to above, the information in the register referring to the malfunction of the primary would be deleted.

(5) SR Block and P1/P2 Check Circuits: (*a*) Service Request Block Circuit.—Under conditions of unusually heavy traffic, a situation may arise in which all ten links in a given primary concentrator are occupied by calls in varying stages of completion. While this situation is not harmful in itself, it can give rise to another situation in which one or more additional subscribers attempt to originate calls and find no available paths through the primary. The substation seeking to originate a call will be supplied with battery (as shown for line #59 in FIG. 1), and will be scanned for a service request, but must wait for the relinquishing of network paths by other calls before being connected to the central office.

The signal SR/CPF will be generated each time the line scanner 1—17 is addressed to the calling line, and common control will go through the program hereinabove described for its resolution as a service request. Such activity by common control is fruitless since a connection cannot be effected until a path to the office is available.

More serious, however, is the effect of repeated service request signals on the signaling medium itself. The separation of remote concentrator signaling into high-rate metallic channels and low-rate phantom channels has been described in Section IIB4 and elsewhere. A particular restraint on the signals transmitted over phantom channels derived from speed circuits is that their occurrence should be random or irregularly spaced in time, with a low average "rate" of occurrence.

One unserved line which creates a continuous train of service requests causes a periodic signal with 8-cycle-per-second fundamental frequency to be placed on certain speech circuits in the form of phantom unbalance currents. Not only should such an occurrence be avoided, but the further case of multiple service requests created by more than one unserved line would constitute substantial interference.

A control circuit is provided in the remote primary concentrator 25—32 to avoid both the problem of ineffective common control activity and phantom circuit interference. This circuit provides a means controllable by common control for the inhibiting of service requests due to surplus traffic at their source, the AND gate 1—11.

When common control recognizes the primary overflow condition, which is characterized by a service request when no links are available in that primary, it records the condition in the barrier grid store. It then prepares a maintenance code for transmission to the primary only, places this order in the network order register (FIG. 27A), and orders the control selector 25—20 to set the "secondary exclude" flip-flop 8—52. Common control then orders the control selector 25—20 to set the flip-flop 9—11, requesting transmission of the maintenance code, and further to reset the SR/CPF flip-flop which produced the flag condition. After the remote network control 25—18 has completed its transmission, sequence control 25—15 resumes the generation of advance pulses.

When the primary concentrator receives the maintenance code, lead 1—35 connected to the link release selector is momentarily energized. Because the maintenance code had the structure of a release order, as explained hereinafter, the SR block flip-flop 1—33 received a momentary reset instruction. However, due to delay 1—34, the set input to flip-flop 1—33 occurs after the reset input and leaves the flip-flop in a set, or "service request blocked" condition. Setting of flip-flop 1—33 deactivates one normally active input to OR gate 1—26, whose output is a necessary input to AND gate 1—11 for generation of SR/CPF signals.

Neglecting for the moment the other input to OR gate 1—26, explained in the following section the setting of flip-flop 1—33 may thus be seen to have prevented the generation of further SR/CPF signals. The result is that service requesting lines will produce no audible signals in the phantom channels and no flag conditions in the RCC.

When one of the occupied links becomes available for the use of waiting subscribers, it is desirable to remove the "SR block" condition so as to permit re-initiation of the central office procedures which can effectively respond now to at least one waiting service request. The "SR block" condition is removed at the remote primary concentrator automatically upon reception of any network order which incorporates a release instruction. The reception of a negative pulse by bipolar receiver 2—21 activates lead 2—42 and thereby resets the SR block flip-flop 1—33. At the central office, common control erases the barrier grid store record pertaining to the previous blocked condition and normal service request procedures are resumed until another overflow situation arises.

(*b*) P1/P2 Checking Circuit: In addition to the test line numbered "00," which is used for synchronism checking, a second test line numbered "01" is used for other operational checks within the remote primary concentrator. Actual subscribers are never assigned to these line numbers, so that service requests or SR/CPF signals occurring on these numbers have special significance in the central office.

The input to line scanner 1—17 corresponding to 01 will normally be connected to either the P1 or P2 pulse source. So long as either pulse train is present at this input terminal, no SR/CPF signal for 01 will be produced.

For the usual condition of monostable amplifier 1—27, i.e., not actuated, inverter 1—28 permits P1 to pass through AND gate 1—30. The P1 pulse train at the output of AND gate 1—30 appears at line scanner input terminal 00 and, via OR gate 1—31, at terminal 01. When monostable amplifier 1—27 is actuated (during a synchronism check), AND gate 1—29 is enabled and AND gate 1—30 inhibited. The P1 pulse train disappears from line scanner input terminal 00, thereby producing an SR/CPF signal as required for the synchronism checking operation. The P1 pulse train also disappears from line scanner terminal 01, but is immediately replaced thereat by the P2 pulse train.

In responding to SR/CPF signals in general, common control checks the line number counter 25—13 against 00 and 01. If an SR/CPF signal arrives on line 01, common control infers that either pulse source P1 or P2 has failed. Because failure of either of these sources invalidates subsequent supervisory signals from that primary concentrator, common control would then order control selector 25—20 to set flip-flop 20—25. This flip-flop, which prevents supervisory communication between the affected primary and common control, will remain set until the primary has been repaired. If an SR/CPF signal from line 00 is presented to common control, some further interpretation is necessary before inferences of malfunction can be drawn.

(*c*) Interaction Between Synchronism Check, SR Block and P1/P2 Check Circuits: By its inherent purpose, the SR block circuit conflicts with the operation of the synchronism check and P1/P2 check circuits since both of these utilize SR/CPF signals for maintenance signaling to the central office. These conflicts are resolved through the use of OR gate 1—26 and AND gate 1—25. AND gate 1—25 produces an output when counters 1—15 and 1—16 are in position "01" and at no other time. The presentation of this output to one input of OR gate 1—26, for which the other input is produced by flip-flop 1—33, has the effect of overriding any possible SR blocked condition for the single time slot numbered "01." As a result, the generation of an SR/CPF signal on counter position 01 which signifies P1 or P2 failure can take place without regard to possible blocking of true service requests.

If OR gate 1—26 were also provided with an input from AND gate 1—24, which produces an output on counter position 00, then synchronism checking could be completed by generation of SR/CPF signals on 00 without regard to the desired blocking of true service requests. In this case, however, another purpose may be served by omitting the connection between AND gate 1—24 and OR gate 1—26. The accidental setting of flip-flop 1—33 by spurious transients in the power supply, etc., which generally unlikely, would be a serious malfunction of the remote equipment. The inhibiting of all service requests at a given primary without common control's having recorded such action would be an undesirable obstacle to originating traffic. Accordingly, the SR block function is permitted to interfere with the synchronism check function, thereby attracting common control's attention to any possible discrepancy.

The subsequent action by common control in resetting the counters 1—15 and 1—16 would automatically reset the SR block flip-flop 1—33 and correct the spurious condition.

Another interaction, between the synchronism check circuit and the P1/P2 check circuit, is usefully employed in accomplishing the verification of two conditions over a single facility. This sharing is effected through AND gates 1—29 and 1—30 and OR gate 1—31. As described hereinabove, use is made of the recurrent operation of monostable amplifier 1—27 to alternatively steer pulse trains P1 and P2 to the line scanner input terminal 01 for monitoring the pulse source outputs.

Common control must be cognizant of still another interaction among control circuits at the remote primary concentrator. If the occasion arises for transmission of a network order while the counters 1—15 and 1—16 are on position 00, a spurious "synchronism check" may be initiated. The cause of this anomaly is the use of positive input pulses at bipolar receiver 2—11 for both "link advance" and initiation, via lead 1—32 and AND gate 1—22, of synchronism checks.

In contrast to the usual procedure in synchronism checks, however, when such a spurious operation results in transmission of an SR/CPF signal to the central office, AND gate 20—16 has not been inhibited by the synchronism check circuit 25—19, and the SR/CPF appears via the flag to common control. For this reason, common control checks each received SR/CPF signal against counter position 00, as explained hereinabove. If an SR/CPF is observed in time slot 00, common control investigates records kept in the barrier grid store of orders recently transmitted during time slot 00. If none are found, common control employs the line number match 25—24 to advance all remote primaries to position 01. If the SR/CPF signal is not repeated, common control infers a malfunction of the remote primary checking circuits or of AND gate 20—16. If the SR/CPF signal is repeated in time slot 01, common control orders control selector 25—20 to set flip-flop 20—25, as described hereinabove.

(6) Remote Network Control: (*a*) Network Order Register.—Referring now to FIG. 27A, a diagram of the network order register is shown. The network order register is a set of 15 flip-flops physically inside the common control, which are used by common control for the composition of an order to be carried out by the remote network control. The operation begins when the register is loaded and ready to pass information into the remote network control itself. FIG. 27A in the diagram shows the allocation of information groups or numbers among the 15 flip-flops in the register. Reading from left to right, the leftmost bit in the binary flip-flop register corresponds to the secondary number. It will be noted that the secondary number is representable here by a single bit, since only two secondaries are shown. However, the group of remote concentrators, which can be controlled by a single remote concentrator control, may extend to a larger number of secondaries and, therefore, the number of bits required in the register would be correspondingly increased for the present illustration one bit does specify secondary 0 or secondary 1.

The next five bits correspond to the number of the primary designated for this particular order within the specified secondary. Five bits are used to specify one among twenty.

The following four bits taken as a group represent the binary equivalent for the link number selected for the network operation. The four bits select one of ten links. It is understood for purposes of this order that the link number is used not only to mean the link number within the designated primary but is also used to select the particular trunk involved in the secondary concentrator. The four bits of the link number are further subdivided into a group of threee bits, referred to as the link count, and the remaining bit, which is the odd-even bit. The latter bit indicates whether a binary number is odd or even in the decimal sense.

The next four bits are allocated to the trunk units number, four bits again specifying one of ten for the units within the 100 trunks between the specified secondary and the central office. The final bit indicates mark or release. A "1" stored in this bit means that the order represents a "mark" operation. A "0" indicates that a release operation is intended. The 30 leads (N0–N29) extending from the register are carried physically in a cable from common control (see FIG. 7) where this register is located to the physical equipment location of the remote network control, FIGS. 8, 9, 15, 16 and 17.

As indicated above, the mere act of loading this register (FIG. 27A) by common control does not in itself initiate any action to carry out or transmit a particular network instruction. Common control prepares address information which is presented in FIG. 25 to the remote network control 25—18 and even though the address information is made available to it, no operation begins until the control selector 25—20 has passed an instruction to the remote network control 25—18 to begin the specific sequence.

(*b*) Primary and Secondary "Exclude" Orders: A portion of the information is presented to the remote network control block 25—18 by a means other than the address register shown. This information is the facility for executing a partial network instruction. There are cases in which it is desirable to perform some network operation in the remote primary without disturbing the remote secondary or vice versa. For example, it might be desirable to take down part of a connection within the remote secondary while leaving the fragmented connection up in the remote primary concentrator.

A more frequent reason for using this type of operation is the case in maintenance codes. The availability of maintenance codes derives from the fact that four bits are used to designate the link number and the four bits give a coding potential of 16 possible combinations of which only ten are needed to select the ten links. Thus six arbitrary pieces of information remain which can be transmitted to the remote primary concentrator, to carry special instructions.

These six instructions do not correspond to physical network operations and these instructions may be used for duties in the remote concentrator that do not relate directly to individual customer's calls. Generally, the maintenance functions are not the same for the two remote concentrators (primary and secondary), so that if a maintenance code were to be transmitted to the remote primary concentrator, it would be necessary to somehow modify the instruction transmitted so that the secondary concentrator would not participate.

Two flip-flops within the remote network control itself (as explained herein) permit indication by common control of the exclusion of the primary concentrator or the secondary concentrator from acting or executing its particular portion of the network construction in the general form that is about to be transmitted. The basic idea is that common control will prepare the order in the address register (FIG. 27A); it will then set the special exclude flip-flops, if they are needed, by means of the control selector 25—20 and then, after having prepared both the address and the exclude instructions, it will give the start indication to the remote network control by way of the control selector. In FIG. 27B, a typical order consisting of a 15-bit binary word that represents a specific instruction is shown.

(*c*) Typical Order Word—0 00000 1001 0101 1 (FIG. 27B): The first digit 0 indicates secondary 0, the next five bits indicate primary number 0.

1001 indicates the link number, 0101 is the trunk units number and the final 1 indicates that it is a mark instruction. The English equivalent of this order is: "In primary 0 of secondary 0 mark the present line number to link 9. At the same time in secondary 0 mark link 9 from the primary 0 to trunk 95." This particular English translation assumes that no exclude orders have been given. Exclude orders will not appear in the address register, but the effect of sending an exclude order to affect either the remote primary or secondary would be merely to obliterate that part of the English sentence.

For the order shown, trains of pulses as they appear in different parts of the system for the transmission of this particular network instruction are indicated. Trunk 100, which is one of the two physical control pairs between the office and remote secondary carries in pulse form (line 1) a direct serial binary coded equivalent of the primary number. The five binary bits representing the primary number in the order register are converted from parallel information, as the information exists in the register, to serial information in the form of a train of pulses on the signaling channel itself.

The convention has been arbitrarily assumed that a positive pulse on the cable corresponds to a 1 and a negative pulse on the cable corresponds to a 0. In this case, the binary number 0 corresponds to the train of five consecutive negative pulses. This particular train of pulses begins within the first time slot of the remote network control cycle when the start order has been given from common control. Those pulses which are adjacent to time 0 of the graph correspond to the events which begin immediately.

On the other physical control pair between the secondary and the central office trunk 101 (represented on line 3), similar transmission of the trunk units number in serial binary form takes place in a manner similar to that for the primary number on trunk 100. In this case, the trunk units number corresponds to the binary number 0101 and the pulse train equivalent is negative, positive, negative, positive, in that sequence.

Line 2 of FIG. 27B indicates the pulses which are transmitted over the phantom channel which is composed of secondary control pairs, trunks 100 and 101. This is a phantom channel which is carrying high-rate information broadcast to all the primary concentrators. In this particular case a train of four positive pulses begins in the second time slot. The basis for these four pulses may be deduced from an examination of the link count or the three most significant bits of the link number of FIG. 27A. This count, in essence, specifies how far above 0 or 1 a link counter must be advanced to register the given number. In the assumed case, link 9 is specified and the procedure is to divide the number 9 by 2 and provide the appropriate number of pulses.

Line 4 of the chart in FIG. 27B shows the information which is transmitted to the remote secondary from the central office on the phantom composed of trunks 08 and 09. This is a low-rate signaling channel which is used for communication only between the central office and the remote secondary. In this case, the pulses appearing here take the following form. The first pulse which must be transmitted in the first time slot is a single pulse whose polarity reflects the odd-even bit of the link number. Here, the link is numbered 9 which is an odd number, the odd-even bit is a 1, therefore. This initial pulse is transmitted as a positive pulse. A steering flip-flop 2—23 and an odd-even flip-flop 2—25 will be referred to hereinafter. The odd-even operation of flip-flop 2—25 is used in determining the odd or even makeup of the link number itself. The steering flip-flop 2—23 permits a distinction between the first pulse and second pulse occurring on this particular channel (phantom on trunks 08 and 09).

The order which goes in phantom form on trunks 08 and 09 begins with a positive pulse in the first time slot to indicate that the link number is odd. Later, in the sixth time slot, a positive pulse again appears on this same channel, which in this case has the significance of "mark."

Finally, in line 5 of the group showing secondary signals, a pulse appears in the phantom channel which is phantomed onto trunks 18 and 19. This is another low-rate channel and in this particular case it is carrying information exclusively from the remote secondary to the central office. The information it carries is a single success pulse which indicates to the office that the secondary has executed whatever network instruction it was given. The point at which that occurs in the time diagram is somewhat arbitrary indicating some delay in the operation of the remote secondary network before the transmission of this pulse.

The lower portion of the graph in FIG. 27B is used to indicate which parts of this instruction are transmitted onward to the primary concentrator. Line 6 represents the pulse train that is sent to all primaries over link 10. This is the high-rate broadcast channel and the informatoin which is repeated is the same information that was transmitted on phantom 100/101 (line 2). The slight difference in timing indicates the transmission delay, that is, when the information starts out from the secondary concentrator, it is a little later in time than were the corresponding pulses leaving the central office.

Line 7 shows the pulses sent on the link phantom made up of primary links 2 and 3. This information is transmitted only to remote primary 0. It will not appear in any of the other remote primary concentrators in the group. In this case, the information corresponds to that which was sent to the secondary on phantoms 08 and 09 (line 4) except for the delay in time as explained above. The dotted line 8 indicates the same pulse a half millisecond earlier in time as it was transmitted on trunk phantoms 02 and 03. The explanatory notes at the bottom of FIG. 27B refer to operations within the remote network control. The first note indicates that the remote network control operating sequence begins at the time 0 indicated by means of the setting of flip-flop 9—11 and energization of lead HB1. The operation is continuous based on a timing cycle between time 0 and time 7.5 milliseconds. Beyond the line 7.5 milliseconds a monostable circuit fires and a different mode of operation obtains. One of the operations that is carried out at this time is that a flip-flop is set within the remote network control which will indicate failure of the secondary concentrator unless a success signal is received from the secondary to reset the flip-flop. In this case (line 5) it is assumed that a secondary reply did come in and reset the flip-flop. These factors will be discussed more fully herein.

Finally, another monostable circuit 9—37 fires at the end of the total network operating cycle which clears the entire control and readies the control for another use by common control. When the control has been completely cleared in this fashion, the sequence control 25—15 is permitted to resume control of the RCC operations. In this case when the remote network control has cleared itself and completed one operating cycle, the sequence control is permitted to take over once again and as indicated by the dotted lines in FIG. 27B the advance pulses are resumed. The pulse repetition rate or repetition interval during the sending of a network instruction is approximately 1.5 milliseconds as shown on FIG. 27B, the minimum time needed for transmission of a pulse.

When advance pulses are resumed, the spacing between these pulses is extended to 2 milliseconds. It may be noted that the advance pulses themselves correspond to negative pulses on the broadcast channels whereas the portion of the link count is carried out with positive pulses on that channel.

Figure 9:
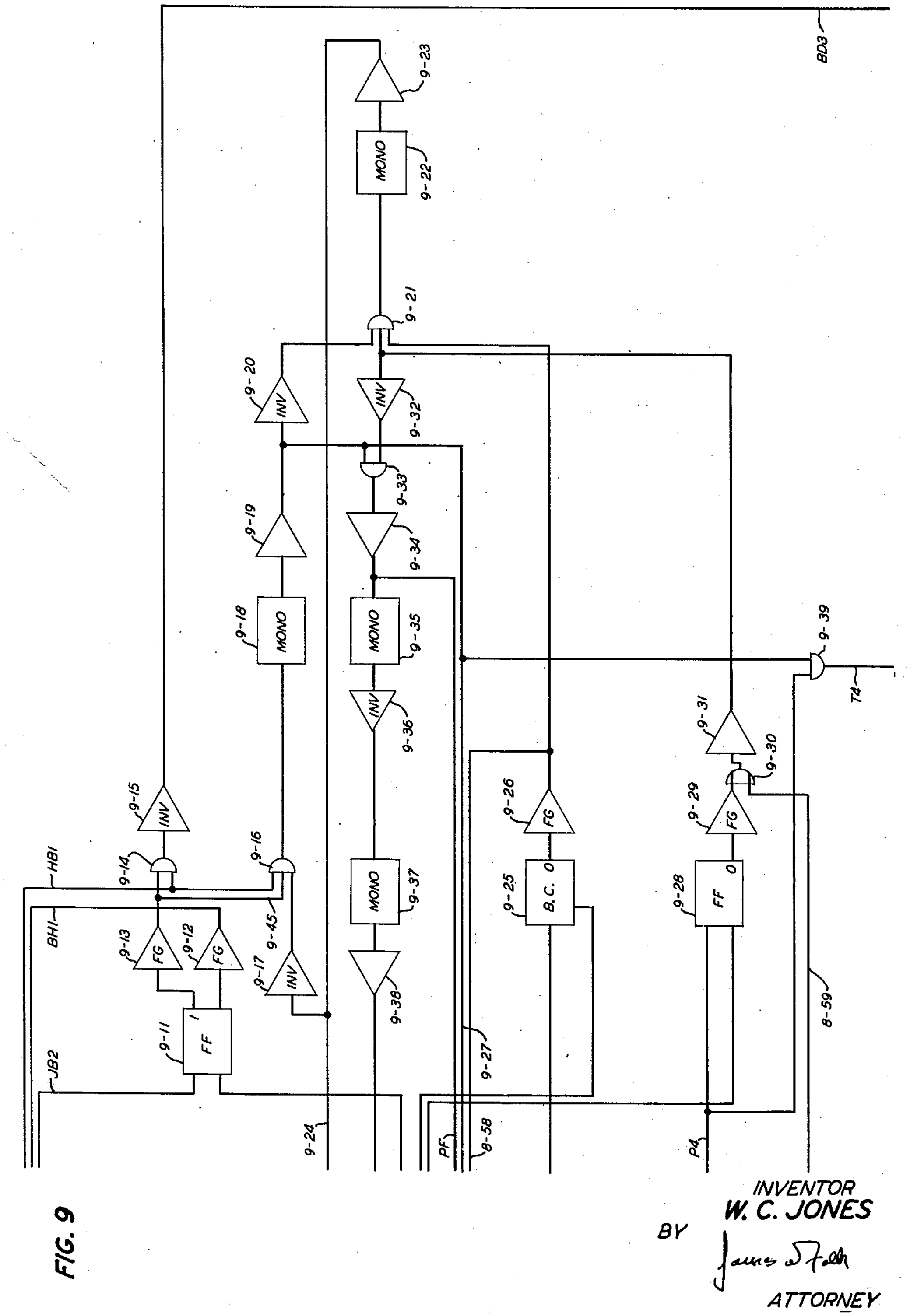
Figure 10:
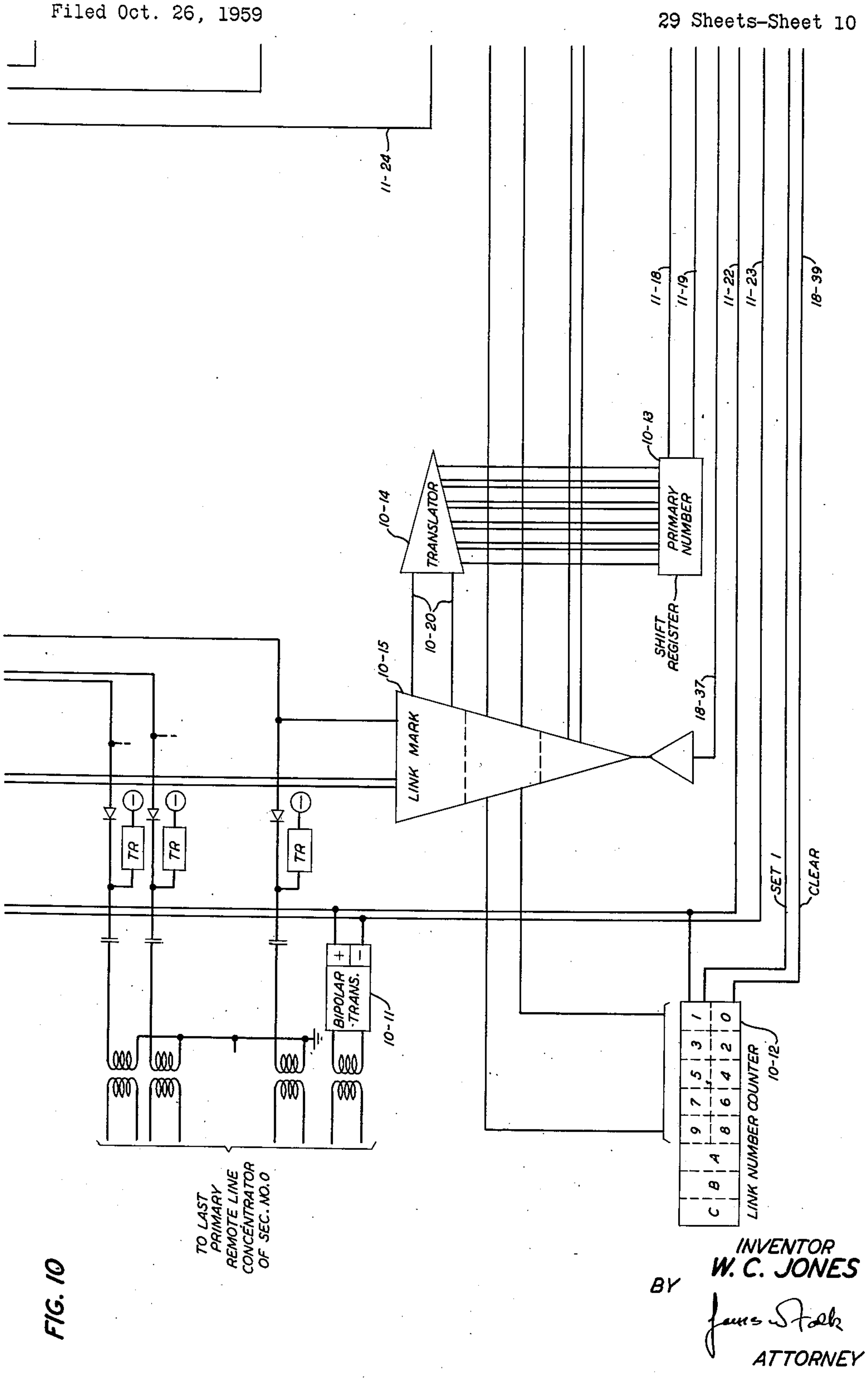
FIG. 10 shows additional equipment in the remote secondary concentrator including the link number counter, link mark, translator and primary number shift register.

(*d*) Timing Functions: Referring now to FIG. 9 the principal circuit features comprise a timing loop of monostable circuits and inverter circuits operated in a sequential manner similar to that used in the sequence control and described in FIG. 21. The same requirements apply in the interest of generating control phases bearing a fixed time relation for carrying out sequential operations. Monostable circuits followed by inverters, followed by additional monostable circuits generate a train of pulses automatically. Once the chain is set in motion it will continue to run until the chain is broken by some logical means. For the particular purposes of the remote network control, a considerably less complex timing chain than the one which was used in the sequence control itself is possible. In the sequence control there were a total of four distinct timing phases employed. These were necessary to allow for the differences in pulse timing and the carry property of the line number counter and various logical operations that had to be performed in a fixed pattern; within the remote network control the pattern is simpler and therefore the timing chain itself is less involved. Specifically, in the timing chain in FIG. 9, only two phases are needed. The two phases have time values of 250 microseconds and 1.25 milliseconds respectively. As was discussed in the case of the sequence control, the 250-microsecond pulse is applied directly to the various signaling transmitters themselves to generate the particular shape of wave form desired for the transmission over cable. The 1.25-millisecond pulse provides spacing between consecutive signal pulses on the cable. This pulse timing, as is true in the sequence control, is adjustable so that the rate of transmitting pulses for the information could be varied as the application requires.

Flip-flop 9—11 corresponds to a transmission request. It is set by means of the control selector through lead JB2 when common control has prepared an order for transmission. Because the signaling channels are shared between advance pulses and order pulses, it is necessary to coordinate the functions of the remote network control with those of the sequence control. For this reason, in the AND gate 9—16 the output of FG amplifier 9—13 which corresponds to the active side of flip-flop 9—11 is combined with lead HB1 which comes from the sequence control. Energization of lead HB1 indicates that a timing cycle of the sequence control has been completed. The coincidence of these two elements indicates permission to send an order. FG amplifier 9—12, which is connected to the flip-flop 9—11 "0" output, is extended over lead BH1 which is used in the sequence control at AND gate 21—11 as a lockout to prevent transmission of further advance pulses when the remote network control is in use.

When the remote network control is in a request condition, lead BH1 prevents the presentation of any flag signal to common control at AND gate 21—40 until the remote network control has completed any given job. The AND gate 9—14 combines the outputs of FG amplifier 9—13 which corresponds to output "1" of flip-flop 9—11 with the lead HB1 extending from the sequence control. The output of AND gate 9—14 indicates that the remote network control has been requested and it is now free to operate insofar as coordination with respect to the sequence control is concerned. This output is inverted in inverter 9—15 and passed by means of lead BD3 to all primary controls at AND gate 20—12. The purpose of this particular lead within the remote line concentrator control circuit is that of disabling the logical chain which acts on outputs received from the remote concentrators. Specifically, the service request channel is blocked by a signal on this lead during any time the remote network control is in operation. Bipolar transmitter 20—17 is only used during the time the remote network control is in its operating cycle. During this time no inbound signal or service request would be a legitimate signal so the entire output of receiver 20—11 is inhibited for the full operating time of the remote network control. This inhibiting action is necessary to prevent spurious actuation of receiver 20—11 which may occur during operation of transmitter 20—17 from producing undesired logical effects.

At the AND gate 9—16 the two electrical states indicating a request for transmission and the availability of the sequence control are combined over leads HB1 and 9—40. A third input to AND gate 9—16 extends from inverter 9—17. Energization of the third input indicates that a full cycle has been completed since inverter 9—17 is at the end of the timing loop.

When AND gate 9—16 is energized monostable circuit 9—18 is activated to drive a signal through amplifier 9—19 which appears on lead 9—27 for a period of 250 microseconds. Inverter 9—20 inverts this signal to energize the following monostable circuit 9—22 in the chain through AND gate 9—21.

In the remote network control of FIG. 9 logical necessities dictate the ability to interrupt the timing chain of the two monostable circuits at two different locations. One location is AND gate 9—16 where the cycle was started at the beginning of the operation and the other is AND gate 9—21 which the intermediate in the chain.

The three inputs to AND gate 9—21 extend from inverter 9—20, FG amplifier 9—26, and amplifier 9—31.

Amplifier 9—31 presents an output to AND gate 9—21 which controls a shift from one timing mode to another. This change in mode reflects the operation of the remote network control as changing from a periodic or cyclical function to one which is timed by a single monostable circuit.

Assuming that AND gate 9—21 is energized, monostable circuit 9—22 will be actuated and amplifier 9—23 produces an output corresponding to a 1250-microsecond square wave which appears on lead 9—24. This output is applied to inverter 9—17 thus completing the loop back to AND gate 9—16. Thus if AND gates 9—16 and 9—21 remain active, monostable circuits 9—18 and 9—22 will continue to generate a series of pulses of the two respective lengths.

In short, the timing chain in FIG. 9 contemplates equipment for generating pulses of different lengths on leads 9—27 and 9—24 which can be interrupted at the two AND gates 9—21 and 9—16 by external events.

A binary counter within the remote network control assists in organizing the series of operations necessary to transmit the sequential pulses. The binary counter is a four-stage counter designated in outline form at 8—11, 8—13, 8—15 and 9—25. This counter is used for local operation within the remote network control and is not connected to common control.

Referring to binary cell 8—11, FG amplifier 8—12 corresponds to the 0 output and FG amplifier 8—17 corresponds to the 1 output. FG amplifiers 8—14, 8—16, 8—19 and 8—21 respectively designate the 0 and 1 outputs of binary cells 8—13 and 8—15. Binary cell 9—25 has only a 0 output at FG amplifier 9—26.

The four-stage binary counter is energized by pulses within the monostable circuit timing loop on lead 9—24 which provides an input to the least significant stage of the chain. In each cycle of the timing loop, the counter is advanced by the 1250-microsecond pulse.

AND gates 8—18, 8—20 and 8—22 through 8—25 perform in conjunction with OR gate 8—26 a match operation which relates to three bits of the network order address. These are designated on FIG. 8 at least N12 through N17. By reference to FIG. 27A these six leads correspond to the 0 and 1 outputs of the three bits contained in the link counter. The appropriate output from binary cells 8—11, 8—13 and 8—15 is used for comparison with the three bits of the link counter number. This arrangement is similar to one described below for the line number match circuit 25—14. When a match occurs the output of OR gate 8—26 falls in voltage or presents a 0 condition. When a mismatch condition exists the output of OR gate 8—26 is a 1. This output is inverted in inverter 8—27 and presented to AND gate 8—35.

Additional information is necessary from the four-stage counter to assist in programming the operation of the remote network control. Five specific AND gates become active for certain numbers in the counter and for no other combinations. These functions correspond in principle to those of gates 14—11 and 14—20 described above.

AND gate 8—28 is active when the binary cells are in a combination corresponding to binary number 1. The inputs for AND gate 8—28 consist of combinations of outputs from binary cells 8—11, 8—13 and 8—15 over leads 8—55, 8—56 and 8—57 which correspond to the binary number 1.

In addition a lead appears at the input and of AND gate 8—28 which is connected to lead 9—27. This is an output from the 250-microsecond monostable circuit.

AND gate 8—29 has inputs from the binary counter corresponding to the binary number 2 and AND gate 8—30 has inputs from the binary counter corresponding to the binary number 3. These three gates produce outputs when two conditions are fulfilled; the binary counter must be in the specified number arrangement and a pulse must be present on lead 9—27. The output leads from the three AND gates 8—28 through 8—30 are designated T1, T2 and T3. Energization of these leads indicates control phases used to gate pulses on the transmitting channels.

AND gate 8—31 is a three-input AND gate adapted to sense the binary count 0.

In this instance the pulse from the timing loop is not qualified as before. An output from AND gate 8—31 at lead P0 denotes the 0 condition of the binary counter.

AND gate 8—32 is a three-input AND gate having logical inputs corresponding to binary number 100, in binary cells 8—15, 8—13 and 8—11 respectively. Output lead P4 represents the fourth phase of the counter sequence.

The timing loop 250-microsecond output lead 9—27 is connected to AND gate 8—33. Additional inputs to AND gate 8—33 also extend from lead P0 and FG amplifier 9—26 via lead 8—58.

Lead 8—58 is adapted to represent a particular condition when a specific number, 0 in this case, is designated in terms of four bits.

Previously it was indicated that gates 8—28 through 8—32 may specify certain binary numbers in terms of three bits rather than four. The reason for this is that the fourth stage of the counter binary cell 9—25 only infrequently enters the "1" condition so that the numbers for AND gates 8—28 through 8—32 which correspond to their particular numbers preceded by a 1 in the most significant binary place do not occur.

However, for AND gate 8—33, a possibility of a 1 occurring in binary cell 9—25 exists. For this reason an additional output from FG amplifier 9—26 is provided so that AND gate 8—33 is qualified by the following conditions:

(1) A pulse of 250 microseconds is applied to lead 9—27, (2) Binary cell 9—25 must not be in the "1" condition, and (3) Lead P0 connected to AND gate 8—31 is activated.

When all three conditions are met AND gate 8—33 activates amplifier 8—34 to energize lead T0. This specifies a conductor which is active during time slot 0.

The four timing conditions T0, T1, T2 and T3 contribute to programming necessary to produce the sequence of pulses shown in FIG. 27.

A further element referred to in FIG. 9 as T4 is connected to AND gate 9—39 and derives from the output of AND gate 8—32 which corresponds to the number state 4 but requires qualification by an input from monostable circuit 9—18.

Lead T4 as a result carries a properly timed 250-microsecond pulse occurring within time slot 4.

Figure 8:
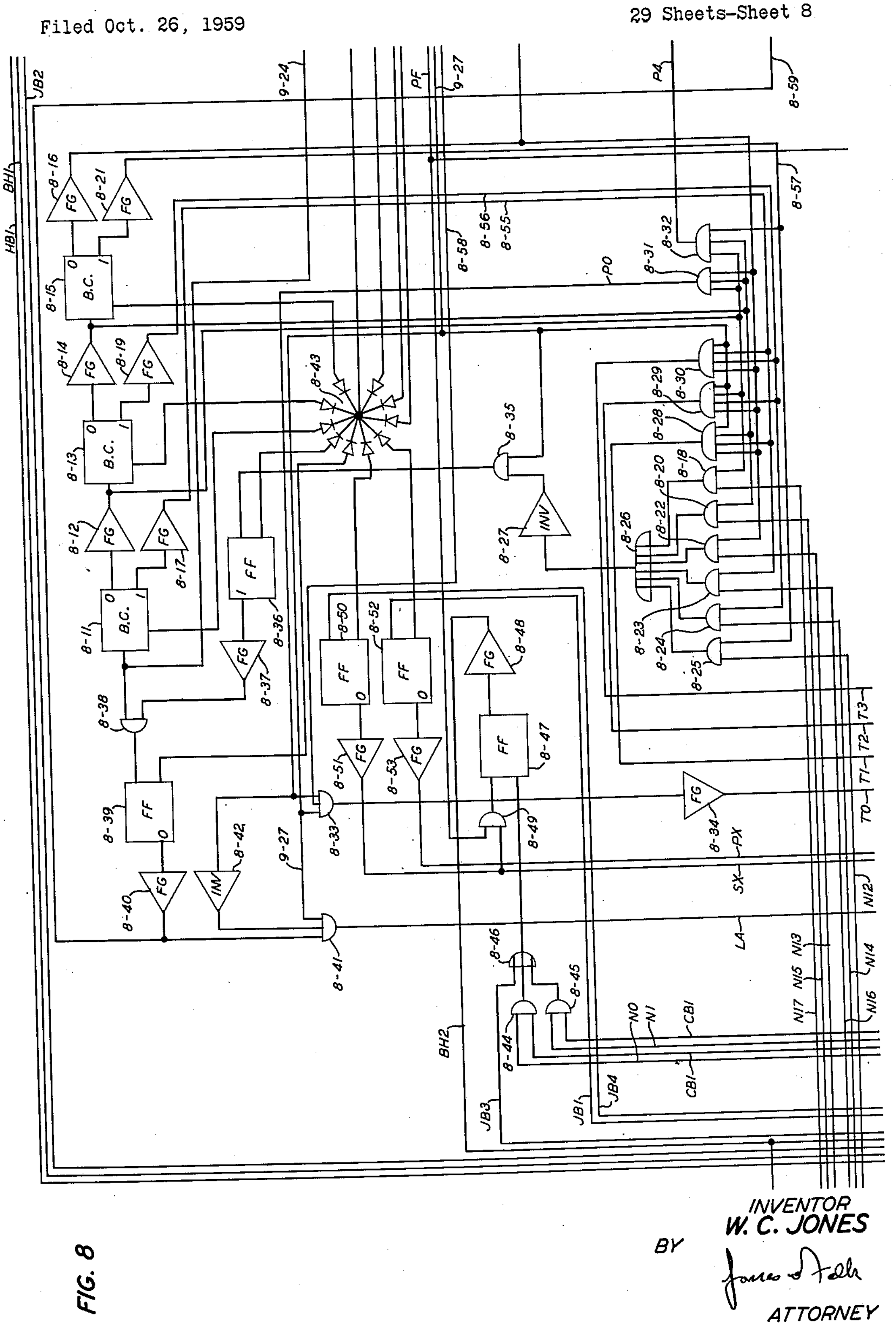
FIGS. 8 and 9 show the control and programing portions of the remote network control unit.

Thus, general reference to FIGS. 8 and 9, leads T0 through T4 include a set of five drive leads, the output of which include pulses at appropriate time junctures to trigger transmitting circuits. When the remote network control is operative, pulses appear in sequence on leads T0 through T4. This pattern of pulses is of the form required to deliver the signals shown in FIG. 27. In essence, the five leads T0—T4 represent a foundation for conversion of parallel information to serial trains of signals.

The five pulse leads T0—T4 are not by themselves adequate to produce the 2 by 8 pulse counting pattern used to transmit the link number.

To get the additional information, in inverter 8—27 is utilized since the output thereof represents a match condition between the binary counter in FIG. 8 and the link count number. This output is presented to AND gate 8—35 with a signal from lead 9—27 which represents the 250-microsecond output of the timing loop.

The output of AND gate 8—35 is presented to flip-flop 8—36 which records the fact that a match occurred on the specified number. FG amplifier 8—37 delivers the "1" output from flip-flop 8—36 to an AND gate 8—38 where it is combined with the output from the opposite timing phase. Thus the input to AND gate 8—38 includes an output from the timing loop over lead 9—24. The output of AND gate 8—38 sets flip-flop 8—39.

Thus, upon an output from a match circuit at inverter 8—27, AND gates 8—35 and 8—38 are energized in two sequential steps. When the match condition occurs, it is a result of the counter being stepped during the 1250-microsecond pulse. After that the match condition is gated into flip-flop 8—36 during the 250-microsecond phase and subsequently delivered further into flip-flop 8—39 by the 1250-microsecond phase. This pattern of operations is necessary to perform a required operation for the 2 by 8 link count. It is necessary to send a number of pulses which is one less than the value of the four-stage binary counter at any particular time.

Referring now to FIG. 27B, the difference in the matched output and the number of pulses to be transmitted will be explained. In FIG. 27B the pattern of pulses on line 2 refers to the signals transmitted to designate the link number.

(*e*) Transmission of Link Count Pulses: The position of the counting chain is 0 at the time labeled 0 in FIG. 27B. The position of the counter at the time designated 1.5 milliseconds corresponds to counter binary 1. At time 3 milliseconds the counter is at binary 2, etc. At the time 1.5 milliseconds or counter position 1, the first of a series of pulses is transmitted to the link counter. In essence the number of pulses to be sent on the link counter channel is determined by sending a train of pulses until a match position of the counters 8—11 through 8—15 against the link count numbers N12 through N17 brings about a cessation of pulses after one additional cycle.

This arrangement provides that the proper number of link count pulses will be transmitted although no link count pulse was transmitted at the first position of the counter.

The output of flip-flop 8—39 and corresponding FG amplifier 8—40 signify to the remote network control that a sufficient quantity of pulses has been transmitted on the link count channel (phantom on trunks 100/101).

Since FG amplifier 8—40 is connected to the 0 output of flip-flop 8—39 an output of FG amplifier 8—40 which is active or in the "1" state indicates that pulses are continuing on the link count channel. When the output at FG amplifier 8—40 is 0 it represents no further need to transmit pulses on the link count channel.

One connection from amplifier 8—40 is made to AND gate 8—41. An additional input to AND gate 8—41 is over lead 9—27 and a third lead extends from inverter 8—42 which has inverted the condition of the first 0 or P0 lead connected to AND gate 8—31.

When the appropriate time occurs for transmission of a 250-microsecond pulse corresponding to the activation of lead 9—27 and when the phase 0 condition is not present and when as yet an insufficient number of link count pulses have been transmitted, an output is produced at AND gate 8—41 at lead LA. This output signifies that for purposes of the necessary logic one additional pulse on the link count channel is required. For the illustration shown in FIG. 27B lead LA becomes active on four separate occasions. Lead LA extends to bipolar transmitter 22—11 as will be shown herein.

FG amplifier 8—40 produces an output at the 0 condition of flip-flop 8—39 and therefore corresponds to transmission of an insufficient number of link count pulses. An additional lead 8—59 extends to OR gate 9—30 of FIG. 9. This OR gate provides an input to amplifier 9—31 which in turn qualifies AND gate 9—21. Continued energization of lead 8—59 presents an active input from amplifier 9—31 to AND gate 9—21 with the result that the timing loop continues to generate the predetermined cycles. Through AND gate 9—21 which controls the timing loop, flip-flop 8—39 provides that when a match condition has not yet been registered therein an insufficient number of pulses have been transmitted and the timing loop must continue to operate.

(*f*) Minimum Count Circuit: Another factor involved in the continued operation of the timing loop is controlled through flip-flop 9—28 and FG amplifier 9—29.

In explaining this operation reference may be made again to FIG. 27B. The total operating cycle of the remote network control is not of fixed duration. When maintenance codes are transmitted, for example, representing numbers higher than the link numbers it takes longer to transmit the order. Qualifying conditions are necessary of the type described in which flip-flop 8—39 monitors the operation to the desired length. Thus the timing loop may run as long as is necessary to encode the required order.

The function of OR gate 9—30 is to permit the inclusion of still another condition which qualifies the length of the operating cycle from the remote network control. This condition is initiated by the setting of flip-flop 9—28 over lead P4.

FG amplifier 9—29 is energized at the 0 output of flip-flop 9—28 and in turn drives OR gate 9—30.

When flip-flop 9—28 has not yet been set, the position of the binary counting chain has not yet arrived at the number 4. The basis for operation of AND gate 8—32 and flip-flop 9—28 is to prevent flip-flop 9—28 from being set until a sufficient number of cycles have passed advancing the counter to position 4 to ascertain that all of the serially coded binary numbers have been transmitted.

By presenting the 0 output of flip-flop 9—28 through FG amplifier 9—29 and OR gate 9—30, an arrangement is provided in order that a mismatch in the match circuit or the minimum count circuit 9—28 will suffice to keep the timing loop in operation. When both qualifications are satisfied, the output of amplifier 9—31 is driven to "0" and one of the inputs to AND gate 9—21 is disabled to break the timing loop. Thus in an instance where the number of pulses required to be sent to the link counter takes less time to send than the serially included numbers, for example, where link 2 is involved, the minimum count circuit 9—28 will keep the timing chain in operation. Under this arrangement the minimum count circuit 9—28 continues the loop in operation even though flip-flop 8—39 of the match circuit has been set.

In essence the total network cycle has a minimum length (5 cycles) imposed by the need of transmitting serial binary information and will never be shorter than this period but may be longer when the particular code transmitted requires a longer link number.

When amplifier 9—31 is driven from a 1 to a 0 after a sufficient number of pulses have been sent, an input is presented to inverter 9—32. This inverted condition appears when transmitting requirements are met and is combined in AND gate 9—33 with the timing loop 250-microsecond output pulse to energize amplifier 9—34. The lead connected to amplifier 9—34 is designated PF to represent final phase. One of the functions of the final phase lead is to trigger monostable circuit 9—35 which is nominally adjusted at 4 milliseconds. In the references above (Section IIA6(*c*)) to a difference in the nature of operation after 7½ milliseconds, the structure concerned is monostable circuit 9—35.

In this respect, after 7½ milliseconds, the timing loop of FIG. 9 is no longer controlling. Timing responsibility is delivered to monostable circuit 9—35. The output of that monostable circuit is inverted by inverter 9—36 and presented to monostable circuit 9—37 which is nominally in the order of 5 to 10 microseconds. The output of this monostable circuit is used to control decoupling diode 8—43 to clear the entire circuit. This resets the counting chain, the match flip-flops, etc., to restore the remote network control to its initial condition.

(*g*) Composition of Order To Be Transmitted: As indicated above, common control produces the desired network order as a binary word in the network order register shown in FIG. 27A (see Section IIA6(*a*)). It is necessary to transmit this network order word as serial trains of pulses appearing on several channels as shown in FIG. 27B.

Figure 7:
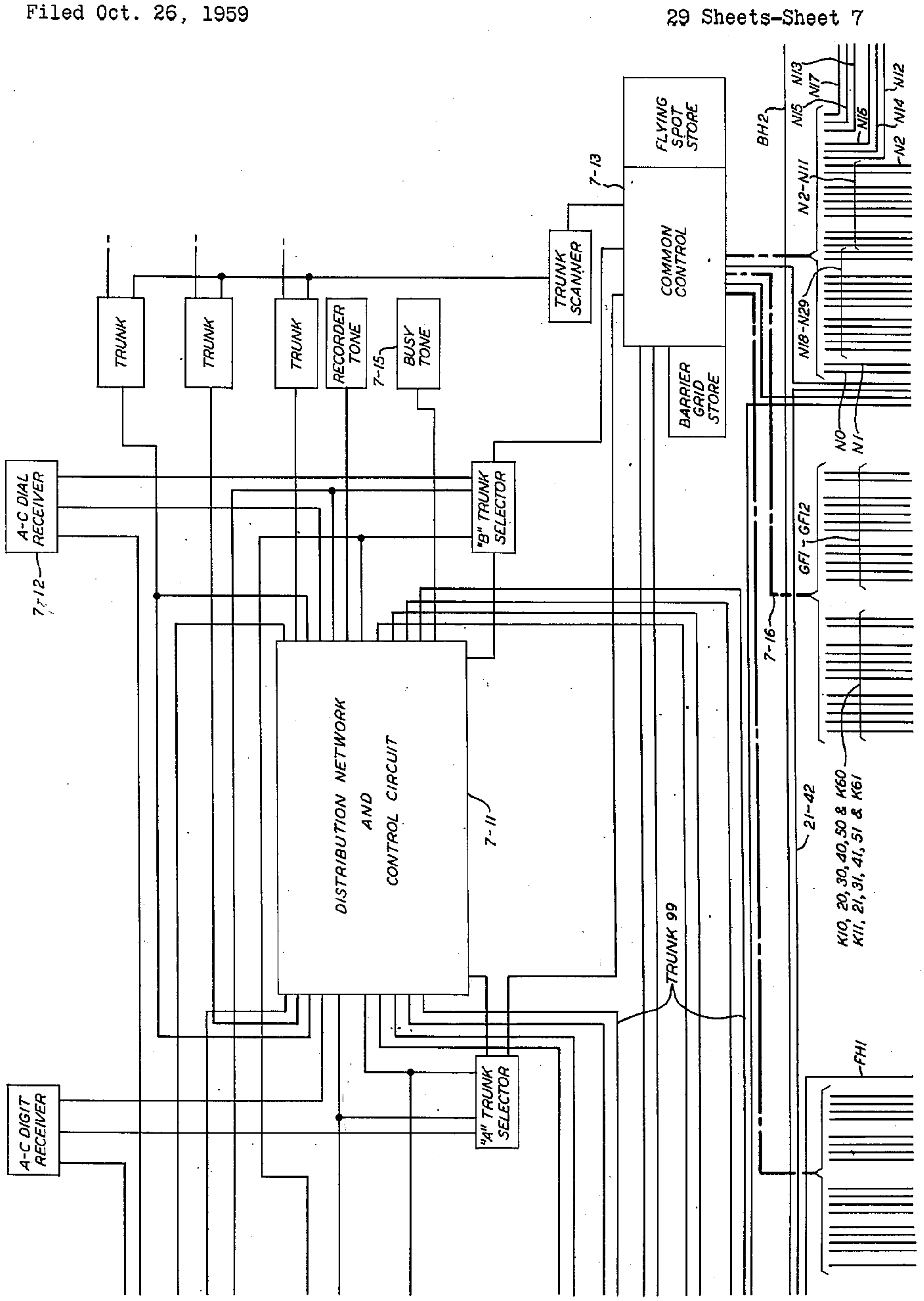
FIG. 7 shows the distribution network and control circuit, the common control, barrier grid store, and flying spot store in addition to the conductors connected thereto.

It is the function of the circuitry shown in FIGS. 8 and 9 to program the pulses and it is the function of the circuitry shown in FIGS. 15, 16 and 17 to actually transmit the pulses in the desired order to the remote concentrators. The information delivered to the circuitry of FIGS. 15, 16 and 17 is there translated from parallel indications delivered on a group of leads from common control. Thus, information on the 30 leads N0—N29 shown in FIGS. 7 and 27 is translated to produce the necessary output pulses.

(1) Transmission of Secondary Number and Primary Number: Referring to FIG. 16, four groups of AND gates 16—17 through 16—39 are shown. Gates 16—17 through 16—21 collectively constitute the "0" side of the output signal. Thus, the output of OR gate 16—22 will energize the negative half of a bipolar transmitter to indicate that the "0" pulse is being transmitted.

In effecting the parallel to serial conversion, leads T0—T4 are extended to each of the five AND gates, to insure that only one of the five AND gates, 16—17 through 16—21, is active in a particular time slot. (Section IIA6(*d*).

It is now necessary to combine the five separate "0" leads from the five (primary number) flip-flops of the network order register with the five AND gates in a corresponding order. Thus, in gate 16—17, lead T0 is one qualifying input, and lead N2 corresponds to the "0" lead of the most significant bit of the primary number. In addition, another input extends from the output of AND gate 15—15 over lead 16—41.

One of the inputs to AND gate 15—15 is from lead N0 corresponding to secondary number "0." The other input to gate 15—15 is lead SX which indicates that the secondary is to participate in this instruction (Section IIA6(*d*)). In effect, therefore, an output from AND gate 15—15 indicates that secondary number "0" is ordered to execute this instruction. Correspondingly, AND gate 15—16 would indicate that secondary "1" would participate in the operation.

In summary the outputs of AND gates 16—17 through 16—21 represent conditions which, if they occur, indicate that the time is appropriate to transmit the *n*th digit and the *n*th digit is a 0.

The output of OR gate 16—22 may be traced to the lower side of bipolar transmitter 22—14 over lead BC2.

For any or all of the five digits which correspond to 0 in the primary number there will be at a specified instant in time pulses of current appearing on lead BC2 to bipolar transmitter 22—14. This transmitter delivers the information to the remote secondary over a path explained above.

AND gates 16—23 through 16—27 have inputs analogous to those of 16—17 through 16—21 and thus include an input from AND gate 15—15 over lead 16—41. They also include inputs from the five timing leads T0—T4 and inputs from the address leads which in this case are leads N3 through N11. The AND gates 16—23 through 16—27 will be activated sequentially if the corresponding binary digits of the primary number have "1's" in the associated locations. Thus, if the digits of the primary number were all "1's," the outputs from gates 16—23 through 16—27 would include a pulse from each AND gate in turn at the five selected time periods as determined by leads T0—T4. Correspondingly the output from OR gate 16—28 would be a continuous train of pulses.

If any 0's had appeared as part of the train of pulses, gaps would occur at the output of OR gate 16—28. In this respect, whenever a gap occurs in the output of OR gate 16—28, a corresponding output will appear in that time interval at OR gate 16—22.

The output of OR gate 16—28 emerges as lead BC1 to bipolar transmitter 22—14.

In a similar manner it may be shown that AND gates 16—29 through 16—33 and OR gate 16—34 collectively constitute a set of "0" inputs for remote secondary 1. Moreover, AND gates 16—35 through 16—39 and OR OR gate 16—40 perform the same function for transmission of "1's" to remote secondary 1.

(2) Translation of Turn Units Number: In FIG. 15 the address leads 620 through N27 are distributed to four sets of four AND gates, a typical set being 15—17, 15—18, 15—19 and 15—42. This set of four gates operates in analogous fashion to the sets of five gates described in FIG. 16. Each of the four gates has an input from either the 0 or 1 side of the address register flip-flops (not shown). For example, AND gate 15—17 has an input from lead N20 and gate 15—18 has an input from lead N22, etc. In addition, the four gates have pulse inputs which include a prescribed time sequence over leads T0—T3. Finally, the input to each of the AND gates includes a connection to gate 15—15 which selects the secondary as described above.

The output of each of the AND gates 15—17, 15—18, 15—19 and 15—42 is connected to OR gate 15—20 and coupled to the lower terminal of bipolar transmitter 22—12 over lead BC5, corresponding to the input trigger terminal for negative pulse transmission. The output from OR gate 15—25 provides the inverse to the output of OR gate 15—20 in a manner similar to that of OR gate 16—28 as compared to OR gate 16—22.

It may also be shown that AND gates 15—26 through 15—29 and AND gates 15—31 through 15—34 perform corresponding functions for secondary 1.

As explained heretofore (Section IIA6(*d*), FIG. 8 includes a match circuit in combination with a counter adapted to decide when the local timing process has progressed sufficiently so that the counter matches the input adress. By this means the number of pulses to be sent is determined. At this juncture it is sufficient to observe that conductor LA will be energized a number of times equivalent to the number of link advance pulses. These pulses are already of proper width to be delivered to the transmitter. It remains only to specify which secondary is to be affected.

AND gates 15—11 and 15—12 perform this service under the control of leads N0 and N1. OR gates 15—13 and 15—14 perform an additional function which is to introduce the signal arriving on lead HB2, the synchronism check request pulse. Lead HB2 represents an arrangement for introducing a positive synchronization request pulse which is interleaved between the usual negative advance pulses.

From the two OR gates 15—13 and 15—14 a path may be traced to lead BC3 which is the positive signal terminal on bipolar transmitter 22—11. This transmitter produces positive output pulses which are phantomed on the two physical control pairs (trunks 100 and 101). This is the opposite half of the channel which is used for the advance pulses. Thus bipolar transmitter 22—11 has as its negative input lead HC1 which is connected to the sequence control circuit and produces negative advance pulses.

Bipolar transmitter 22—11 receives relatively long strings of negative inputs on lead HC1, occasional variable length pulses on lead BC3 when orders are being transmitted and, infrequently, a single positive pulse when a synchronization check is being performed. This explanation accounts for the pulses on line 2 of FIG. 27B.

(3) Formulation of "Odd-Even" and "Mark-Release" Signals: Line 4 of FIG. 27B will now be examined. These signals are transmitted over a speech phantom channel. To determine the inputs for this channel reference may be made to AND gates 15—36 and 15—37. The output from these AND gates is combined in OR gate 15—38 and delivered to lead BC7 of the bipolar transmitter 22—13. The inputs to AND gates 15—36 and 15—37 include a common input from a lead extending from AND gate 15—15. The remaining inputs to AND gate 15—36 include lead N18 which is the 0 output of the odd-even bit, i.e., the least significant bit of the link number in the order register, and the time phase lead T0.

If the link number is even, i.e., the least significant bit is a "0" AND gate 15—36 will produce an output in the 0th time slot.

The neighboring AND gate 15—37 has a different function. It has an input over lead PF which connotes the final phase of the order transmission. It may be seen that the transmission of the orders involves an early phase in which there are cyclic operations up to the 7.5-millisecond point in FIG. 27B and then shifts to a relatively long timing operation between the 7.5-millisecond point and the end of the control cycle. This final phase is preceded by the activation of lead PF for a short interval (250 microseconds) at the initiation of the final phase. The remaining input to AND gate 15—37 is lead N28 which is the 0 side of the mark or release bit.

Thus, an output from AND gate 15—37 does not take place in a fixed time period but at the commencement of the final phase provided that the order being transmitted is a release order, i.e., the least significant bit is a 0.

An output may appear at OR gate 15—38 and lead BC7 to transmitter 22—13 at each 0th and final phase time slot. The absence or presence of the pulse in the 0th time slot will indicate whether the link is odd or even and the absence or presence of the output in the final phase will indicate whether it is mark or release.

Having examined the circuitry necessary to provide the zero half of the input to bipolar transmitter 22—13 at lead BC7, it may be similarly shown that AND gates 16—11 and 16—12 in conjunction with OR gate 16—13 provide the corresponding positive or 1 pulse for the transmitter 22—13.

A connection is made from lead N19 to AND gate 16—11. Lead N19 represents the one side of the odd-even bit and at AND gate 16—12 a connection is made to lead PF for the final phase in addition to lead N29 which is the mark indication. The output of OR gate 16—13 emerges as lead BC6 into bipolar transmitter 22—13.

Gates 16—14, 16—15 and 16—16 are the corresponding equipment for secondary 1.

Line 5 illustrated in FIG. 27B includes an inbound pulse and does not involve translation equipment. In addition the lower lines of FIG. 27B indicate orders that have already been described and have now been relayed through the secondary into cable en route to the primary.

The essential parts of the instruction being transmitted to the secondary concentrator are now complete. Reviewing briefly in FIG. 22, it is seen that of the four transmitters shown, transmitters 22—14 and 22—12 are sending serial binary information through a straightforward translation. Transmitter 22—11 is carrying information of a counting nature including 0 to 7 pulses of the same polarity (positive) and also negative advance pulses. Finally transmitter 22—13 transmits pulses which are spaced to conform to the beginning and end of the order word. These pulses respectively carry odd-even information and mark or release. All of this information is being sent directly to the secondary concentrator and part of it will be repeated and retransmitted to the primary. The latter information includes all that transmitted over transmitter 22—11.

Receiver 22—15 receives the inbound secondary check pulse and over lead CB1 is connected to gate 8—44 in FIG. 8.

Referring now to FIG. 17, circuits are shown which select a set of gates per primary concentrator. Earlier it was indicated that a portion of the network instruction may be sent to the remote secondary and broadcast to the remote primaries. This was the information transmitted by bipolar transmitter 22—11. Certain portions of the instruction including the odd-even pulse and the mark-release pulse are delivered directly to the primary concentrators involved.

(4) Signal Transmission to Specific Primary: The process of delivering information directly to a particular primary requires the selection of a specific signaling channel. The major function of the structure shown in FIG. 17 is a binary selection of gates 17—39 through 17—62, each one of which corresponds to a particular primary within a given secondary.

Gates 17—11 through 17—18 provide all of the combinations for the three bits which are the three least significant bits of the primary number (N6—N11). One of the eight gates 17—11 through 17—18 will be selected for each word. The remaining two bits which are the most significant (N2—N5) are used in combination with the secondary selection bit (N0—N1) to produce a combination suitable for the purpose. Thus AND gates 17—19 through 17—21 are provided for the remote primaries associated with secondary 0 and gates 17—22 through 17—24 for the remote primaries associated with secondary 1. One additional lead, PX, appears as a common lead to AND gates 17—19 through 17—24. This lead, as explained infra, is an output which indicates that a selected primary is permitted to participate in a given instruction.

Thus an individually selectable gate per remote primary is available in gates 17—39 through 17—62. The functions required to be performed on the channel leading to the selected primary are similar to those referred to above for the secondary execute channel, i.e., odd-even selection at time phase 0 and mark-release selection at the final phase time. These are performed by gates which are represented at 17—71 through 17—78.

The operation required includes the energization of gates 17—63 through 17—66 which function collectively to join leads PF and T0 with leads N28 and N29 and N18 and N19 to produce combinations similar to those discussed above for the secondary. Thus the final phase lead PF and lead N29 through AND gate 17—63 and leads T0 and N19 through AND gate 17—64 produce a "1" output in OR gate 17—67 at both instants in time.

In FIG. 27B (line 7) the transmitter 20—17 has a positive pulse in the first time slot and the final phase. These pulses are both generated at amplifier 17—69 and transmitted via AND gate 17—71 and lead BD1.

In like manner OR gate 17—68 produces appropriately timed pulses corresponding to the order to send a "0."

These outputs are multipled to gates 17—71 through 17—78 for all primary concentrators. Thus the order for any primary concentrator is made up in the two amplifiers 17—69 and 17—70 and is delivered to a specific primary concentrator based on the selection made in FIG. 17.

The outputs of gates 17—71 and 17—72, etc., appear as leads BD1 and BD2 which appear in FIG. 20 as inputs to bipolar transmitter 20—17. In like manner gates 17—77 and 17—78 are connected to primary concentrator control 19 (of Sec. 1) in FIG. 20.

One additional lead BD3 appears in FIG. 20 as an input to AND gate 20—12. This lead is used to interlock the receiver with the transmitter during the transmission of an order.

Referring to FIG. 27B, line 4, it is seen that the time which elapses between the two pulses is that required to transmit a five-bit binary word. If a greater number than five bits was required the execute order mark or release pulse could not be transmitted until after the complete train of link advance pulses had been sent. This has the net effect of stretching the total time of the network control cycle.

Thus in an order involving any of the usual links (0—9) the network cycle will be fixed in length at approximately 12 milliseconds based on the minimum time required to send the primary number. Orders involving higher numbered links used for maintenance are increased to about 17 milliseconds. In short, the first part of the order word although determinable in a specific instance is permitted to vary. In this respect it will be observed that the final four milliseconds is similar in each instance but is slipped back or forth in time depending on the number of bits to be transmitted prior thereto.

(*h*) Secondary Crosspoint Failure: Still another function in FIG. 8 involves AND gate 8—49 which under certain conditions can set flip-flop 8—47. This is the secondary crosspoint failure flip-flop and indicates that the secondary concentrator has failed to execute a network instruction.

Observation of this flip-flop by common control through scanner 6—13 will indicate a malfunction in the remote secondary. Thus, lead PF is used to set flip-flop 8—47 which produces an output through FG amplifier 8—48 over lead BH2. Lead BH2 is connected to the office scanner 6—13 and also to the sequence control where it appears as an input to OR gate 21—14 which produces flag indications for common control.

Since, in a situation where a secondary "exclude" order has been forwarded, the secondary will obviously "fail" to execute the order (see Section IIA6(*b*) supra), AND gate 8—49 is qualified by the condition of the secondary exclude flip-flop 8—50.

It will be noted that lead PF sets flip-flop 8—47 which indicates a failure in the secondary in every instance but this flip-flop will be reset provided that a pulse is received back from the secondary. Moreover, it will be reset before the time in which common control or RCC will have observed its setting.

(*i*) Secondary "Success" Signal: At this juncture, the path will be traced over which the success pulse returns from the secondary concentrator to reset the flip-flop 8—47. Receiver 22—15 is alerted to sense the positive pulse (indicated in FIG. 27B at line 5) which is transmitted by the remote secondary when it succeeds in executing the instruction delivered to it by the central office. The output from receiver 22—15 is delivered over lead CB1 and connected to AND gate 8—44. An additional lead CB1 is connected from a similar receiver in secondary control number 1 to AND gate 8—45.

The function of AND gates 8—44 and 8—45 is to combine the success pulse with the address bit on leads N0 and N1 to indicate which remote secondary is involved. The outputs of AND gates 8—44 and 8—45 are connected to OR gate 8—46 which in turn resets flip-flop 8—47.

OR gate 8—46 has an additional input elad JB3 which derives from the control selector shown in detail in FIG. 13. This input is used by common control through the control selector as a facility for resetting flip-flop 8—47 independently of any operation by the secondary. The necessity for this utilization arises when a malfunction occurs in the remote secondary concentrator and flip-flop 8—47 is accordingly not reset. The flag which results indicates that failure has occurred in a particular secondary concentrator. Once this indication has been observed and appropriate action taken by common control it is useful to provide means for resetting the trouble indication over lead JB3 to permit common control to proceed with other routine operations.

Flip-flop 8—50 is the flip-flop which corresponds to secondary "exclude." When flip-flop 8—50 is set by lead JB4 the order which follows is not executed in the secondary. Similarly flip-flop 8—52 which is set by lead JB1 results in excluding the primary from the following order. Both flip-flops 8—50 and 8—52 are reset at the end of the operation by decoupling network 8—43.

FG amplifiers 8—51 and 8—53 are triggered from the 0 outputs of flip-flops 8—50 and 8—52 respectively.

It is necessary to connect the output of the FG amplifier 8—51 to the AND gate 8—49 to avoid the setting of flip-flop 8—47 when the secondary is excluded from a particular operation. In such a case the remote secondary cannot produce the usual success pulse to reset the failure indication. Thus a false indication of failure would arise but for the fact that AND gate 8—49 insures that flip-flop 8—47 will not be set.

The outputs of FG amplifiers 8—51 and 8—53 are connected to conductors SX and PX and are used to control the addressing of information within the translation portions of the remote network control.

Reviewing briefly, the remote network control includes a pair of monostable circuits 9—22 and 9—18 connected in a timing chain which can be controlled in various ways to generate pairs of control phases or sequences for carrying out sequential operations. A four-stage binary counter 8—11, 8—13, 8—15 and 9—25 is used to program the various steps that are necessary for the encoding requirements of the network order logic. A register circuit including OR gate 8—26 is used to detect when a number in the binary counting chain agrees with 3 bits of the selected address and to show when that match condition has existed for a full cycle.

A series of output leads are extracted from the binary counting chain and are qualified by timing phase supplied by the timing loop to yield precise sequential pulses on leads T0—T4.

One of the inputs to AND gate 9—21 which derives from FG amplifier 9—26 is made inactive only when binary cell 9—25 has been triggered in the course of a counting operation. This binary cell 9—25 has as its primary function the recording of the fact that the counting chain was driven to the number 8 or full count. When this condition is reached the timing loop is interrupted to remove one of the inputs to AND gate 9—21.

The necessity for this type of arrangement lies in the fact that if some portion of the match detector failed to operate, i.e., any of the AND gates 8—18, 8—20, 8—22, etc., the network order logic would continue to send the same order repeatedly. The result of the operation of binary cell 9—25 is to stop all transmission and in effect terminate all further operations until common control determines that a malfunction has occurred.

Having described the operation of certain components of the invention, a detailed description of the operation will now be given.

B. *Detailed Description of a Typical Call-Originating Connection*

(1) Customer Goes Off-Hook: It will be assumed that subscriber number 59 (FIG. 1) lifts his receiver to originate a call. When the counters 1—15 and 1—16 arrive at number 58 and the line scanner is at 59, a signal will be present in detector 1—19 to produce a service request as explained in the above-referred-to application of Cirone et al. When the next advance pulse arrives, the office counter will be at number 59 and gate 1—11 will produce an output SR/CPF. This triggers transmitter 2—13 to send a pulse to the central office. This pulse is transformer coupled as a unipolar shaped positive pulse over a phantom circuit including links 2 and 3.

When the pulse arrives at the remote secondary, (FIGS. 3 and 4), metallic by-passes are made around the network and extend to trunks 02 and 03 in phantom longitudinal form. It will be noted that these metallic by-passes are completely independent of any switching function in the secondary.

The nature of signal flow from the central office includes high rate information to the secondary and high rate information to the primary. There is also low rate information from the central office to the remote secondary and from the central office directly to the remote primary. There is no high rate information inbound to the central office at any time.

Low rate information travels from the remote primary directly to the central office (geographically through the secondary but with no useful function therein) and low rate information is delivered from the secondary to the central office.

Trunks 02 and 03 have center taps 5—11 and 5—12. The transformers 5—13, etc. are physically located in the central office distribution network. Taps 5—11 and 5—12 extend to the primary controls in FIG. 20 where they appear as leads BP and BM. Similar paths may be traced for the remaining primaries 1–19 not shown.

(2) Service Request Flip-Flop is Set: The service request pulse is now coupled to receiver 20—11. The pulse further extends through AND gate 20—12, OR gate 20—13 and arrives at flip-flop 20—14. This flip-flop is the SR flip-flop referred to above, and designates a service request in primary 00 and is located in the block diagram in primary control 25—16.

Figure 6:
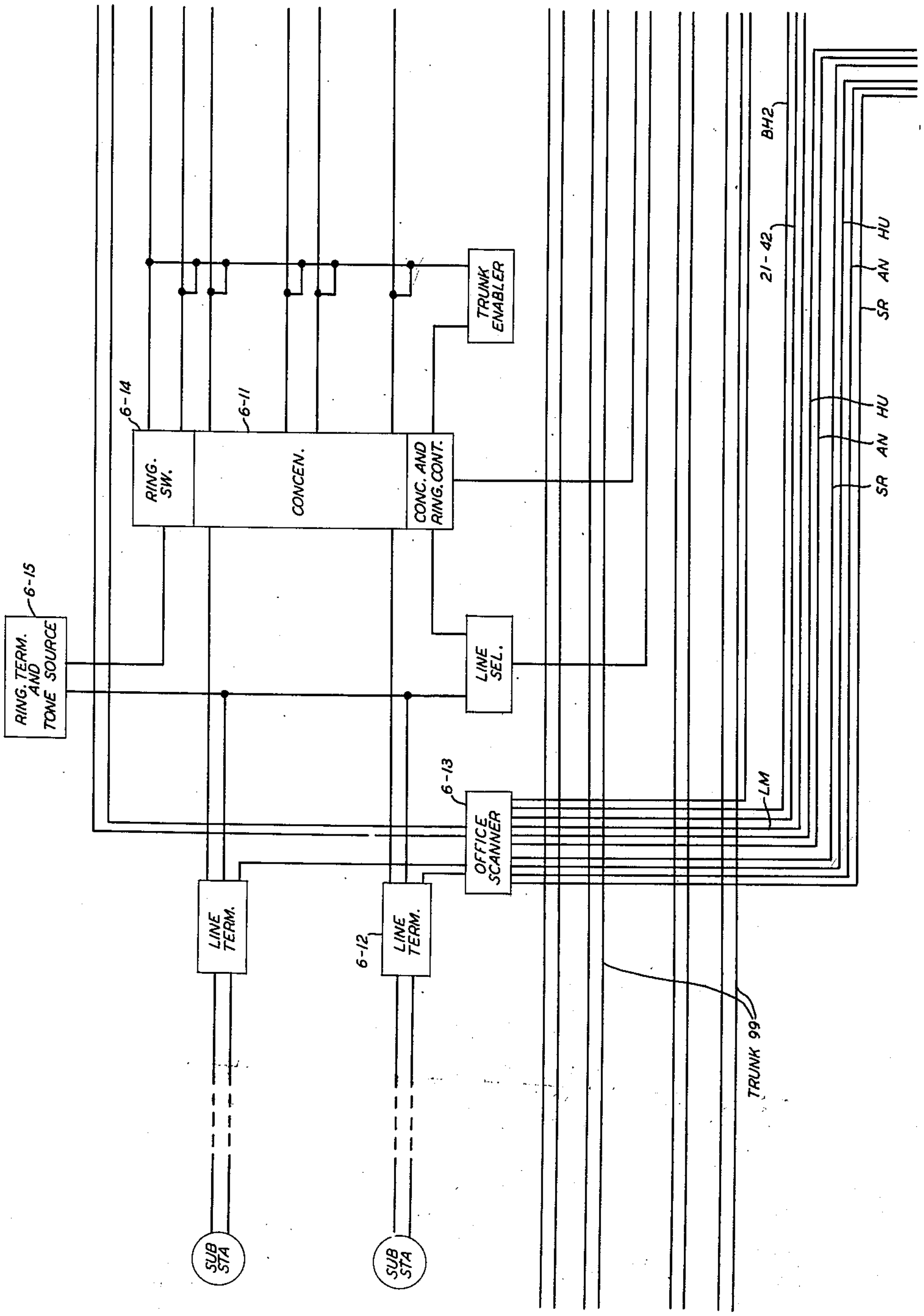
FIG. 6 shows central office equipment including the office concentrator and office scanner and in addition shows line terminations for two direct connected (non-concentrated) lines.

Flip-flop 20—14 produces an output through amplifier 20—15 and AND gate 20—16 energizing lead SR extending to the office scanner 6—13 in FIG. 6. Another output from AND gate 20—16 appears over lead 21—0DH3 at OR gate 21—14 to set the flag at AND gate 21—40.

When common control observes the flag set by OR gate 21—14, office scanner 6—13 is directed to evaluate the reasons for the flag in a manner explained in the above-referred-to application of Budlong et al.

Common control is informed by scanner 6—13 that an SR/CPF indication has been made and which remote primary (00) it came from. Common control now examines the position of the line number counters 14—12 through 14—17. Common control can examine the counter without using the office scanner because the output information from the counter is read directly over cable 7—16 into the logical bus of common control. From the counter position, common control learns the line number making the service request. The concentrator number is now known, the line number is known and by reference to the route memory, common control can tell whether the signal is SR or CPF (service request or cross-point failure).

(3) Route Memory in Barrier Grid Store: Referring now to FIG. 26, a portion of the surface of the barrier grid store (FIG. 7) is shown. A record of all connections existing in the remote concentrator system is kept in this device which is referred to herein as the route memory.

The elements, shown as 26—11, are small groups of spots arranged in a vertical row on the face of the barrier grid store. The enlarged view 26—12 shows the details of element 26—11. The register shown at 26—12 contains twelve spots used to store information pertinent to a particular link.

In determining whether this is an SR the ten link registers are scanned and activity spots S1 and S0 are examined. If an activity spot is observed an examination is made to determine whether loop number 59 is in use. If a record of connection is found in one of the elements 26—11 involving loop 59, the signal must mean a cross-point failure CPF. If no information regarding a connection to loop 59 is found it is assumed that the signal is a service request.

Thus it has been determined that the customer at substation 59 of FIG. 1 has a service request and it remains to establish a connection to him from the central office.

Common control using the same route memory will select a path for connecting subscriber 59 to the office.

It may be seen from FIG. 26 that within a given cluster of 10 trunks 26—14, four "A" trunks will be designated for originating calls only. Four "B" trunks will be used for terminating calls only and two "C" trunks which are overflow trunks may be used in either direction.

Common control selects a path to the central office by examining which of the links to the central office are available and then by referring to the trunk activity spots 26—13 which trunks are available. Common control first observes whether an "A" trunk accessible to the idle link is available. If no path is available, common control will select another idle link and test all of its available trunks for a path. All of the links will be tested for "A" trunks before common control will elect a common or "C" trunk.

After making a selection, an entry is made in the register of the path selected. Common control now governs the distribution network 7–11 to connect from the selected trunk to a digit receiver such as 7—12 for an originating connection in the manner shown in Budlong et al. supra.

All of the concentrators have been quiescent during the selection of the path by common control in response to the service request, and it is required to prepare an order for the remote concentrators to set up the desired connection.

Information is encoded by common control based on the route memory and the selected path. The link number must be sent to the primary concentrator with advice to the primary governing whether to mark or to release. To the secondary, the link number and the particular primary involved must be indicated. Moreover, although the link number designates the tens digit of the trunk number, the units digit of the trunk number must be sent to the secondary. This information completely specifies the path to the calling subscriber.

Common control now delivers this information to the remote network control 25—18 shown in detail in FIGS. 8, 9, 15, 16 and 17 (Section IIA6 supra). The remote network control 25—18 under the guidance of the control selector 25—20 transmits the information to the remote concentrators.

The information to be transmitted to the remote concentrators includes both "high rate" and "low rate" signaling. Part of the information is sent over the same channel that carries the advance pulse but is of opposite polarity. On the channel which brought the service request into the office, low rate information is transmitted in the opposite direction. This latter information includes two pulses relatively widely separated in time as explained in Section IIA6.

The latter arrangement is necessitated by the broadcast technique where the order is sent via one secondary to all the primaries connected thereto. If the complete order word is transmitted on a broadcast basis to the primaries, all of the primaries will execute the order. To prevent this most of the order is sent on a broadcast basis to all of the primaries but the specific command for execution of the order is sent over phantom channels on a point-to-point basis directly to the concentrator intended to receive the order. Only this concentrator will execute the order.

(4) Separate Transmission of High and Low Rate Information to Close Crosspoint in Remote Primary: The paths which the high and low rate information travel on may be traced as follows: The high rate information, which consists of a variable number of pulses of the same polarity (constituting the link number) goes out on the same channel as the advance pulses but are of opposing polarity. This series of pulses is formed and encoded within the remote network control and proceeds from there on lead BC3 in FIG. 22 into bipolar transmitter 22—11. Depending on the specific order, a single pulse or a string of pulses may be forwarded by transmitter 22—11. This pulse may be traced through the transformer coupling network and the phantom circuit formed by the connection of conductors LCP, LCM, TTP and TTM which appear in FIG. 19 as trunks 100 and 101. This circuit may be further traced to the remote secondary and bipolar receiver 11—11 which extends to FIG. 10.

The signal is now repeated over conductor 11—22 for broadcast purposes and appears at the positive input of bipolar transmitters 10—11 and 3—11. These signals are thus transmitted to all of the primaries.

The link number counter 10—12 records the series of pulses being transmitted by the remote network control. This counter is similar to other link counters in all of the remote secondaries.

The positive order pulses continue through link 10 into the bipolar receiver 2—11. From the positive terminal of receiver 2—11 a connection is made to counter 2—19 and an additional connection extends to AND gate 1—22 where it will be used as part of the synchronism checking circuit explained herein. Counter 2—19 is advanced by the pulses from receiver 2—11 comprising the order word.

The low rate part of the order instruction goes in the outbound direction over the same channel traced above for the service request. In FIG. 20, inputs from the remote network control are presented to the transmitters of primary control 00 over leads designated BD1 and BD2 which appear as inputs to transmitter 20—17. This transmitter produces pulses responsive to the logical inputs presented by the remote network control. These pulses are transformer coupled to leads BP and BM in FIG. 20 which extend to leads 5—11 and 5—12 where they are coupled to trunks 02 and 03. The channel may be further traced through the secondary concentrator to links 2 and 3 in FIG. 3 and through transformer 2—20 to bipolar receiver 2—21.

For illustrative purposes, it will be asumed that common control elected to connect subscriber 59 over link number 8. The link counter operation is predicated on the determination of whether an odd or even link is selected. If an even link is selected the counter is advanced in the order 2, 4, 6, 8, etc. If an odd link is selected the counter is advanced 3, 5, 7, etc. It will be appreciated that the counting elements 2, 3, etc. themselves are not duplicated and are only single elements but are shown symbolically as having two possible values. This type of "quibinary" coding is explained in "The Design of Switching Networks" by Keister et al., 1951 at page 316.

Thus to select the number 8 the first pulse would be a negative pulse which on arrival at receiver 2—21 and AND gate 2—22 sets flip-flops 2—23 (whose function is to separate pulses that come at the beginning of a word from those that come at the end) and resets the odd-even flip-flop 2—25.

In this case an even indication has been transmitted which comprises a negative pulse on the channel and, assuming that flip-flop 2—23 is in a proper state to enable gates 2—22 and 2—24, gate 2—22 will pass the signal from the minus side of receiver 2—21 to cause the odd-even flip-flop to be set to the even condition. The fact that the even condition has been sent indicates further preparation of gates 2—26 and 2—27 which are to be energized subsequently. Gates 2—28 and 2—29 would have been prepared for energization if the initial pulse was positive denoting an odd numbered count.

Thus the sequence of events in receiving the order number begins with the arrival of a single pulse either positive or negative on the service request channel to set or reset respectively the odd-even flip-flop 2—25.

In addition to enabling gate 2—22 an input is also provided to OR gate 2—35. The function of this gate is to change the steering flip—flop 2—23 to steer the input signals coming in from bipolar receiver 2—21 to perform an odd-even choice and to steer them subsequently to provide a mark or release choice.

In the assumed case, the minus pulse has arrived and triggered the OR gate 2—35. The latter has set the steering flip-flop 2—23 to prepare for the end of the word and at the same time has provided a set "1" indication to counter 2—19.

In summary, the negative pulse at the output of receiver 2—21, has enabled gate 2—22, set the odd-even flip-flop 2—25 to even, prepared to energize gates 2—26 and 2—27, energized OR gate 2—35 (which sets the steering flip-flop 2—23 to the opposite phase to be ready for the end of the word), and caused a "1" condition to be set in the counter 2—19.

It will be noted that the input pulse from receiver 2—21 is sufficiently short in relation to the reaction time of steering flip-flop 2—23 to permit the pulse to terminate before flip-flop 2—23 changes state.

Somewhat later in time the pulse train which arrives on the advance channel begins. It comprises a chain of positive pulses at receiver 2—11 and provides link advance pulses in counter 2—19. These pulses cause counter 2—19 to advance its state providing it has been set previously to "1."

The conditions in counter 2—19 are measurably distinct from those which obtain in counters 1—15 and 1—16. In counter 2—19 if no pulse is produced as a set "1" pulse, subsequent advance pulses will not cause the counter to step. However, once it has been primed with a set "1" condition it will propagate further on receipt of subsequent advance pulses.

Under the assumed condition a chain of four pulses causes the counter to step to what may be an 8 or a 9. The even indication in flip-flop 2—25 indicates that it is an 8.

Following the link advance pulses another pulse arrives at receiver 2—21. This pulse may be positive or negative depending on whether a mark or release is intended (positive for mark and negative for release). Steering flip-flop 2—23 will now cause gates 2—30 and 2—32 to be ready to receive pulses and thus the final pulse enables gate 2—32. This pulse extends further to gates 2—27 and 2—29 and an output now occurs in monostable circuit 2—33 which extends to amplifier 2—34 and through the link mark matrix 2—16 which has been addressed by the link counter 2—19. The pulse indicating a mark appearing at the output of gate 2—32 also appears at the input to gate 2—18 and changes the steering flip-flop 2—23 back to its original condition.

An input is now provided to delay circuit 2—31 which delay is intended to give the "mark" operation time to be carried out before the information is destroyed.

Thus, the final pulse indicates that a mark operation is required, permits the addressing of the mark matrix and the actuation of a monostable circuit (2—33) to make the selection. It restores the steering flip-flop 2—23 to its original condition and, after a lapse determined by delay 2—31, clears the link counter 2—19.

An additional output from OR gate 2—36 triggers amplifier 1—23 and by means of line mark selector 1—18 marks the corresponding line. This pattern of operations closes the crosspoint which has been uniquely specified within network 1—20 by simultaneous selection of a line terminal and a link terminal.

The output of bipolar receiver 2—11 corresponding to a negative input pulse provides an input to OR gate 2—18 to insure that on every advance pulse the flip-flop 2—23 is reset and the link counter is cleared. This arrangement automatically destroys any residue of an incomplete order preventing the possibility of a subsequent order being added to a previously incomplete order and causing a spurious order word.

(5) Closure of Crosspoint in Remote Secondary Concentrator: Thus far the service request has been detected in the remote primary concentrator and common control has recognized this situation through the flag. Referring to its memory common control has resolved that this is a service request and has decided to establish a path to the service requesting subscriber. The manner in which the path was connected through the primary was explained in the preceding section.

It has been assumed that the subscriber on loop 59 of primary 0 has service requested. A path was selected for him which included link 8 in the primary concentrator. It will now be assumed that trunk units number 9 has been selected.

The instruction arrives at the secondary in fragments as shown in FIG. 27. A portion of it, including the link count, arrives through bipolar receiver 11—11. Another part arrives in bipolar receiver 11—12 and includes the primary number. Bipolar receiver 11—13 receives the trunk units number. Moreover, a portion of the information intended for the secondary is received at bipolar receiver 4—11. The actual network control operation at the secondary concentrator will now be reconstructed.

The primary number which arrived at receiver 11—12 is communicated to shift register 10—13 via leads 11—18 and 11—19. Register 10—13 is a five-bit binary register arranged in conjunction with translator 10—14 to present one of twenty outputs to link mark selector 10—15. The decoding which occurs in shift register 10—13 and translator 10—14 is in effect the reverse of the translation performed in the remote network control. The register 10—13 performs a conversion from serial to parallel binary and the translator converts the parallel binary to parallel decimal.

Receiver 11—13 receives the trunk units number which it delivers to shift register 18—11 via leads 11—20 and 11—21. The information is converted in translator 18—12 and appears as a one-out-of-ten input to trunk scanner 18—13 and also to trunk release matrix 18—14 and trunk mark selector 18—15.

In this operation, since a connection is being established, the trunk mark selector is utilized.

The operation in the secondary network must include the selection of a particular link (1 of 200) and a particular trunk (1 of 100) and application of marking voltages to these points.

Thus far information relating to one-out-of-ten on the trunk side and one-out-of-twenty on the link side has been given. Additional information must be included in these addresses before they are complete.

Arriving on bipolar receiver 11—11 is information pertaining to selection of the link number itself. The outputs 11—22 and 11—23 of receiver 11—11 are delivered to link counter 10—12 and bipolar transmitters 10—11 and 3—11 for broadcast retransmission to the primary concentrators.

A portion of the link number has now been assembled in accordance with the positive pulse train described in FIG. 27B at line 2. This information arrived at receiver 11—11 and results in advancing link number counter 10—12.

At this time additional information must arrive to prepare the link number counter. This operation is identical with that described earlier in the primary concentrator.

Reviewing briefly, the signals which are analogous to those previously described for the primary and which arrived at bipolar receiver 2—21, now arrive at the remote secondary on bipolar receiver 4—11. It may be noted that the operation of receiver 2—21 and receiver 4—11 are substantially simultaneous. The outputs of receiver 4—11 appear as inputs 4—12 and 4—13 to a series of gates 18—16 and 18—19.

Flip-flop 18—20 determines by its state the action to be taken on receipt of information in receiver 4—11. Flip-flop 18—20 corresponds in this respect to steering flip-flop 2—23 in the primary.

Flip-flop 18—21 corresponds to odd-even flip-flop 2—25 of the primary circuit. The first operation carried out on the pulse arriving at receiver 4—11 is qualification by AND gate 18—17. Since this is a mark instruction referring to link 8, an even numbered link, the pulse emanates from the negative portion of the receiver. Since flip-flop 18—20 is in the "0" condition signifying that flip-flop 18—20 is presenting inputs to AND gates 18—16 and 18—17, the pulse causes resetting of flip-flop 18—21 which in effect corresponds to selection of even numbered link functions.

Flip-flop 18—21 being reset to correspond to an even numbered condition signifies that output lead 0 of flip-flop 18—21 is active and appears as an input to four different selective circuits. These include trunk scanner 18—13, trunk release selector 18—14, trunk mark selector 18—15 and the link mark selector 10—15. Thus, in the lower portion of these matrices a one-out-of-two selection has been made. The input pulse which arrives at bipolar receiver 4—11 also produces an input to AND gate 18—19 but since flip-flop 18—20 is in the zero condition AND gate 18—19 is not enabled.

At the time the input occurred at AND gate 18—17, enabling gate 18—17 and resetting flip-flop 18—21, it also provided an input to OR gate 18—22. The output of OR gate 18—22 sets flip-flop 18—20 which changes the steering of the following pulse to a different set of gates.

The output of OR gate 18—22 also is connected to link number counter 10—12 at the set "1" input terminal.

In the operations which have transpired thus far, it is seen that when the order was transmitted, the first set of pulses in the first time slot included the odd-even pulse which in this instance was even since link number 8 was involved. This pulse was traced above through AND gate 18—17 resetting of flip-flop 18—21, etc. The resetting of flip-flop 18—21 has partially composed the address required for trunk mark selector 18—15 and for link mark selector 10—15. Beginning now with the phase after zero, counting pulses are transmitted to step the link counter to the desired position. These pulses arrive as outputs from the positive side of bipolar receiver 11—11 and are a total of four pulses to determine link 8.

Thus the initial negative pulses at receiver 4—11 are followed by a train of positive pulses in bipolar receiver 11—11 which results in advancing link number counter 10—12 over lead 11—22. The counter 10—12 produces an output which is one-out-of-*n* (in this case 8) as part of the address for the link mark selector 10—15 and the trunk mark selector 18—15.

The remaining portions of the address were composed during the time that the link number was being decoded at the link number counter 10—12. The shift register 10—13 has been absorbing the remote primary number which is assumed to be 0—a train of five negative pulses. In this manner the appropriate selection has been made for the link mark selector 10—15 to designate the selected primary which in this instance is 0.

Similarly and concurrently with the above operation, shift register 18—11 has accumulated pulses designating the trunk units number and has made a one-out-of-ten selection in conjunction with translator 18—12 for application to trunk mark selector 18—15, trunk release selector 18—14 and trunk scanner 18—13.

At the end of the time required for counting the necessary pulses in link number counter 10—12 all of the critical address information is complete. It remains now to execute the instruction thus designated.

First it is necessary to determine whether a mark or release is involved. In this case a mark order is involved as embodied in a positive output from bipolar receiver 4—11. This pulse is delivered to AND gate 18—18 over conductor 4—12 in view of the previous setting of flip-flop 18—20 (the steering flip-flop). AND gate 18—18 is energized setting flip-flop 18—23 and provides an input to OR gate 18—24.

Output 1 of flip-flop 18—23 appears as an input to AND gates 18—25 and 18—26, the latter being related to the operation of the trunk mark selector. The pair of AND gates 18—25 and 18—27 are concerned with the return of a checking signal to the RCC as explained herein.

OR gate 18—24 is also triggered by AND gate 18—18 and operates monostable circuit 18—28, which in turn delivers an output to AND gates 18—26 and 18—29. In addition monostable circuit 18—28 energizes inverter 18—35, a shorter duration monostable circuit 18—30 and inverter 18—31. The output of inverter 18—31 is connected through amplifier 18—33 to AND gates 18—25 and 18—27 over conductor 18—36.

The function of monostable circuit 18—28 is to provide a timed input to the mark selection matrices for trunk marking and trunk releasing. After the necessary timing to characterize the length of the pulses monostable circuit 18—30 is activated to read out the results of the trunk scanning operation and to establish whether the crosspoint has been closed properly.

The output of AND gate 18—26 in addition to providing an input to trunk mark selector 18—15 also provides an input to link mark selector 10—15 via conductor 18—37 so that the marking matrices may be synchronously timed.

Monostable circuit 18—28 is timed for a duration of approximately one millisecond to govern the application of a marking signal via gate 18—26 to the trunk mark selector 18—15 and the link mark selector 10—15. Similarly, monostable circuit 18—28 provides a timing operation for trunk release selector 18—14 via AND gate 18—29.

Thus, from the time that OR gate 18—24 is energized and for one millisecond thereafter, the output of monostable circuit 18—28 has insured that appropriate marking potentials have been applied to the network. It is this one millisecond exposure of voltages to the two selectors 18—15 and 10—15 which actually breaks down the crosspoints. In this respect it should be noted that the trunk mark selector makes a selection of one-out-of-two by one-out-of-five by one-out-of-ten for a total of one-out-of-100.

In the case of the link a selection of one-out-of-two by one-out-of-five by one-out-of-twenty yields a total of one-out-of-200. The trunk mark and release selectors and the trunk scanner may all illustratively be three-stage transistor trees adapted to individually connect to each of the 100 trunks. The link mark 10—15 may be a three-stage tree adapted to connect individually to the 200 links.

Figure 4:
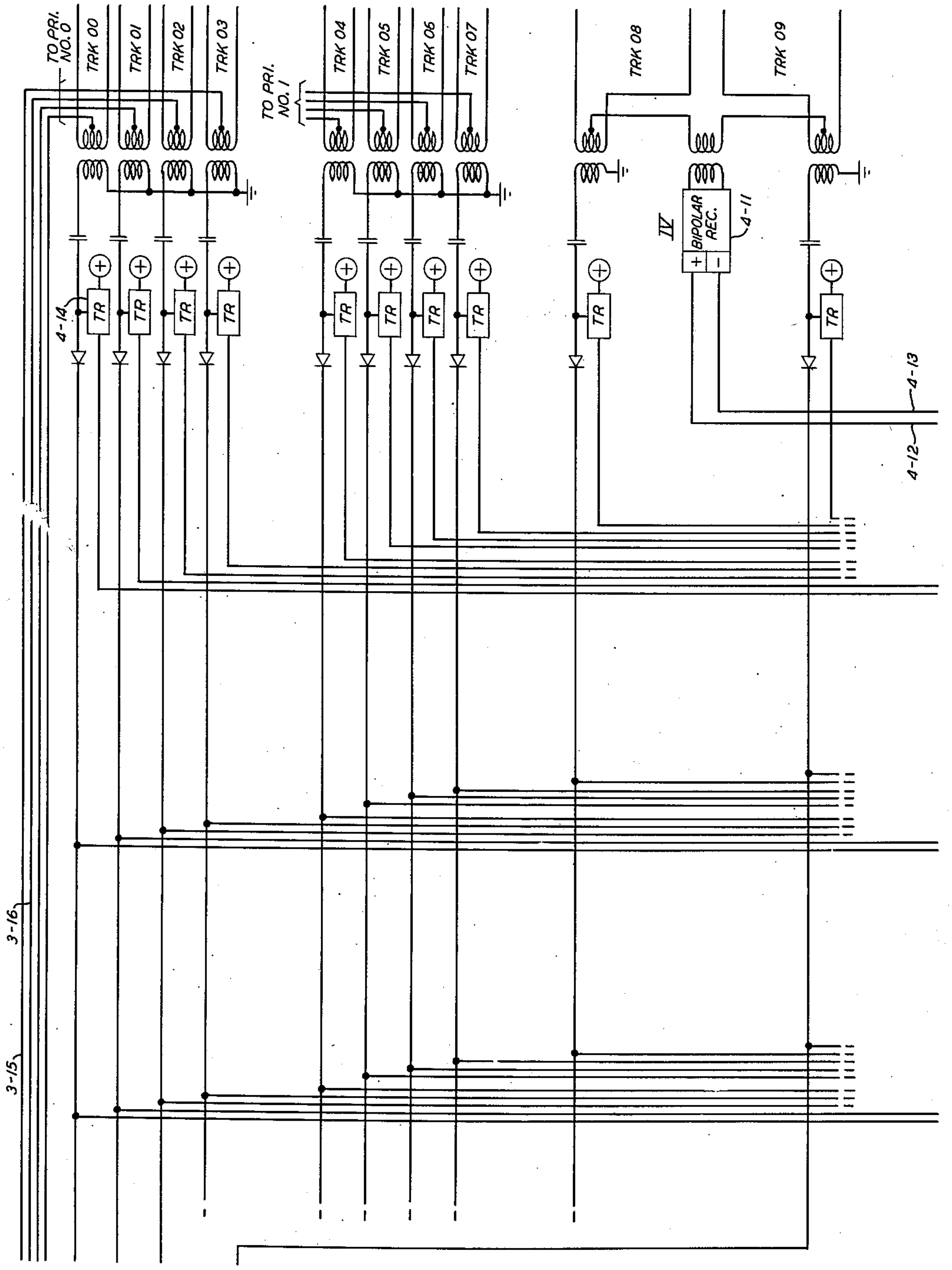
FIG. 4 shows an additional portion of the secondary concentrator including current regulators for supplying the transistor crosspoints.
Figure 5:
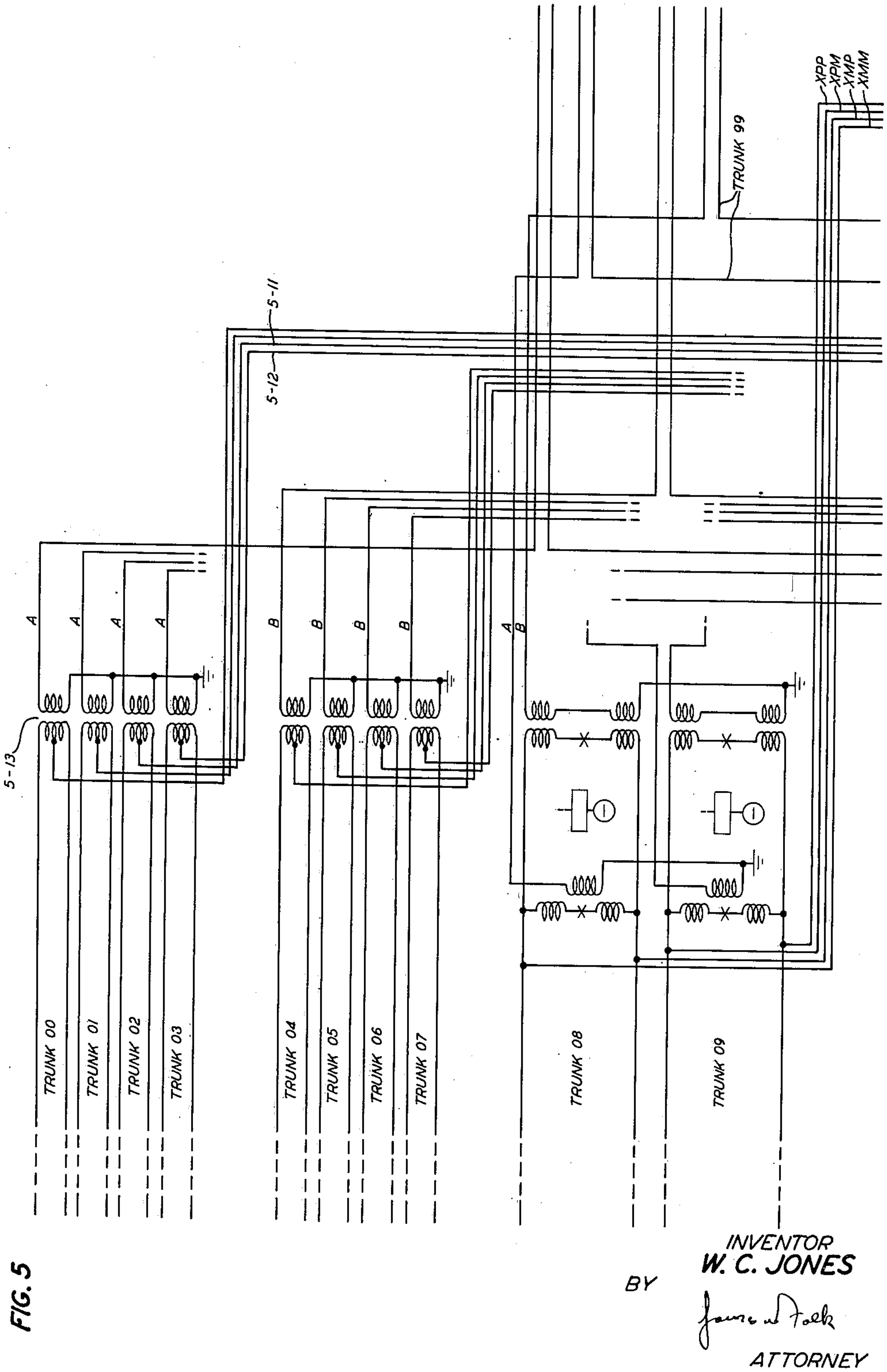
FIG. 5 shows in symbolic form the trunk conductors from the secondary concentrators to the central office and the transformer coupled terminations at the central office.

Application of the marking voltages results in the breakdown of the appropriate crosspoint in the secondary and the crosspoint remains energized through sustaining potentials developed at the transistor regulators 4—14, etc., in FIG. 4.

The monostable circuits have a further function. Inverter 18—35 is utilized to trigger monostable amplifier 18—30 and initiate its operation only after monostable amplifier 18—28 has completed its function. The responsibility of monostable amplifier 18—30 is the timing of the readout from direct-current detector 18—32. The detector 18—32 is connected to trunk scanner 18—13 to observe the direct-current potentials at the crosspoints for the purpose of determining whether the crosspoint has satisfactorily closed. The objective of the trunk scanner 18—13 is not to examine for any supervisory signals from the subscriber but merely to determine whether the cross point has properly operated in the secondary concentrator.

After monostable circuit 18—28 has applied the necessary voltages and inverter 18—35 has been restored in consequence of the turnoff of monostable amplifier 18—28, monostable amplifier 18—30 operates. In doing so it permits sufficient time to elapse to allow direct-current detector 18—32 to respond to whichever trunk has been addressed in scanner 18—13.

The crosspoint between link 9 and trunk 99 is crosspoint 3—12. This crosspoint is uniquely specified by the original choice of primary 0 and link 9 at the left-hand terminal of the crosspoint and the specification of link 9 with trunk units 9 indicates trunk 99 at the office end of the network. The transistor regulator 11—14 is arranged via conductor 11—24 to provide the crosspoint with current. In a similar manner transistor regulator 3—13 is the corresponding regulator on the link side.

In this respect it may be noted that, in the primary matrix, transistor regulators were employed on the link side but not on the line side. The reason for the distinction, resulting in the permitted use of a single transistor regulator 2—37 in conjunction with the primary matrix, stems from the fact that the transformer 1—23 is illustratively of the type that will permit relatively large amounts of current to flow. In consequence current need not be fed from a shunt source at the transformer 1—23 end in view of the size and capacity of that transformer. Since for practical reasons and space considerations transformer 2—41 is illustratively limited in size and cannot permit substantial D.C. currents to flow, a current regulator 2—37 is employed.

This situation distinguishes from that in the secondary concentrator since transistor regulator 11—14 is provided to obviate the necessity of D.C. current flow through transformer 11—15. Transformer 3—14 is also illustratively a miniature unit and thus transistor regulator 3—13 is required.

(6) Verification of Closure of Secondary Crosspoint: Prior to the time that the marking voltages were applied, crosspoint 3—12 had a potential difference placed across its terminals but of too low a voltage and too high an impedance to permit it to conduct. When the order previously described has been transmitted and translated in the secondary concentrator and monostable amplifier 18—28 has provided a one millisecond input to AND gate 18—26, appropriate potentials have been applied to the two selectors 10—15 and 18—15 to mark opposite sides of crosspoint 3—12 in secondary switch 9.

Initiation of scanning to insure that the connection has been satisfactorily completed is undertaken by monostable amplifier 18—30. Monostable amplifier 18—30 was timed to begin operation when monostable amplifier 18—28 terminated its operation through use of inverter 18—35. In a similar manner inverter 18—31 conveys a positive-going pulse through amplifier 18—33.

The objective is to allow the secondary network sufficient time to break down and to permit the direct-current detector 18—32 to stabilize before a short pulse will occur at amplifier 18—33 producing an output pulse to interrogate AND gates 18—25 and 18—27 via conductor 18—36. It will be noted that these AND gates include inputs from flip-flop 18—23 to indicate whether a mark or release is intended and an input from direct-current detector 18—32 indicating whether or not a potential exists and current flows on the designated trunk. OR gate 18—34 produces an output which is conveyed to transmitter 11—16 over conductor 18—38. This transmitter is coupled to a speech phantom including trunks 18 and 19 (of which only 19 is shown) which are ultimately connected to receiver 22—15 over conductors RPP, RPM, RMP and RMM. This indicates to the central office that the remote secondary was successful in executing the assigned instruction.

This reply is, as usual, double-valued. It merely indicates a success signal but does not indicate in what aspect. Thus, if the secondary concentrator is ordered to mark and flip-flop 18—23 is set for a mark operation an appropriate output from the detector 18—32 will be sent back as a success signal. If the instruction had dictated a release the output of detector 18—32 will again appear as a success signal.

The chain of monostable amplifiers 18—28 and 18—30 are self-releasing. OR gate 11—17 at the completion of the order provides a "clear" instruction to the link number counter 10—12 and also provides a reset function to flip-flop 18—20, the steering flip-flop via conductor 18—39. It will be noted that a "clear" signal is also delivered by the next advance pulse over conductor 11—23.

Reviewing the timing sequence, monostable amplifier 18—28 times the application of pulses for mark and release. Monostable amplifier 18—30 times a delay to permit the direct-current detector 18—32 to stabilize. Amplifier 18—33 provides an output which simultaneously resets link counter 10—12, steering flip-flop 18—20 and also provides readout pulses as inputs to AND gates 18—25 and 18—27. The latter gates logically combine the output of detector 18—32 with the mark-release selection previously made by flip-flop 18—23. These produce a pulse or absence of a pulse at OR gate 18—34 which is conveyed to transmitter 11—16 and ultimately to the central office. This completes the operation at the secondary concentrator for establishing a path for the dial-tone connection.

(7) Completion of Dial-Tone Connection: Returning now to the remote network control in the central office, it will be appreciated that common control had given an order to the control selector indicating that the remote network control was to begin transmission of the order word. In this case common control had stored the order information in the network order register and authorized transmission of the order word by remote network control 25—18 through the control selector 25—20. After having completed this function common control abandoned contact with the RCC.

During the next 12 milliseconds the RCC is substantially in charge of concentrator switching. RCC arranged the pattern and program of pulses to be transmitted to the primary and secondary but does not receive any immediate response from the primary concentrator. From the secondary concentrator, however, a reply pulse as described above is received.

The checking flip-flop 8—47 in the remote network control has been set by the final phase and will present via lead BH2 a flag with alarm significance to the common control if it is not reset within an arbitrary timing period. It is assumed herein that the above-described "success" pulse is transmitted to flip-flop 8—47 to reset it and prevent an alarm. Assuming that flip-flop 8—47 is reset the timing that is proceeding during the final phase (the final interval within the remote network control) will without incident complete itself. At this time, control responsibility for running the RCC is transferred from remote network control 25—18 to sequence control 25—15. If the sequence control has no other sources of flags, advance pulses will again be generated as shown in FIG. 27B, line 2 (dotted curve).

Common control at this point has made an entry in the register (barrier grid store) that indicated a specific path had been assigned to this customer on a specific concentrator. The link register carries this information and is marked with appropriate codes to indicate that the call was in an originating condition.

Assuming no other activities in the concentrators at this time, common control after having observed the service request flip-flop and having established the network instruction returns to flip-flop 20—14 and resets the flip-flop after initiating transmission of the network instruction. Flip-flop 20—14 could not be reset before the network transmitters were put into operation since advance pulses would resume and the line number counter would be advanced to the wrong place.

Common control must now complete the inner switching activities in distribution network 7—11 between the incoming concentrator trunk and an alternating-current dial receiver 7—12. The specific manner of connection of the dial receiver 7—12 is not essential to an understanding of the present invention and is comprehensively treated in copending application Serial No. 668,386 dated October 7, 1957 by W. A. Budlong et al.

The operations thus far have collectively provided a signaling path for the subscriber to use in transmitting his digital information to the central office. It may be noted that this same path will ultimately be used for speech communication but thus far it is reserved for signaling purposes.

To trace the call from its arrival on the remote secondary concentrator trunk in the central office (which in this case has been assumed to be trunk 99 of secondary 0) through to a connection which may receive alternating-current dial information, reference may be made to FIGS. 6 and 7. FIG. 6 shows a concentrator 6—11 which which has no function in the remote concentrator connections. The remote concentrator replaces in effect local concentrator 6—11 which latter is shown for completeness. Thus, no facilities of the remote concentrator are related to local concentrator 6—11.

In this respect, the information shown in FIG. 6, with the exception of the office scanner 6—13, is in contrast with the remaining equipment which pertains to the operation of the remote concentrator.

The equipment shown in FIG. 6 represents symbolically the portion of the central office which is not handled through the remote concentrator, i.e., those subscribers who have direct lines to the central office.

The connection through the distribution network 7—11 is performed on an alternating-current basis as are the connections in the remote concentrator. Since alternating current or transformer coupling is used in the speech path, no direct-current information exists on trunk 99 that bears a significance relative to customer supervisory signals, i.e., hangup, answer, etc. The latter information is sensed at the primary concentrators and handled over separate channels as discussed above. This distinguishes from the case of the direct line subscriber of FIG. 6. For example, line terminal 6—12 provides to scanner 6—13 information pertaining to customer supervisory signaling of a direct-current nature as explained in Budlong et al. supra.

By contrast the cables entering from the secondary concentrator (the concentrator trunks) enter the office as elements carrying alternating-current information only to the distribution network.

By means of distribution network 7—11 a connection is effected between trunk 99 of secondary 0 and the alternating-current dial receiver 7—12. The manner in which this connection is accomplished is detailed in the above-referred-to application of Budlong et al.

This connection may be effected in a brief period of time. Since this operation is initited simultaneously with the transmission of orders to the remote concentrators the path through the office network may be complete prior to the time that the primary and secondary concentrators have closed their crosspoints and prepared the remote part of the path. It will, therefore, be assumed herein that by the time the remote networks have completed their paths, a path through the office network exists and an alternating-current dial receiver 7—12 is connected thereto.

In the remote concentrator operation, the trunks arriving from the remote secondary concentrators are divided into groups corresponding to trunks extending to the distribution network which are all-originating, all-terminating and mixed-originating and terminating.

When common control, by reference to the route memory in FIG. 26 (the barrier grid store), selects a path to be used in the remote concentrator, it makes a selection without preliminary appreciation of whether a path through the central office distribution network is available.

It will be noted that trunk 99 is in the latter group and has appearances on both sides of the distribution network 7—11. Delay contacts 19—12 and 19—13 permit the selection of one of the two appearances for a particular connection.

The alternating-current dial receiver 7—12 is designed to receive information transmitted by subscriber sets. It is assumed in this regard that all station sets will use alternating-current digital transmission.

In general, the digital receiver is adapted to receive differing combinations of multifrequency signals and to decode these signals and identify the digits represented thereby. For purposes of description of the operation of the concentrator system, it is immaterial to consider the origin of the alternating-current signals. It is merely sufficient to observe that the signals may be received over an alternating-current coupled path, and deteced within the central office.

(8) Transmission of Called Number Information:

Resuming the typical call sequence of operations, the calling subscriber having loop 59 of primary 0, secondary 0 has reached an alternating-current dial receiver.

At the same time that this connection is effected in the distribution network 7—11 an appropriate entry is made in the route memory (FIG. 26) to indicate in terms of spots in the link register the fact that the customer connected on link 9 of primary 0 has been allotted a dial receiver. The appropriate spots in the register are marked and remain in that state for the time required for the customer to complete dialing.

The actual process of receiving and handling the digits in the dial receiver will not be explained herein. Reference may be made to Patent 2,332,912 of October 26, 1943 of G. Hecht et al. for a comprehensive treatment of an arrangement for reception of multifrequency pulses.

After the remote secondary has forwarded to the central office the "success" pulse which indicates completion of the secondary connections and after the clearing of the remote network control and the termination of order transmission, the RCC returns to a steady state condition, i.e., one in which no changes are occurring except synchronization checks. The quiescent state is resumed regardless of the ability of the distribution network to effect a connection through its own circuitry. Presumably if a connection through the distribution network may be effected in any event it will already be completed. In this regard it may be observed that the activities within the distribution network will not have an inhibiting influence on the resumption of scanning, advance pulses and other routine activities in the remote concentrators.

There is a general need for continuously checking the operation of remote equipment, but in the present system it is made more critical since the central office memory of remote network connections retained in the route memory of the barrier grid store (FIG. 26) is assumed to be a true record.

If no checking were done it is conceivable that the actual conditions of the remote concentrators may possibly be at variance with the records thereof displayed in the barrier grid store. Accordingly, the central office must perform systematic checking operations.

For the case of the function just completed between the alternating-current digit register and the calling subscriber one network performance check has been completed. This is one in which the secondary concentrator performs a direct-current scan of its control elements to permit verification of correct marking, and sends a pulse to notify the central office that the marking connection was successfully completed.

As yet, however, no check has been performed on the primary network. In this case the check is performed in a negative sense. An inspection is made for additional service requests on the line being served. Without taking any further action it may be conclusively presumed that the primary connection was completed and the crosspoint closed if no additional service request is made.

If any malfunction had occurred in setting up the connection in the primary concentrator the line scanner 1—17 in the primary concentrator when scanning line 59 would perceive another service request.

In short, since the customer is off-hook, if no connection is effected to his line it appears to the remote concentrator control as a new service request since there is no memory within the RCC itself of the event whereby the primary control had advised the central office of the original genuine service request.

If another service request does occur, the request is transmitted over the channels traced above and a flip-flop in primary control 25—16 is set. Ultimately this will result in a flag signal through AND gate 21—40 to common control stimulating common control to perform its own scanning operation through office scanner 6—13 and will subsequently cause common control to identify which line had made the service request by reference to the line counter 25—13.

Up to this point in the operation common control regards the service request as a guenuine original request. When common control returns to the route memory (barrier grid store) and consults the set of link registers for primary 0 it will examine all of the ten link registers in the route memory position for primary 0 which have their activity spots set to a condition which shows that the registers are active. In each active register it will compare the number of the service requesting line with the six-bit line number within the link register itself. If the corresponding line number is found to exist in any active register, i.e., if the match is successful, common control infers that a second service request has been received from a particular customer after having instructed the remote network control to effect a connection to that customer.

This information has a two-fold meaning. It indicates that the customer is still without a connection to a digit receiver and in addition a specific network malfunction has occurred. Common control then proceeds to appropriately record the trouble as maintenance information. It then prepares instructions to release the unsuccessful connection that has been established and will treat the present service request of the customer as a completely new service request. Having made the appropriate entries in the memory and transmitted the release instructions for primary and secondary concentrators, it prepares a new path in the same manner described in detail above.

Thus the success of a connection in the primary concentrator for an originating call consists in the lack of an additional service request. When no additional service request appears it may be assumed that the line in question was connected and the first of the primary network checks has been completed. Under the two-valued aspect of supervisory signals, the signal from the primary SR/CPF would be interpreted as crosspoint failure.

It will be assumed in the further tracing of the typical call that the primary concentrator has executed its assigned function successfully and that therefore no CPF signal has been returned.

The customer is now given dial tone from alternating-current dial receiver 7—12 and transmits his called telephone information to the alternating-current dial receiver.

It will be assumed that the calling customer on loop 59, primary 0, secondary 0, has dialed a directory number into the dial receiver 7—12 and the information is transmitted to common control.

C. *Detailed Description of a Typical Call-Terminating Connection*

(1) Addressing Line Mark Selector: (*a*) Address Instruction for Line Match Register.—When common control receives the complete information it obtains from the flying spot store a translation of the called telephone directory number in its machine language equivalent in a manner explained in Budlong et al supra.

The customer's equipment number after translation appears in a form which indicates the path required to reach the called party through the physical equipment of the central office and remote concentrators. Illustratively it will be assumed that the called subscriber is connected to secondary 1, primary 19, line 37 (not shown). It is now the function of common control to prepare a path to reach the called subscriber and to arrange the connections in a manner which will permit delivery of a ringing signal to the called subscriber and return of an audible ringing tone to the calling party.

The initial information utilized in preparing the remote path is the line number.

Since the line mark selector 1—18 must have access to line 37, the line number counter 1—15 and 1—16 and the corresponding counter in the central office must be similary addressed.

It is therefore a function of the line number match 25—14 to stop the advance process at number 37. Common control places a six-bit primary number in loop match register 25—24. The match register presents a six-bit binary number in double rail symmetrical form to line number match 25—14. This number appears physically as a series of inputs and absence of inputs to the AND gates shown generally at 14—22. The input signals presented to AND gates 14—22 correspond to the called line number and the present (variable) counter position.

In brief, this operation includes the delivery of a parallel binary word similar to the address word presented to the remote network control 25—18.

(*b*) Address Instruction for Control Selector: The address instruction prepared for the control selector appears as an eight-bit binary word and is acted upon in FIG. 13 by a set of AND gates. One group of sixteen AND gates including gates 13—11, 13—29, 13—30 and 13—13 may be regarded as a translator for converting four bits of binary information to an output on one of sixteen leads. Thus for any binary combination of four bits provided to gates 13—11 through 13—13 the amplifiers 13—12 through 13—14 will provide outputs indicative of one-out-of-sixteen. The amplifiers are connected to AND gates 13—15, etc. This collection of sixteen leads from amplifier 13—12 through amplifier 13—14 constitutes one part of the selector address, i.e., the units number in a 16 by 16 selection system. Correspondingly, sixteen AND gates 13—18, 13—31, 13—32 and 13—19 also decode binary information to produce one-out-of-sixteen outputs and are further conditioned by amplifier 13—20.

The action of the sixteen AND gates 13—18 through 13—19 is analogous to that of the sixteen AND gates 13—11 through 13—13. Amplifier 13—20 provides a qualifying output to AND gates 13—18 through 13—19 in accordance with a signal from common control via delay 13—21 and monostable amplifier 13—22 via lead ENRC. This lead carries a pulse from common control at the one instant in time when the concentrator system is instructed to make an immediate response to an order.

In this instance an eight-bit binary number has been provided to AND gates 13—11 through 13—13 and 13—18 through 13—19. While this address is being composed in the register flip-flops of common control and in the address leads between common control and the RCC a limited time must elapse to allow transient conditions to subside. Thus in FIG. 13 a waiting time for the stabilization to occur is provided over lead ENRC. A short pulse occurs over that lead at any time when an address is prepared by common control for execution by the remote concentrator controls.

It would not be appropriate to permit a signal from common control over lead ENRC to directly enable the execution of a particular instruction in RCC since this signal emanates concurrently with the gating into the loop match register of information by common control. Accordingly delay circuit 13—21 introduces an arbitrary delay of approximately 4 or 5 microseconds prior to the execution of any instruction to RCC. This permits sufficient time for stabilization of transients in the address leads. When the delay condition terminates in delay 13—21 monostable amplifier 13—22 is energized and delivers a pulse to gates 13—18 through 13—19.

Thus the sixteen amplifiers 13—23 through 13—24 provide qualifying inputs to the groups of smaller AND gates 13—15 through 13—17, inclusive, to permit selection of one of 256 possible leads to execute the desired instruction.

The amplifier 13—23 provides a common input to all of the AND gates 13—15 through 13—16. The individual selection lead added to each gate extends from amplifiers 13—12 through 13—14. This provides a 16 by 16 selection; the time qualification being provided by delay circuit 13—21. In similar manner amplifier 13—25 provides a common input for the next sixteen AND gates etc.

Thus the function of the control selector is to provide a short pulse to any one of 256 input points to initiate or terminate a connection or an operation within the RCC in accordance with instructions from common control. This operation occurs when the match is requested by common control for a terminating call.

Previously it was explained that common control entered a number in the line match register indicating line 37 and concurrently prepared an eight-bit binary address for the control selector. This corresponds to the control pulse for setting flip-flop 14—26, a request for performance of a match function via lead JF1 which is an output from AND gate 13—27.

The eight-bit binary address presented to the control selector selector to operate AND gate 13—27 and set flip-flop 14—26 may illustratively be 00000101. A suitable delayed executed pulse is provided through amplifier 13—20 setting flip-flop 14—26 and enabling amplifier 14—27 which in turn enables gate 14—25. When the AND gate 14—25 detects a match condition, it sets flip-flop 14—28 to indicate that a match has occurred.

The gate circuit has now been prepared to detect a match for line 37. It will be noted that the selection of AND gate 13—27 was made without regard to the condition of the RCC and without interrupting the advance cycle.

When line number 37 is reached by the line number counter 14—12 through 14—17 in FIG. 14, and lead HF1 from the sequence control is energized, the gate circuit 14—25 indicates a match condition to set flip-flop 14—28. This ultimately produces a flag indication to common control via lead FH1. At this time all scanning is halted until common control responds to the flag condition. The office scanner 6—13 examines the inputs to OR gate 21—14 until it finds an active condition on the input from amplifier 14—29 which is the match condition on lead HF1.

When common control appreciates that a match condition has occurred it will make reference to the register in common control which has been handling the call thus far. This register is a collection of spots in the barrier grid store which common control has used as a temporary memory during the establishment of the connection. Reference to the register indicates that the remote concentrator system is in readiness to carry out part of the remote connection necessary for the terminating call.

(2) Busy Test: Common control will now make a busy test of the called subscriber by reference to the route memory by matching line 37 against line numbers inscribed in the link registers associated with primary 19 of secondary 1. In the busy test, the active link registers of primary 19 are examined for conflicting conversations by the called party. If a busy condition is encountered, the calling subscriber will be connected to a busy tone source 7—15.

It will be assumed that when common control examined the route memory for records of line 37 it found none. It is therefore presumed that line 37 is idle and the counter has stopped at line 37. It now remains for common control to select a path for the terminating connection through the remote concentrators to the called party. It performs this function in a manner analogous to that for the originating concention for dial tone. (Section IIB3 supra.

Since common control is selecting a terminating path rather than an originating path, it will use a search technique in the route memory (FIG. 26) which will indicate to it trunk numbers that are in use for terminating calls.

Common control from the route memory selects (for illustrative purposes) link 1 and trunk units number 4 corresponding to trunk number 14. This information is recorded in the link register and a network order is prepared for transmission to the remote concentrators. This remote network order takes the same form as those previously discussed for FIG. 27A. It therefore includes the secondary number, primary number, link number and trunk units number. In addition, it will carry a mark instruction to set up the connection (see Section IIA6 supra).

(3) Transmission of Network Order: When common control prepares a network instruction in the network order register, it also prepares an eight-bit address in the control selector (FIG. 13) to provide an output on lead JB2 which sets flip-flop 9—11 and sets in motion the process by which a request is made for order transmission. The eight-bit address for the control selector to select lead JB2 would correspond to the selection of AND gate 13—28 and the input address would be 00001000. When this function is completed, flip-flop 9—11 energizes the remote network control to begin its cycle of order transmission. This operation has been described in detail above. (Sections IIA6 and IIB4.) The trains of pulses transmitted to the remote concentrators are arranged through the encoding activities of the equipment shown in FIGS. 8, 9, 15, 16 and 17 to bring about the proper instruction in the remote concentrators for setting up the terminating connection.

During transmission of the order, common control, in accordance with the usual pattern of resetting conditions which generated a flag, governs the control selector to reset flip-flops 14—28 over lead JF3 and 14—26 over lead JF2. If this were not done, another flag condition would be generated after transmission of the order for the same match indication.

It will be noted that after every flag condition common control resets the flip-flop that caused the flag before advance pulses can resume. When an order transmission is involved, the flag-producing flip-flop can be reset immediately after the request for transmission (setting of flip-flop 9—11) has been made, since flip-flop 9—11 will prevent undesired resumption of advance pulse transmission.

The instructions for the two remote concentrators 25—38 and 25—33 having been suitably encoded by the remote network control 25—18 are transmitted, after instruction by the control selector 25—20, to initiate transmission. Once the order is transmitted to the remote location, the appropriate crosspoints are closed to connect line 37 to link 1 in remote primary 25—38 and link 1 from primary 19 to trunk 14 within remote secondary concentrator 35—33 (not shown in the detailed drawings to preserve clarity). The connection set up in the remote concentrators is now a terminating connection rather than an originating connection.

Referring to the secondary first, the same procedure will take place as that described in setting up the originating call.

(4) Closure of Crosspoint in Remote Primary and Secondary Networks: The secondary concentrator executes the network instruction to close a specific crosspoint and scans to insure that closure did occur whereupon it sends a "success" signal back to remote network control 25—18. This checking function insures accurate operation within the remote secondary concentrator. As yet, however, a corresponding check has not been performed in relation to the primary concentrator. There is no facility in the primary network for checking the operation thereof at the time of performance.

A check can be performed only after the operation in terms of signals that arrive or fail to arrive from the primary concentrator in the form of normal signals (e.g., service requests) as explained for the dial tone connection.

As soon as remote network control 25—18 has completed its transmission and has verified that remote secondary 25—18 has operated satisfactorily, the sequence control 25—15 is permitted to resume transmission of advance pulses.

In the manner heretofore explained for the originating connection a check must be made for the terminating connection in both the primary and secondary concentrators. The check on appropriate operation of the primary is treated in detail in an application Cirone-Harr-Lowry-Ridinger referred to above. It is sufficient to indicate herein that when scanning was resumed by delivery of control to sequence control 25—15 after transmission of the network instruction, line number counter 25—13 and all of the corresponding remote counters in the primaries 1—15, 1—16, etc., were on line position number 37. This corresponds in terms of links being scanned by link scanner 2—15 as position number 7. Nothing further occurs until four advance steps have been made.

Referring to link scanner 2—15 the next advance pulse will carry it to position 8. In a similar manner it advances to link 9 and link 0. The fourth step drives the link scanner 2—15 to link 1. When it reaches link 1 a signal appears in the form of HU/CPC as described in Cirone-Harr-Lowry-Ridinger, supra. This signal appears at the output of AND gate 1—13 and is delivered over an appropriate phantom channel from remote primary 25—38 to primary control 25—34 to operate a flip-flop 20—18 corresponding to the HU/CPC condition.

This flip-flop will then produce a flag at OR gate 21—14 and in addition at AND gate 21—40. These conditions energize common control to examine the cause for the flag. As usual, all scanning in the concentrator system is suspended for the few milliseconds that elapse before common control enters to examine the cause for the flag.

When common control in the manner described above detects the HU/CPC indication on primary 19 of secondary 1 it returns to the route memory within the barrier grid store of FIG. 26 and begins to examine the registers shown and to resolve the ambiguity of the HU/CPC signal. In this operation it is unnecessary for all of the active registers to be examined. Common control has facilities for determining which link is associated with the signal just received. This information is obtained by examination of the outputs from line number counter 25—13. This information appears as a six-bit binary word. An arbitrary translation of this word yields the link number.

Previously it was indicated that the system had stepped four additional advance pulses after arrival at line 37. At the time that the HU/CPC signal was transmitted to the central office line number counter 25—13 is on line position number 41. Although the line number counter is reading 41, for purposes of common control's investigation of the route memory only the "1" part of the number 41 is significant.

Therefore, to appropriately utilize this information common control must take the binary indication of number 41, convert it to the decimal equivalent 4 and 1 and then examine the least significant digit. This may be done by means of a program suitable for performing the translation.

After the translation, common control is in a position to decide that the HU/CPC signal was transmitted from link 1 obviating the necessity for examining all of the active registers in the route memory for primary 19 and secondary 1. Instead common control can proceed directly to link register 1 and examine the information stored therein.

This arrangement of addressing enables common control to know which register is being affected by the signal information just received. Common control examines the register corresponding to link 1, primary 19, secondary 1 and determines that the memory spots indicate a connection in the process of being established.

This particular phase of the call is being overseen by a different traffic register (also a collection of barrier grid spots) and the information presently contained within the link register is sufficient to direct common control to the traffic register which in this case is the originating register handling the call.

From there it may ascertain that the connection in primary 19 of secondary 1 is undergoing timing for crosspoint closure, i.e., it is in the condition in which it was recently instructed to execute a connection and is being observed by common control as to successful completion of the connection. The arrival of the HU/CPC signal may thus be interpreted as CPC-crosspoint closure, a success signal.

The traffic register which is monitoring the processing of the call would eventually observe the absence of an HU/CPC signal if it did not arrive within a predetermined time. If the signal were not forthcoming within the time required to make a further scan the result would be the same as failure to effect an originating connection. It would necessitate taking down the entire remote connection and making another attempt over a different route.

Thus the HU/CPC signal and the secondary "success" signal indicate satisfactory performance in both the secondary concentrator and the primary concentrator for the terminating portion of the connection. At this time common control has received sufficient information to proceed with the ringing connection.

It will be noted as adverted to previously that subsequent to any flag condition common control is adapted to reset the condition or indication which generated the flag. If more than one condition or event was responsible for the flag condition, all must be reset before the pattern of advance pulses may be resumed by the sequence control. Thus, after each indication of a hangup, answer, crosspoint closure, crosspoint release, etc., through registration in the appropriate flip-flop of the primary control in the central office, common control acts through the control selector to reset the flip-flop.

At the time of preparing the terminating call, when common control had energized line number match 25—14 to match for line number 37 and subsequently when the match detector had found a match condition and created a flag to summon common control, common control proceeds to the primary concentrator designated in the register handling the call (the traffic register) as being the primary concentrator in which it is required to set up the terminating connection. This remote primary concentrator must be examined just prior to ringing to determine whether a service request was made from line number 37. If such a service request has occurred it is essential to prevent establishing a ringing connection to avoid ringing in the subscriber's ear (IC5 supra). A further reason is that if the customer sought to be reached is off-hook, the HU/CPC will not be properly transmitted. For these two reasons a final preparatory check must be made in the RCC just prior to ringing. The necessary check is accomplished by examining the service request flip-flop associated with primary concentrator 19. If the flip-flop is not set the terminating connection is proceeded with in the manner outlined above. If the flip-flop is set, the terminating connection is nevertheless established but the traffic register in the barrier grid store is advised not to anticipate a confirmation of the connection and in addition is instructed not to transmit a ringing signal. Under these circumstances the calling and called parties will be connected although no ringing signal has been transmitted to the called party.

Thus far the originating and terminating portions of the connection have been completed and checked.

Up to this time the originating subscriber has been connected through his remote primary and secondary concentrators and the distribution network to an alternating-current dial receiver. The terminating subscriber is connected through his remote primary and secondary concentrators. At this point the ringing connection will be established to the called subscriber. The connection for the ringing operation is made through the distribution network 7—11 and a ringing switch 6—14 which is connected to ringing terminal and tone source 6—15. For a comprehensive description of the operation of the ringing apparatus reference may be made to the application of W. A. Budlong et al. supra. In essence, a connection is made through the distribution network 7—11 between the calling subscriber and a source which indicates that ringing is being applied and between a source of ringing signals to the called or terminating party.

When the ringing connection is established in the central office a different traffic register within the barrier grid store will assume responsibility for the call, in lieu of the originating register, to maintain a record that ringing is being applied over this particular path and the fact that the called party has not yet answered.

It may be observed that when the customer is neither idle nor talking a particular traffic register in the central office maintains a record of his activities, and the identification of the particular traffic register is available in the route memory.

Ringing proceeds with connections between the two parties which give them in one case the ringing signal and in the other case a tone and this condition persists until the called party answers. Nothing further will obtain in the RCC (relative to this particular call) until this happens, other than the usual routine of synchronism checks and sending out advance pulses.

(5) Answer: The basic operation in the remote concentrator which advises common control when to discontinue ringing is the scanning of the links by scanner 2—15 for an answer condition. When the called party does answer and changes the condition of a supervisory element, as described in Cirone-Harr-Lowry-Ridinger referred to above, the formulation of signal ANS/CPR through AND gate 1—12 is produced. The recognition of this condition is the means for terminating the ringing state. The ANS/CPR signal is transferred over signaling channels to the central office. When it arrives it sets flip-flop 20—22 in primary control 25—34. This flip-flop in conjunction with OR gate 21—14 and AND gate 21—40 produces a flag which stops scanning and summons common control. Common control identifies the signal and enters the route memory which directs it to the traffic register to resolve the ambiguity. In a manner similar to the resolution of HU/CPC, information is present which is arrived at by link scanning.

As before the number is presented in the form of a six-bit binary number which common control must translate to decimal form to obtain the least significant digit as described above. In this instance common control will recognize that link 1 is associated with the received signal.

Common control proceeds to the register associated with link 1 in the route memory of the barrier grid store, FIG. 26, and there resolves the ambiguity. Once again common control will learn from the activity spots S0 and S1 that link 1 is "in common control." This indicates that the call is being handled by a specific traffic register and, on proceeding to that traffic register, common control will observe that this particular call was in the ringing condition and therefore the signal CPR is not valid and that the signal ANS (answer) is the intended information. In response to the answer signal, common control will interrupt ringing and prepare a speaking path between the two subscribers involved. It does this without performing any operations in the remote concentrators themselves. There are already connections existing between the two subscribers and the central office. Common control dismisses the ringing equipment and provides through distribution network 7—11 a path between the calling and called subscriber in a manner described in detail in Budlong et al. supra.

Once an answer has been recognized common control may through the control selector of FIG. 13 produce an output that will reset the ANS/CPR flip-flop and permit scanning to be resumed.

Assuming that the talking connection has been completed and the ringing apparatus dismissed, no changes take place in the remote primaries or secondaries. A change does take place, however, in the appropriate link registers for both parts of the call. Thus, the link register for the calling subscriber occupying link 9 of primary 0, secondary 0 will have that register marked into the talking condition. Correspondingly the link register associated with link 1, primary 19, secondary 1 will be marked into the talking condition. There is no further record then maintained in the traffic registers instrumental in establishing the call. The RCC resumes normal scanning with a complete path between the calling and called subscribers.

The HU/CPC signal is transmitted for primary 19 of secondary 1 over phantom channels which correspond (although in a different primary concentrator) to those shown for primary 0 of secondary 0 using bipolar transmitter 2—14. In this case the bipolar transmitters to which reference is made are in a different remote primary concentrator. When these signals arrive at the central office the particular elements that are set correspond to the flip-flops that are indicated for primary 0 but in this operation they are occurring in primary 19 of secondary 1. The HU/CPC signal, which arrived when the links were scanned immediately after the terminating connection, was stored in a flip-flop corresponding to flip-flop 20—18. The output from that flip-flop is delivered through amplifier 20—19 and is further qualified in AND gate 20—20 before transmission to OR gate 21—14. The corresponding signal when the called subscriber answers (ANS/CPR) was transmitted over phantom channels and received at receiver 20—21 and registered in flip-flop 20—22. The output from this flip-flop is delivered through amplifier 20—23 and qualified in gate 20—24. An additional qualifying input to AND gates 20—20, 20—24 and 20—16 which originates at flip-flop 20—25 was discussed herein above.

Thus far the connection has been traced to the point where a ringing connection has been established, the called party has answered, ringing apparatus was dismissed, and a conversation path provided.

(6) Conversation Path Completed: In the connection between line 59, primary 0, secondary 0 and line 37, primary 19, secondary 1 the two subscribers have an alternating-current conversion path. The remote primaries and secondaries take no further action with regard to the call. Within the link registers associated with the originating and terminating connections records exist which show the line numbers involved and the trunk units number to which they are connected. The activity spots S0 and S1 in the registers indicate a talking condition. No other registers in the central office are presently associated with the call. The two registers associated with the two links at either end are the only active records maintained by the office and the records remain in this condition for the duration of the call.

A register associated with the originating end of the call (see FIG. 26), the ninth register or the ninth group of 12 spots in the column associated with primary 0 of secondary 0 contains an entry of line 59, trunk units 9 and the activity spots indicate the talking condition. For the other end of the same conversation an entry is made in link register 1 (which is the group of 12 spots at the second level in the column of spots which column is located by secondary 1, primary 19).

As soon as the ringing connection is removed and the traffic register disassociated, no evidence remains concerning which party originated the call. In this respect, after the conversation is initiated it is immaterial to consider which party originated the call. This arrangement departs from conventional practice wherein supervision was often under the control of the calling subscriber.

Referring again to FIG. 26, an arrangement is shown which is typical of the registers in the barrier grid store. The central square on FIG. 26 represents the face of a barrier grid tube with an illustrative 128 by 128 spots. The registers referred to in the discussion heretobefore are columns of spots on the face of the tube corresponding to specific primary locations. Since twelve spots are needed per link register and ten links per primary, 120 of the 128 spots are used. For a fully equipped secondary, twenty columns are provided for the twenty primaries. For each secondary, one column 26—13 includes groups of trunk activity spots which are used for selecting trunks when the call is established.

The detailed link register shown at 26—12 includes two bits to indicate the state of the register, six bits to store the line number and four bits to store the trunk units number.

In reference to the illustrative call the link register will have the supervisory spots set in the "1 0" condition which indicates talking. The next six bits contain in one case line 59 and in the other number 37. The trunk units number will carry in one case 9 and in the other 4.

During the time that a traffic register (not shown) is involved within common control (such as an originating register) the ten spots shown in 26—12 do not necessarily store the line and trunk number. Instead this information is stored in the specific traffic register and the number of the traffic register itself is stored in the link register. This provides a key for returning to the information necessary to effect a connection.

It will be noted that the A.C. dial receiver does not store signals as they arrive from the calling substation. It merely observes one digit at a time. In consequence, storage facilities are necessary to register the digits after they are detected as explained in the above-referred-to patent of G. Hecht et al.

(7) Hangup: After a hangup, a timing function begins to observe an answer; if no answer is received within 50 milliseconds it is recognized that no "hit" or spurious line closure exists. If an answer arrives between 50 and 250 milliseconds, it represents an "alert" explained in detail in Cirone-Harr-Lowry-Ridinger, supra. After 250 milliseconds, it is assumed that a disconnect is intended.

At the time hangup occurs an additional traffic register (a disconnect register—not shown) is utilized. One of the two link registers in the route memory will have its contents transferred to the traffic register and the address of the disconnect register will be inscribed in the route memory. The timing function will then be initiated to measure the interval between hangup and answer. When the answer signal arrives, observation of the line number counter and performance of a translation described above yields a link number which in turn indicates the appropriate link register. Reference to the link register in turn indicates the appropriate traffic register.

If the answer arrives within 50 milliseconds indicating a "hit" the only necessary action is to restore the information to the link register and actuate the activity spots to indicate the talking condition.

If an "alert" condition is encountered and the timing in the disconnect register signifies 50 to 250 milliseconds, the primary and secondary remote connections remain intact. The only action performed at this time is a rearrangement of connections within the distribution network. These operations include a disconnect of the portion of the network connected to the person who did not transmit an alert signal. The subscriber who performed the alert is connected to an alternating-current dial receiver and is treated thereafter in the manner described above for an originating call.

The purpose of the alert condition may be to add a party for a conference connection. In adding a conference party when the third party has been rung and has answered, a three-way connection is effected. The only contribution of the concentrator system to the alert condition is to recognize the alert signal by scanning. For additional information in this regard, reference may be made to Cirone-Harr-Lowry-Ridinger, supra.

Additional services initiated by the alert condition are to transfer a call, and a hold arrangement wherein a party may be left waiting while a call to a third party is undertaken.

Thus far the actions to be taken in the event of an alert and a hit condition have been discussed. In the third situation—if the disconnect register times over 250 milliseconds before an answer arrives—it is assumed a true disconnect has occurred.

(8) Disconnect: It is significant to observe that common control arrives at the disconnect decision only through timing internal to its own structure. RCC has continued remote scanning since the first hangup signal was recognized. Common control had reset the hangup flip-flop and permitted scanning to be resumed. For this reason when common control decides to remove the existing connection, it cannot perceive from the traffic register, which performs the timing operation, the present status of RCC.

In ordinary operations other than disconnect the control originates in RCC which summons common control through the flag arrangement. When common control responds to the flag it recognizes that no advance pulses are being transmitted and that the remote network control is available.

In contrast, the entry into RCC as a result of the disconnect register timing is an asynchronous one.

In FIG. 21 a lead is designated as "RCT" meaning that the remote network control is available. This conductor extends from AND gate 21—41. Common control can enter the RCC to perform remote network operations only when the remote network control is available. Assuming that the remote network control is available, common control prepares to disconnect whichever half of the conversation the hangup signal originated from.

The order which is made up in the network order register (Section IIA6(*a*)) shown in FIG. 27A includes the elements required in the primary and secondary remote connections that must be disestablished. This includes secondary number, primary number, link number and, since it is desirable to perform the release operation from the trunk side of the network, the trunk units number. All of this information is stored within the network order register. Having prepared the order required for transmission, common control will prepare a channel over the control selector which actuates the remote network control.

The order is transmitted by the remote network control in a manner similar to that explained above.

In the secondary concentrator the operation is essentially similar to that of the marking operation (Section IIC4), the only distinction residing in the fact that the release voltage is placed on only one side of the network. Thus, the end result of the order word at the secondary concentrator is the energization of AND gate 18—29 and trunk release matrix 18—14 to interrupt the holding path for the crosspoint.

After a delay of approximately one millisecond, the direct-current detector 18—32 receives information from trunk scanner 18—13 to indicate that the crosspoint has been released. A confirmation signal is then transmitted to the central office in time to prevent a failure indication.

In the primary concentrator, it is only necessary to interrupt the path through the link release selector instead of marking two points as in the case of a mark operation.

In consequence of the lack of the necessity to make a line selection, common control is permitted to enter on any line number to perform a release. The fact that a PNPN crosspoint may be released by interrupting the path at one terminal thereof is explained in detail in an application of W. C. Jones-P. G. Ridinger, filed March 11, 1959, Serial No. 798,746.

At this time, the release order has been formulated in the remote network control and outpulsed to the remote primary and secondary. The primary and secondary connections have been taken down, and release of the secondary has been checked. To check the primary, scanning must be permitted to resume. When the scanner arrives at the link that was released, a signal will be transmitted indicating release as explained in Cirone-Harr-Lowry-Ridinger, supra. The disconnect register performs a timing operation which anticipates the return of this signal from the primary.

(9) Release: The manner in which the signal is returned to the central office includes a return of the link scanner to the link that was released and the formulation and transmission of a signal ANS/CPR. This signal originates at gate 1—12 and is transmitted over the phantom channel on links 0 and 1 associated with bipolar transmitter 2—14. The signal is registered in the central office in the manner described for the answer signal above. In resolving the signal common control observes the line number counter and establishes the decimal equivalent thereof. From the decimal number it observes the link number and proceeds to the appropriate link register in FIG. 26. From the link register common control observes that a traffic register is involved, and upon examination of the traffic register, finds that timing is being performed in that register for crosspoint release.

When the CPR signal is received, the register is dismissed and common control modifies the link register for that end of the call and adjusts the activity spots in the register accordingly.

One-half of the connection involved in the call has now been cleared. In this respect, it may be observed that after the register has its activity spots S0 and S1 posted as idle, the line number last appearing in the register is permitted to remain. This does not affect subsequent functioning since when a match is undertaken it is made only with respect to active registers.

The other half of the connection still may remain because, in general, the parties do not hang up exactly simultaneously. The distribution network 7—11 had a path through it corresponding to the talking connection and this path is removed when either of the remote primary and secondary connections are released.

The release in the distribution network begins at the trunk end where the disconnect was made. When the hangup occurred the register contained information including the trunk units number and the like number. These specify one of 100 trunks and by translation the number of the terminal on the office network may be established. Knowing this information, a disconnect signal may be provided to that end of the network and the path may be traced to establish the identity of equipment at the other end.

In this case common control starts at the trunk which initiated the hangup and works through the office network in the manner explained in Budlong et al. supra, clearing it and at the same time determining which trunk on the other end of the office network was connected to this party. When the trunk number is determined, the concentrator equipment connected to that trunk may be identified. In addition, by a matching procedure in the route memory, the trunk number may be compared to establish which link register and therefore which remote primary concentrator is connected to the trunk.

Having established the trunk of interest after tracing across the distribution network, a delayed disconnect register may be employed to perform delay disconnect timing. This allows the slower party a predetermined time to hang up. If the delayed disconnect register times out before hangup, the trunk connection is delivered to an intercept operator who listens for room noise. If the operator cannot receive an answer from the party, the connection may be turned over to a trouble desk. In this arrangement a reasonable time is permitted to elapse during which the great majority of subscribers will hang up. For those who do not, the connection is referred to an intercept operator.

Thus, the entire call including the second half has been dismantled.

It is understood that the foregoing embodiments are merely illustrative and that various modifications may be made by those skilled in the art without departing from the scope of the invention.

What is claimed is:

1. In a telephone system, a central office, a plurality of lines, a lesser plurality of trunks, said trunks including a plurality of speech trunks and a lesser plurality of control trunks, phantom circuit means on said trunks, means connecting said trunks to said central office, concentrator means for connecting said lines to said trunks, means at said central office for transmitting relatively high speed signals to said concentrator means over said control trunks, means at said central office for transmitting relatively low speed signals to said concentrator means on said phantom circuit means over said speech trunks, and additional means at said central office for transmitting intermediate speed signals to said concentrator means on said phantom circuit means over said control trunks.

2. A telephone system including a central office, a plurality of line concentrators remotely located from said central office, a group of lines connected to each of said concentrators, a plurality of trunks less in number than said lines connecting said concentrators to said central office, said trunks including speech trunks and control trunks, phantom circuit means on said trunks, a line scanner at each of said line concentrators for determining the state condition of said lines, means at said central office for synchronously operating said line scanners over said control trunks, and means at said concentrators responsive to the determination of a service request condition on one of said lines for supplying a service request indication over said phantom circuit means on one of said speech trunks.

3. An automatic telephone system including a central office, a plurality of lines, a lesser plurality of trunks, said trunks including a plurality of speech trunks and a lesser plurality of signaling trunks, phantom circuit means on said speech trunks, means connecting said trunks to said central office, concentrator means for connecting said lines to said trunks, and means at said central office for transmitting high speed signals to said concentrator over said signaling trunks and for transmitting relatively lower speed signals on said phantom circuit means over said speech trunks.

4. In a telephone system, a central office, a plurality of line concentrators remotely located from said central office and responsive to control signals from said central office, a group of lines connected to each of said concentrators, a plurality of trunks less in number than said lines connecting said concentrators to said central office, said trunks including a plurality of speech trunks and a lesser plurality of signaling trunks, phantom circuit means on said trunks, and means at said central office for categorizing said control signals in relationship to speed and for transmitting said control signals over differing channels including said signaling trunks, speech trunks and phantom circuit means in accordance with the speed of said signals.

5. In a telephone switching system, a central office, a plurality of trunks connected to said central office, said trunks including a plurality of speech trunks and a plurality of signaling trunks, a greater plurality of links, a still greater plurality of lines, remote concentrator means for connecting said trunks to said links, additional remote concentrator means for connecting said links to said lines, and means at said central office for transmitting control signals to said remote concentrator means in accordance with the speed of the signals to be transmitted including means for delivering an advance signal over a pair of trunks to said remote concentrator means, and additional means for transmitting said advance signal to said additional concentrator means over a plurality of links connected to said pair of trunks.

6. A telephone switching system in accordance with claim 5 wherein said pair of trunks connecting said central office to said remote concentrator means includes phantom channel means over which said advance signals are transmitted.

7. In a telephone switching system, a central office, a plurality of trunks connected to said central office, said trunks including a plurality of speech trunks and a plurality of signaling trunks, phantom circuits on said trunks, a greater plurality of links, a still greater plurality of lines, remote concentrator means for connecting said trunks to said links, additional remote concentrator means for connecting said links to said lines, and means at said central office for transmitting relatively high speed signals to said concentrator means over said signaling trunks and for transmitting relatively intermediate speed signals on phantom circuits over said signaling trunks and for transmitting relatively low speed signals over phantom circuits on said speech trunks, said means for transmitting relatively low speed signals including means for bidirectional transmission of signals between said central office and said additional remote concentrator means.

8. In a telephone switching system, a central office, a plurality of trunks connected to said central office, said trunks including a plurality of speech trunks and a plurality of signaling trunks, phantom circuits on said trunks, a greater plurality of links, phantom circuits on said links, a still greater plurality of lines, remote concentrator means for connecting said trunks to said links, additional remote concentrator means for connecting said links to said lines, means at said central office for transmitting relatively high speed signals to said concentrator means over said signaling trunks and for transmitting relatively intermediate speed signals to said concentrator means on phantom circuits over said signaling trunks and for transmitting relatively low speed signals to said concentrator means on phantom circuits over said speech trunks, and means for transmitting relatively low speed signals from said additional concentrator means to said central office including phantom circuits on said links and phantom circuits on said trunks.

9. A remote concentrator telephone system including a central office, a plurality of line concentrators remotely located from and responsive to control signals from said central office, a group of lines connected to each of said concentrators, a plurality of trunks less in number than said lines connecting said concentrators to said central office, said trunks including a plurality of speech trunks and a lesser plurality of signaling trunks, phantom circuits on said trunks, means at said central office for categorizing said control signals in relationship to speed and for transmitting said control signals over differing channels including said signaling trunks, speech trunks and phantom circuits in accordance with the speed of said signals, a line scanner at each of said line concentrators for determining the state condition of said lines, means at said central office for synchronously operating said line scanners over said signaling trunks, and means at said concentrators responsive to the determination of a service request condition by one of said scanners for supplying a service request indication over a phantom circuit on said speech trunks to said central office.

10. In a telephone switching system, a central office, a plurality of trunks connected to said central office, said trunks including a plurality of speech trunks and a plurality of signaling trunks, phantom circuit means on said trunks, a greater plurality of links, a still greater plurality of lines, secondary remote concentrator means responsive to control signals from said cenral office for connecting said trunks to said links, primary remote concentrator means for connecting said links to said lines, means at said central office for transmitting control signals to said concentrator means in accordance with the speed of the signal to be transmitted including means for delivering an advance signal over phantom circuit means on said signaling trunks to said secondary concentrator means and additional means for transmitting said advance signal in broadcast form over a plurality of said links connected to said phantom circuit, a line scanner at each of said primary concentrator means for determining the state condition of said lines, means at said central office for synchronously operating said line scanners over said signaling trunks, and means at said concentrator means responsive to the determination of a service request condition by said scanner for supplying a service request indication over a phantom circuit on one of said speech trunks to said central office.

11. A two-stage automatic concentrator system including a central office, a plurality of lines, a smaller plurality of links, a still smaller plurality of trunks, primary concentrators for connecting said lines to said links, secondary concentrators for connecting said links to said trunks, said trunks being connected to said central office, a number of said links being control links exclusively adapted for control signaling and a number of said trunks less in number than said control links being control trunks exclusively adapted for control signaling, and means for transmitting control signals to said primary concentrators over a path including at said control trunks, the secondary concentrator connected to said primary concentrator, and said control links connected to said last-mentioned secondary concentrator.

12. A two-stage automatic concentrator system in accordance with claim 11 further comprising means for receiving supervisory signals at said central office from a particular one of said primary concentrators over a particular control channel and wherein said means for transmitting control signals includes means for transmitting a first portion of a control order to all said primary concentrators connected to said secondary concentrator to which said particular primary concentrator is connected, and means for transmitting a second portion of said control order only to said particular primary concentrator over said particular control channel.

13. A two-stage automatic concentrator comprising a central office, a plurality of primary concentrators, a plurality of secondary concentrators, control channels connecting said secondary concentrators, primary concentrators, and central office for transmission of control and supervisory signals therebetween, means for receiving a supervisory signal at said central office from a particular primary concentrator, means for transmitting a first control order to all the primary concentrators connected to the secondary concentrator to which said particular primary concentrator is connected, and means for transmitting a second control order to said particular primary concentrator over said particular control channel.

14. A remote telephone concentrator system including a central office, a plurality of trunks connected to said central office, said trunks including a plurality of speech trunks and a plurality of signaling trunks, phantom circuit means on said trunks, a plurality of links greater in number than said trunks, said links including a plurality of speech links and a plurality of signaling links, phantom circuit means on said speech links, a plurality of lines greater in number than said links, primary concentrator means for connecting said lines to said links, secondary concentrator means for connecting said links to said trunks, means at said central office for transmitting relatively high speed signals to said concentrators over said signaling trunks and for transmitting relatively intermediate speed signals to said concentrators over said phantom circuit means on said signaling trunks and said signaling links, and means for transmitting relatively low speed signals to said concentrators over said phantom circuit means on said speech trunks and said speech links.

15. A telephone switching system in accordance with claim 14 including in addition means at said primary concentrator means for transmitting relatively low speed signals to said central office over said phantom circuit means on said speech links and phantom circuit means on said speech trunks.

16. A two-stage remote concentrator system including a central office, a plurality of lines, a smaller plurality of links, a still smaller plurality of trunks, primary concentrators for connecting said lines to said links, secondary concentrators for connecting said links to said trunks, means for connecting said trunks to said central office, said trunks including a plurality of speech trunks and a lesser plurality of control trunks, phantom circuits on said trunks, said links including a plurality of speech links and a lesser plurality of control links, phantom circuits on said links, means at said central office for categorizing control signals to be delivered to said concentrator in relationship to speed and for transmitting said control signals over differing channels including said trunks, links and phantom circuits in accordance with the speed of said signals, a line scanner at each of said primary concentrators for determining the state condition of said lines, means at said central office for synchronously operating said line scanners over said phantom circuits on said control trunks and said control links, and means at said primary concentrators responsive to the determination of a service request condition by one of said scanners for supplying a service request indication over a phantom circuit on said speech links and a phantom circuit on said speech trunks.

17. A remote telephone concentrator system including a central office, a plurality of lines, a smaller plurality of links, said links including speech links and control links, a still smaller plurality of trunks, said trunks including speech trunks and control trunks, said speech trunks being less in number than said speech links, said control trunks being less in number than said control links, primary concentrators for connecting said lines to said links, secondary concentrators for connecting said links to said trunks, and means for connecting said trunks to said central office.

18. In a telephone system, a central office, a plurality of lines, a lesser plurality of trunks, said trunks including a plurality of speech trunks and a lesser plurality of control trunks, phantom circuit means on said trunks, means connecting said trunks to said central office, a concentrator for connecting said lines to said trunks, and means at said central office for transmitting relatively high speed signals to said concentrator over said control trunks and for transmitting relatively low speed signals to said concentrator on said phantom circuit means over said speech trunks and for transmitting intermediate speed signals to said concentrators on said phantom circuit means over said control trunks, said transmitting means at said central office including means individual to said concentrator but not individual to said lines.

19. A remote telephone concentrator system including a central office, a plurality of lines, a lesser plurality of trunks, said trunks including a plurality of speech trunks and a lesser plurality of control trunks, phantom circuit means on said trunks, means connecting said trunks to said central office, concentrator means for connecting said lines to said trunks, means at said central office for transmitting a control order to said concentrators including means for transmitting a portion of said order of relatively high speed signals over said control trunks and for transmitting another portion of said order of relatively low speed signals over said phantom circuit means on said control trunks.

20. In telephone switching system, a central office, a plurality of trunks connected to said central office, said trunks including a plurality of speech trunks and a plurality of control trunks, said trunks being connected to form phantom circuits, a greater plurality of links, said links including a plurality of speech links and a plurality of control links, said links being connected to form phantom circuits, a still greater plurality of lines, secondary concentrator means for connecting said trunks to said links, primary concentrator means for connecting said links to said lines, means at said central office for transmitting a control order to said primary concentrators including means for transmitting a portion of said order of relatively high speed signals to a group of primary concentrators connected to a particular secondary concentrator over phantom circuits on said control trunks and said control links, and means for transmitting an additional portion of said order of relatively lower speed signals over phantom circuits on said speech trunks and phantom circuits on said speech links.

21. A remote concentrator telephone system including a central office, a plurality of trunks connected to said central office, said trunks including a plurality of speech trunks and a plurality of signaling trunks, means for connecting said trunks to form phantom circuits thereon, a greater plurality of links, said links including a plurality of speech links and a plurality of signaling links, means for connecting said links to form phantom circuits thereon, a still greater plurality of lines, secondary remote concentrator means responsive to control signals from said central office for connecting said trunks to said links, primary remote concentrator means for connecting said links to said lines, means at said central office for transmitting control signals to said concentrator means in accordance with the speed of the signal to be transmitted over differeing channels including said trunks and links, and means at asid primary and secondary concentrators for transmitting signals to said central office over said phantom circuits.

22. A telephone switching system in accordance with claim 21 wherein said signaling links are less in number than said signaling trunks.

23. A telephone switching system in accordance with claim 21 including means at said secondary concentrator responsive to the reception of control signals from said central office and the actuation of said secondary concentrator in response thereto to return a success signal to said central office over said phantom circuits on said speech trunks.

24. A telephone switching system in accordance with claim 21 wherein said means at said central office for transmitting control signals to said primary concentrator includes means for transmitting the identification of a particular link number over phantom circuits on said signaling trunks and said signaling links to a plurality of primary concentrators.

25. A telephone switching system in accordance with claim 21 including in addition means at said primary concentrator means responsive to supervisory indications on said lines and links for transmitting signals representative thereof including hangup, answer and service request signals to said central office over said phantom circuits on said speech links and said phantom circuits on said speech trunks.

26. In a telephone switching system, a central office, a plurality of trunks connected to said central office, said trunks including a plurality of speech trunks and a plurality of signaling trunks, means for connecting said trunks to form phantom circuits thereon, a greater plurality of links, said links including speech links and signaling links, means for connecting said links to form phantom circuits thereon, a still greater plurality of lines, secondary concentrator means under control of said central office for connecting said trunks to said links, primary concentrator means under control of said central office for connecting said links to said lines, said signaling links being greater in number than said signaling trunks, means at said central office for transmitting relatively high speed signals to said concentrator means over said signaling trunks and for transmitting relatively intermediate speed signals to said concentrator means over said phantom circuits on said signaling trunks and for transmitting relatively low speed signals to said concentrator means on phantom circuits over said speech trunks, and means at said concentrators for transmitting relatively low speed signals to said central office over said speech links and speech trunks including means for transmitting bipolar signals.

27. A two-stage remote telephone concentrator system including a central office, a plurality of lines, a smaller plurality of links, a still smaller plurality of trunks, primary concentrator means for connecting said lines to said links, secondary concentrator means for connecting said links to said trunks, means for connecting said trunks to said central office, said trunks including speech trunks and control trunks, said links including speech links and control links, said control links being greater in number than said control trunks, means for connecting said links and trunks to form phantom circuits thereon, scanning means at said primary concentrator means for examining the state condition of said lines and links and for supplying indications thereof to said central office over a path including said phantom circuits on said speech links, line mark selector means and link mark selector means at said primary concentrator means individually connectable to said lines and links to effect connections therebetween, link release means at said primary concentrator individually connectable to said links to release said connections, link mark selector means and trunk mark selector means at said secondary concentrator means individually connectable to said links and trunks to effect connections therebetween, trunk release means at said secondary concentrator means individually connectable to said trunks to release said connections, trunk scanning means at said secondary concentrator means for verifying the state condition of said trunks and transmitting signals indicative thereof to said central office over a path including said phantom circuits on said speech trunks, remote network control means in said central office responsive to the reception of a service request indication from one of said lines for transmitting control signals to said concentrator means over a path including said phantom circuits on said control trunks and said control links to effect a connection from said central office to said one line, and receiving means in said concentrator means responsive to said control signals for actuating said selector means to effect said connection, said remote network control means being additionally responsive to the reception of a disconnect indication on said one line over a path including phantom circuits on said speech links and phantom circuits on said speech trunks to transmit control signals to said concentrator means over said phantom circuits on said control trunks and said control links to release said connections, said receiving means being additionally responsive to said control signals to actuate said release means to release said connections.

28. A remote two-stage telephone concentrator system including a central office, a number of lines, a smaller number of links, primary concentrator means connecting said lines to said links, a still smaller number of trunks, secondary concentrator means connecting said links to said trunks, said links including speech links and control links, said trunks including speech trunks and control trunks, said control links being greater in number than said control trunks, means for connecting said links and trunks to form phantom circuits thereon, means connecting said trunks to said central office, a scanner at said primary concentrator means for periodically examining the state condition of said lines and links and for transmitting indications thereof to said central office over a path including a phantom circuit on said speech links and said secondary concentrator means and a phantom circuit on said speech trunks, registration means at said central office responsive to the transmission of a state indication from said primary concentrator means for registering said indication, and means at said central office responsive to the registration of said indication for arresting the operation of said scanner.

29. A remote two-stage telephone concentrator system including a plurality of lines, a lesser plurality of links, a still lesser plurality of trunks, a central office, means for connecting said trunks to said central office, said trunks including speech trunks and control trunks, said links including speech links and control links, primary concentrators for connecting said lines to said links, secondary concentrators for connecting said links to said trunks, means for connecting said links and trunks to form phantom circuits thereon, said trunks including control trunks and speech trunks, said links including control links and speech links, said phantom circuits on said links including a first phantom circuit on said speech links for transmission of hangup and answer indications from said primary concentrators to said central office and a second phantom circuit on said speech links for transmission of service request indications from said primary concentrators to said central office.

30. A two-stage telephone concentrator system in accordance with claim 29 wherein said phantom circuits include in addition a first phantom circuit on said speech trunks connected to said first phantom circuit on said speech links at said secondary concentrator, and a second phantom circuit on said speech trunks connected to said second phantom circuit on said speech links at said secondary concentrator.

31. A two-stage telephone concentrator system in accordance with claim 29 wherein said control links include links individual to each of said primary concentrators, and wherein said phantom circuits include a first phantom circuit on said control trunks connected to said last-mentioned links at said secondary concentrator.

References Cited in the file of this patent

UNITED STATES PATENTS

| | | |
|---|---|---|
| 2,532,097 | Hersey | Nov. 28, 1950 |
| 2,820,103 | Abbott | Jan. 14, 1958 |
| 2,925,473 | Lucas | Feb. 16, 1960 |